US011272541B2

(12) United States Patent
Kim et al.

(10) Patent No.: US 11,272,541 B2
(45) Date of Patent: Mar. 8, 2022

(54) METHOD AND APPARATUS FOR MANAGING ALLOCATION AND USAGE OF RADIO RESOURCE, METHOD AND APPARATUS FOR TRANSMITTING DATA THROUGH UNLICENSED BAND CHANNEL, AND METHOD AND APPARATUS FOR MANAGING ACCESS OF RADIO RESOUCE

(71) Applicant: Electronics and Telecommunications Research Institute, Daejeon (KR)

(72) Inventors: Eunkyung Kim, Daejeon (KR); Jae Sun Cha, Daejeon (KR); Chanho Yoon, Daejeon (KR); Seung-Kwon Baek, Daejeon (KR); Jae Joon Park, Daejeon (KR); Kwang Jae Lim, Daejeon (KR); Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 147 days.

(21) Appl. No.: 16/537,365

(22) Filed: Aug. 9, 2019

(65) Prior Publication Data
US 2019/0394804 A1 Dec. 26, 2019

Related U.S. Application Data

(63) Continuation of application No. 14/865,968, filed on Sep. 25, 2015, now abandoned.

(30) Foreign Application Priority Data

Sep. 26, 2014 (KR) .................. 10-2014-0129443
Sep. 26, 2014 (KR) .................. 10-2014-0129445

(Continued)

(51) Int. Cl.
*H04W 4/00* (2018.01)
*H04W 74/08* (2009.01)
(52) U.S. Cl.
CPC ............... *H04W 74/0816* (2013.01)
(58) Field of Classification Search
None
See application file for complete search history.

(56) References Cited

U.S. PATENT DOCUMENTS 7,586,893 B2   9/2009   Takano
7,869,380 B2   1/2011   Jeon et al.
(Continued)

FOREIGN PATENT DOCUMENTS

JP   2003152622 A   5/2003
JP   2013223042 A   10/2013
(Continued)

OTHER PUBLICATIONS

"Broadband Radio Access Networks (BRAN); 5 GHz high performance RLAN; Harmonized EN covering the essential requirements of article 3.2 of the R&TTE Directive," Draft ETSI EN 301 893, Jul. 2014, pp. 1-95, V1.7.2.
(Continued)

*Primary Examiner* — Gerald A Smarth
(74) *Attorney, Agent, or Firm* — William Park & Associates Ltd.

(57) ABSTRACT

Provided is a method for transmitting, by a transmitter, a first data having periodicity through a channel of an unlicensed band:
The transmitter adjusts at least one of transmission timing of the first data and clear channel assessment (CCA) timing for the channel to occupy the channel. The transmitter determines whether the channel may be occupied by performing a CCA on the channel at the CCA timing. The transmitter (Continued)

transmits the first data through the channel at the transmission timing of the first data, when it is determined that the channel may be occupied.

8 Claims, 73 Drawing Sheets

(30) Foreign Application Priority Data

| | | |
|---|---|---|
| Nov. 7, 2014 | (KR) | 10-2014-0154777 |
| Nov. 7, 2014 | (KR) | 10-2014-0154778 |
| Jan. 30, 2015 | (KR) | 10-2015-0015553 |
| Jan. 30, 2015 | (KR) | 10-2015-0015556 |
| Mar. 17, 2015 | (KR) | 10-2015-0036914 |
| Apr. 10, 2015 | (KR) | 10-2015-0051177 |
| Jul. 23, 2015 | (KR) | 10-2015-0104646 |
| Jul. 24, 2015 | (KR) | 10-2015-0105160 |
| Sep. 17, 2015 | (KR) | 10-2015-0131865 |
| Sep. 21, 2015 | (KR) | 10-2015-0133366 |

(56) References Cited

U.S. PATENT DOCUMENTS

| | | | |
|---|---|---|---|
| 8,363,537 | B2 | 1/2013 | Ko et al. |
| 8,570,984 | B2 | 10/2013 | Jeon et al. |
| 8,593,936 | B2 | 11/2013 | Ko et al. |
| 8,798,014 | B2 | 8/2014 | Pan et al. |
| 8,971,168 | B2 | 3/2015 | Ko et al. |
| 9,001,773 | B2 | 4/2015 | Jeon et al. |
| 9,148,790 | B2 | 9/2015 | Kang et al. |
| 9,306,724 | B2 | 4/2016 | Kang et al. |
| 9,356,758 | B2 | 5/2016 | Jeon et al. |
| 2009/0161610 | A1 | 6/2009 | Kang et al. |
| 2012/0329400 | A1 | 12/2012 | Seo et al. |
| 2013/0165134 | A1 | 6/2013 | Touag et al. |
| 2013/0188506 | A1 | 7/2013 | Cheong et al. |
| 2013/0301490 | A1 | 11/2013 | He et al. |
| 2014/0036853 | A1 | 2/2014 | Kim et al. |
| 2014/0079016 | A1 | 3/2014 | Dai et al. |
| 2014/0140251 | A1 | 5/2014 | Pan et al. |
| 2014/0161002 | A1* | 6/2014 | Gauvreau ............ H04L 1/1893 370/280 |
| 2014/0177546 | A1 | 6/2014 | Kang et al. |
| 2014/0219229 | A1 | 8/2014 | Jeon et al. |
| 2014/0342745 | A1* | 11/2014 | Bhushan ............ H04L 5/0053 455/450 |
| 2015/0124771 | A1 | 5/2015 | Ko et al. |
| 2015/0201431 | A1 | 7/2015 | Um et al. |
| 2015/0223149 | A1 | 8/2015 | Liu et al. |
| 2016/0073344 | A1* | 3/2016 | Vutukuri ............ H04W 72/14 370/252 |
| 2016/0127098 | A1 | 5/2016 | Ng et al. |
| 2016/0234706 | A1* | 8/2016 | Liu ............ H04W 72/0453 |
| 2016/0270100 | A1 | 9/2016 | Ng et al. |
| 2017/0019924 | A1 | 1/2017 | Wang et al. |
| 2017/0070312 | A1 | 3/2017 | Yi et al. |
| 2017/0238311 | A1 | 8/2017 | Hooli et al. |
| 2017/0245168 | A1 | 8/2017 | Yi et al. |
| 2018/0175975 | A1 | 6/2018 | Um et al. |
| 2018/0248662 | A1 | 8/2018 | Kim et al. |
| 2019/0053274 | A1 | 2/2019 | Kim et al. |

FOREIGN PATENT DOCUMENTS

| | | |
|---|---|---|
| KR | 1020080114655 A | 12/2008 |
| KR | 1020100069063 A | 6/2010 |
| KR | 101234022 B1 | 2/2013 |
| KR | 1020130128255 A | 11/2013 |
| KR | 1020140010450 A | 1/2014 |
| KR | 1020140054044 A | 5/2014 |
| KR | 1020140073468 A | 6/2014 |
| KR | 1020140083502 A | 7/2014 |
| WO | 2013185835 A1 | 12/2013 |

OTHER PUBLICATIONS

"Dynamic frequency selection in wireless access systems including radio local area networks for the purpose of protecting the radiodetermination service in the 5 GHz band," ITU-R, May 2011, M.1652-1, pp. 1-20, Geneva.
"Presentation of Specification/Report to TSG: TR 36.889, Version 1.0.1," 3GPP TSG RAN Meeting #68, Jun. 15-18, 2015, p. 1, Malmö, Sweden.
"Study on Licensed-Assisted Access using LTE," 3GPP TSG RAN Meeting #65, Sep. 9-12, 2014, pp. 1-8, Edinburgh, Scotland.
"Technical Specification Group Radio Access Network; Evolved Universal Terrestrial Radio Access (E-UTRA); Carrier Aggregation; Base Station (BS) radio transmission and reception," 3GPP TR 36.808, Jul. 2013, pp. 1-31, V10.1.0.
"Technical Specification Group Radio Access Network; Evolved Universal Terrestrial Radio Access (E-UTRA); Carrier aggregation enhancements; User Equipment (UE) and Base Station (BS) radio transmission and reception," 3GPP TR 36.823, Sep. 2013, pp. 1-35, V11.0.1.
"Technical Specification Group Radio Access Network; Study on Licensed-Assisted Access to Unlicensed Spectrum," 3GPP TR 36.889, Jun. 2015, pp. 1-285, V1.0.1.
"Technical Specification Group Radio Access Network; Study on LTE Time Division Duplex (TDD)—Frequency Division Duplex (FDD) joint operation including Carrier Aggregation (CA)," 3GPP TR 36.847, Dec. 2013, pp. 1-9, V12.0.0.
"LAA using LTE deployment and operational scenarios," 3GPP TSG RAN WG1 Meeting #78bis, Oct. 6-10, 2014, pp. 1-5, Ljubljana, Slovenia.
"LAA using LTE operation, compliant to regulatory requirements," 3GPP TSG RAN WG1 Meeting #78bis, Oct. 3-10, 2014, pp. 1-6, Ljubljana, Slovenia.
"Required functionalities and possible solution related to SCE operation in unlicensed carrier," 3GPP TSG RAN WG1 Meeting #79, Nov. 17-21, 2014, pp. 1-8, San Francisco, USA.
3GPP TS 36.211 V13.2.0 (Jun. 2016), "3rd Generation Partnership Project; Technical Specification Group Radio Access Network; Evolved Universal Terrestrial Radio Access (E-UTRA); Physical channels and modulation (Release 13)".
3GPP TS 36.213 V13.2.0 (Jun. 2016), "3rd Generation Partnership Project; Technical Specification Group Radio Access Network; Evolved Universal Terrestrial Radio Access (E-UTRA); Physical layer procedures (Release 13)".
3GPP TS 36.300 V13.3.0 (Mar. 2016), "3rd Generation Partnership Project; Technical Specification Group Radio Access Network; Evolved Universal Terrestrial Radio Access (E_UTRA) and Evolved Universal Terrestrial Radio Access Network (E-UTRAN); Overall description; Stage 2 (Release 13)".
R1-154388 "Channel access procedure for LAA", 3GPP TSG RAN WG1, Meeting #82, Beijing, China, Aug. 24-28, 2015.
R1-155830 "DRS transmission over unlicensed carrier", 3GPP TSG RAN WG1, Meeting #82-bis, Malmo, Sweden, Oct. 5-9, 2015.
R1-155831 "Data transmission with LBT priority classes", 3GPP TSG RAN WG1, Meeting #82-bis, Malmo, Sweden, Oct. 5-9, 2015.
R1-157240 "Discussion and details on data transmission", 3GPP TSG RAN WG1, Meeting #83, Anaheim, USA, Nov. 15-22, 2015.
Discussion on solutions for required functionalities and design targets for LAA, 3GPP TSG RAN WG1 #78bis, Ljubljana, Slovenia, Oct. 6-10, 2014, R1-143879, Samsung.
Physical Layer options for LAA-LTE, 3GPP TSG RAN WG1 #78bis, Oct. 6-Oct. 10, 2014, Ljubljana, Slovenia, R1-144236, Motorola Mobility.

* cited by examiner (a) LAA deployment scenario of low power Cell (L+U), where scenario 1a is low power Cell (L+U) in outdoor and scenario 1b is low power Cell (L+U) in indoor ◯ : F1 or F2 (Licensed)

◯ : F3 (Unlicensed)

(b) LAA deployment scenario of PCell (L)-SCell (L+U)
with ideal backhaul between PCell and low power SCell,
Where scenario 2a is low power SCell (L+U) in outdoor
and scenario 2b is low power SCell (L+U) in indoor ◯ : F1 (Licensed)

◯ : F1 or F2 (Licensed)

◯ : F3 (Unlicensed)

(c) LAA deployment scenario of PCell (L)-SCell (U)
with ideal backhaul between PCell and low power SCell,
Where scenario 3a is low power SCell (U) in outdoor
and scenario 3b is low power SCell (U) in indoor ◯ : F1 (Licensed)

◯ : F3 (Unlicensed)

(a) LAA scheduling alternative 1, DL self-scheduling in P-LCC & UCC and UL feedback is transmitted via UL P-LCC (b) LAA scheduling alternative 2, DL self-scheduling in P-LCC, DL in UCC is scheduled by P-LCC and UL feedback is transmitted via UL P-LCC (c) LAA scheduling alternative 3, DL in P-LCC is scheduled by UCC, DL in UCC is scheduled by P-LCC and UL feedback is transmitted via UL P-LCC (d) LAA scheduling alternative 4, DL in P-LCC is scheduled by UCC, DL self-scheduling in UCC and UL feedback is transmitted via UL P-LCC

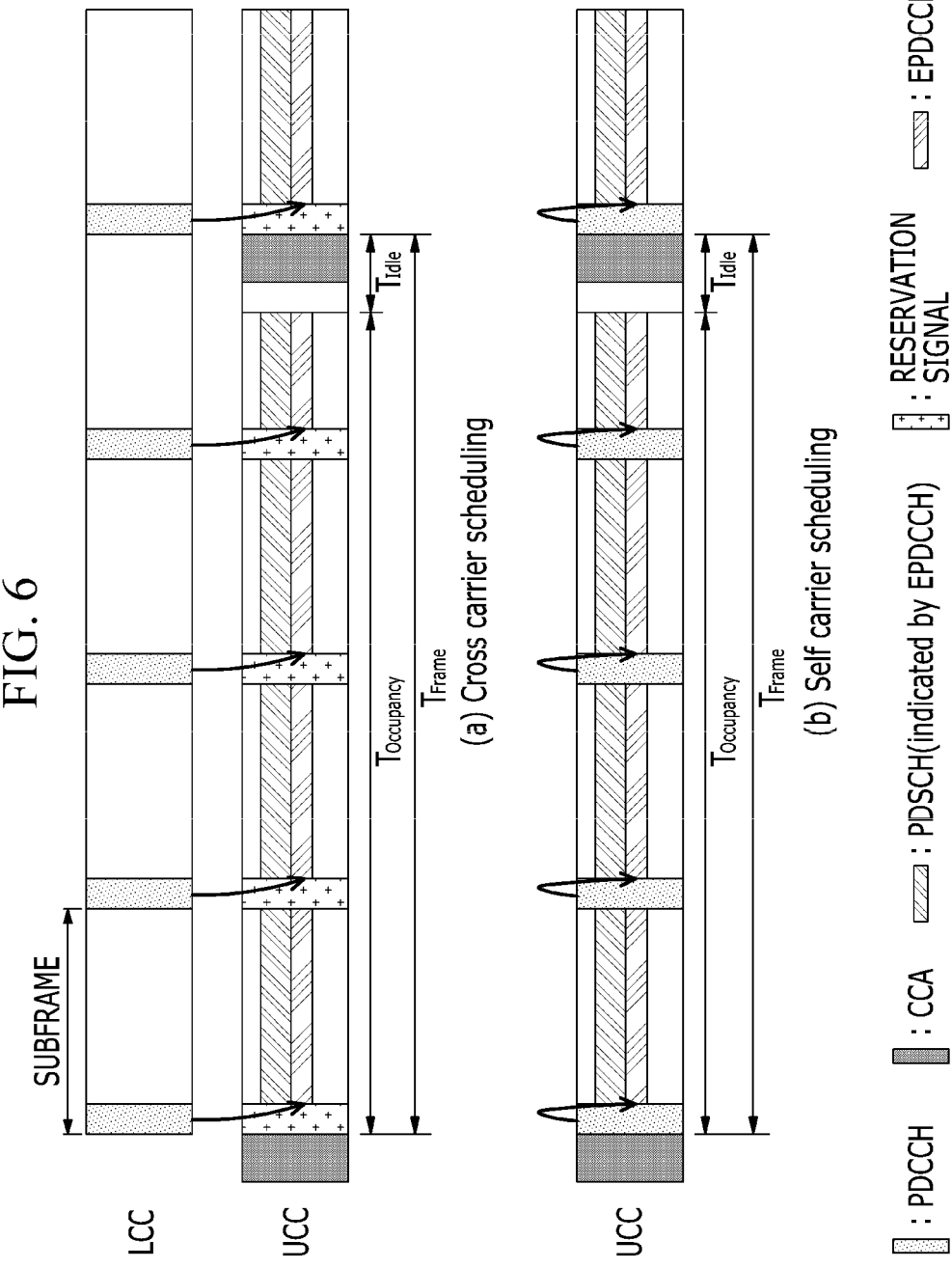

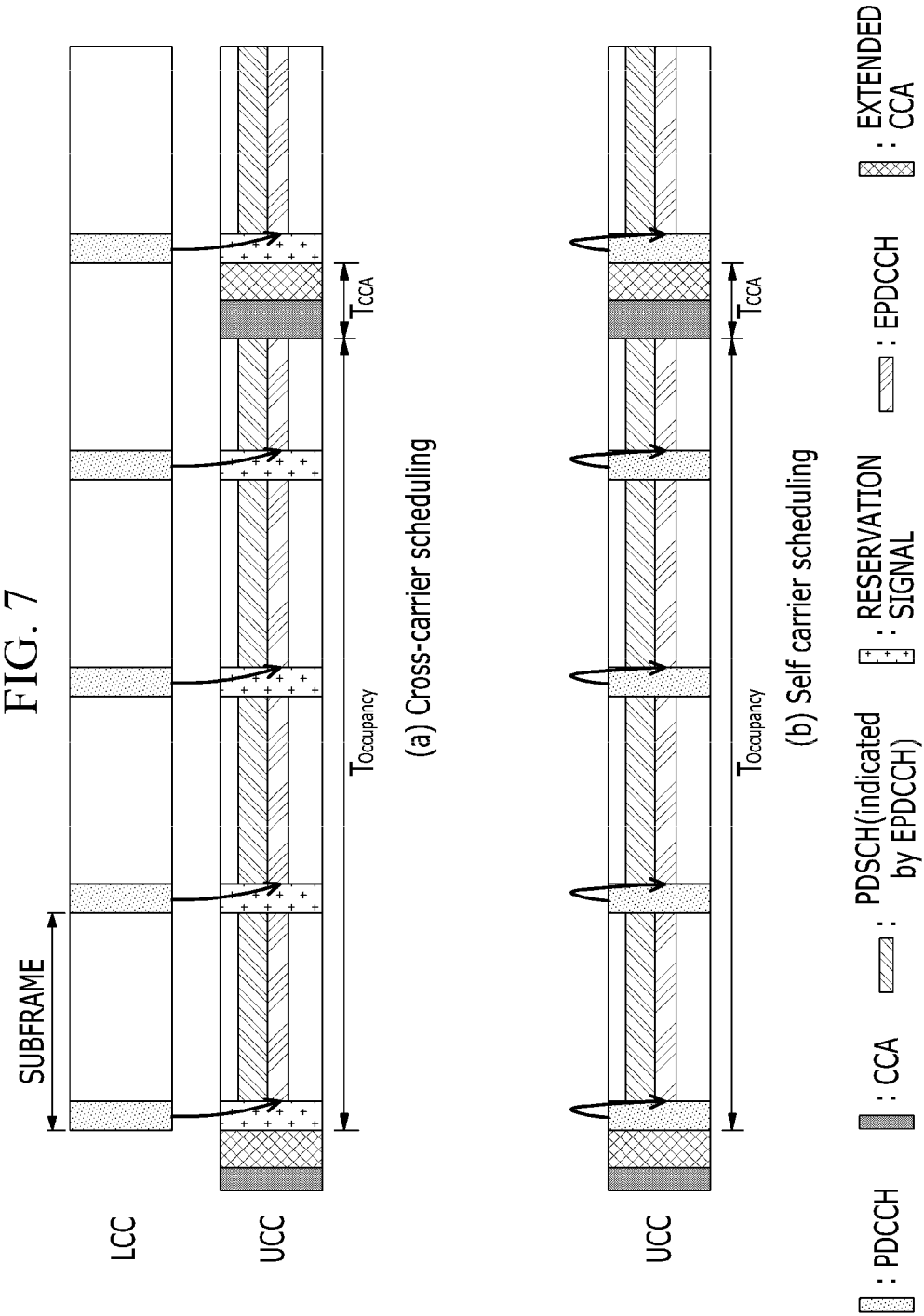

(a) 1st subframe in COT (b) Intermediate ($2^{nd}$~$n-1^{th}$) subframe in COT (c) Last (n$^{th}$) subframe in COT FIG. 42
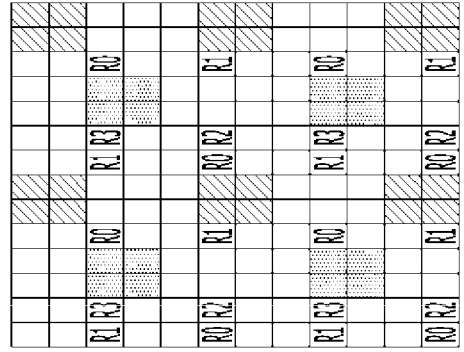
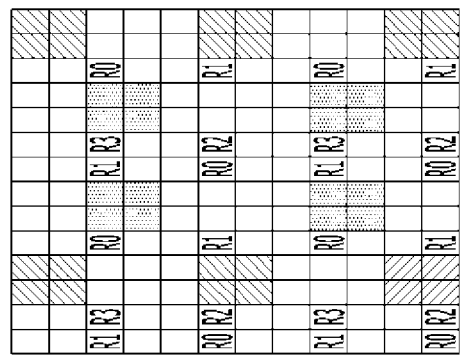
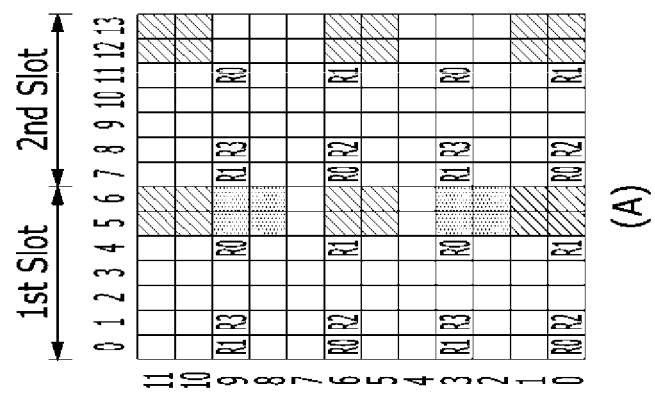

FIG. 44A
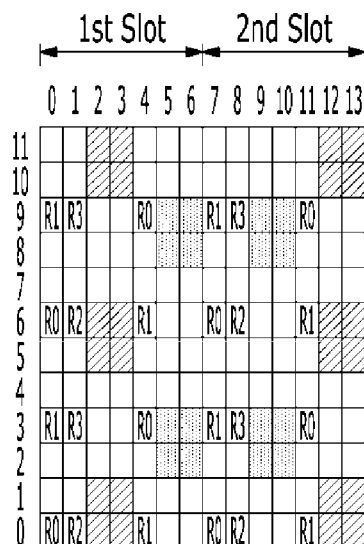
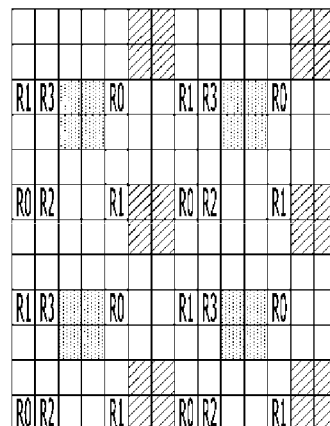
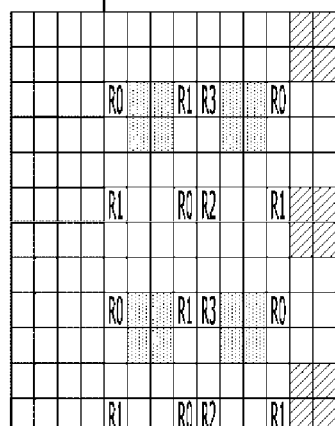
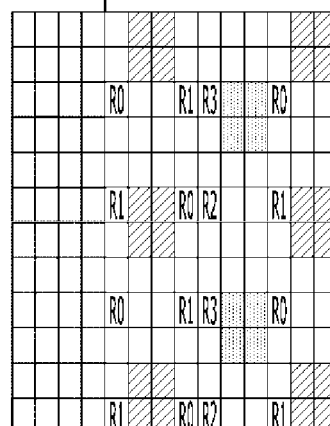
(B-1) (C-1)
R0 : CRS   R1 : CRS   R2 : CRS   R3 : CRS   ▨ : DM-RS   ▦ : CSI-RS

FIG. 44C
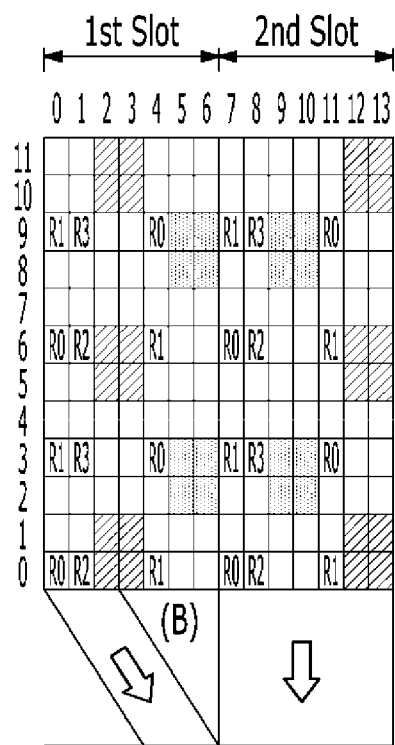
(B-3)
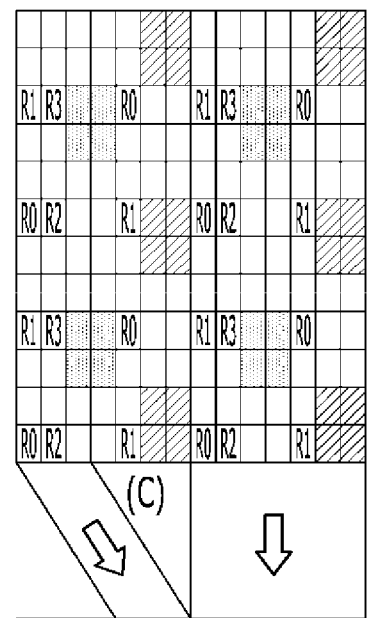
(C-3)
R0 : CRS  R1 : CRS  R2 : CRS  R3 : CRS  ▨ : DM-RS  ▩ : CSI-RS

METHOD AND APPARATUS FOR MANAGING ALLOCATION AND USAGE OF RADIO RESOURCE, METHOD AND APPARATUS FOR TRANSMITTING DATA THROUGH UNLICENSED BAND CHANNEL, AND METHOD AND APPARATUS FOR MANAGING ACCESS OF RADIO RESOUCE

CROSS-REFERENCE TO RELATED APPLICATION

This application claims priority to and the benefit of Korean Patent Application Nos. 10-2014-0129443, 10-2014-0129445, 10-2014-0154777, 10-2014-0154778, 10-2015-0015556, 10-2015-0015553, 10-2015-0036914, 10-2015-0051177, 10-2015-0104646, 10-2015-0105160, 10-2015-0131865 and 10-2015-0133366 filed in the Korean Intellectual Property Office on Sep. 26, 2014, Sep. 26, 2014, Nov. 7, 2014, Nov. 7, 2014, Jan. 30, 2015, Jan. 30, 2015, Mar. 17, 2015, Apr. 10, 2015, Jul. 23, 2015, Jul. 24, 2015, Sep. 17, 2015 and Sep. 21, 2015, the entire contents of which are incorporated herein by reference.

BACKGROUND OF THE INVENTION

(a) Field of the Invention

The present invention relates to a method and an apparatus for managing allocation and usage of radio resources.

Further, the present invention relates to a method and an apparatus for managing and controlling efficient data transmission by managing an access of radio resources in a mobile wireless access system.

(b) Description of the Related Art

Mobile service providers are seeking efficient methods for increasing capacity of a mobile communication system to keep up with an increase in the number of mobile Internet users using the mobile communication system. The most efficient and intuitive method additionally secures a licensed band frequency for the mobile communication system to increase a bandwidth. In the case of using the licensed band frequency, there is an advantage in that the mobile service providers may exclusively use the corresponding frequency to efficiently provide mobile communication services but there is a disadvantage in that the mobile service providers spend much money on the license and use of the corresponding frequency and the licensed band frequency allocated to the mobile communication system may be limited. Therefore, the mobile service providers and mobile communication manufacturers are seeking methods for providing mobile communication services using an unlicensed band frequency that has relatively more available frequency bands and is inexpensive. Communication systems that are deployed in the unlicensed band frequency have the following limitations.

The communication systems that are deployed in the unlicensed band frequency have limited transmission power to minimize effects on other systems sharing the unlicensed band frequency. In detail, when a licensed band system and an unlicensed band system are deployed at the same location, unlike the licensed band system, the unlicensed band system may have an area (coverage hole) at which coverage does not arrive.

The communication system deployed in the unlicensed band frequency has a limitation that it has to discontinuously or randomly use the unlicensed band frequency for fair coexistence with the adjacent unlicensed band systems. As a result, transmission reliability of a control channel, a common channel, etc., that are used in the mobile communication system may be reduced.

Due to the limitation of the unlicensed band system, a standalone system using only the unlicensed band is not reviewed but the scenarios to deploy/operate the licensed band system and the unlicensed band system in a complementary form have been reviewed. In these scenarios, reliable control functions for terminal control, mobility management, etc., are performed by a system operated in the licensed band frequency and traffic functions such as an increase in radio transmission rate and a radio traffic load distribution are operated in the form in which the unlicensed band system supplements.

Systems or carriers that are operated in the licensed band frequency perform the control functions and the traffic functions and systems or carriers that are operated in the unlicensed band frequency perform the traffic functions. These operations are performed by a carrier aggregation (CA) operation. An example of a carrier aggregation configuration of 3rd Generation Partnership Project (3GPP) Long Term Evolution (LTE) may include a carrier aggregation scheme between an unlicensed band frequency division duplex (FDD) carrier and a licensed band LTE and a carrier aggregation scheme between an unlicensed band time division duplex (TDD) carrier in which both of the uplink/downlink are operated and the licensed band LTE.

There is an advantage in that an unlicensed band cellular system may use inexpensive and rich frequency resources and high-level interference control technologies to provide mobile communication services with improved quality of service. However, the unlicensed band cellular system requires new coexisting technologies and interference control technologies to secure the advantages under various regulatory requirements required in the unlicensed band and the coexistence with different unlicensed band systems.

Meanwhile, if at least two homogeneous or heterogeneous systems (or apparatuses) in the wireless access system intend to simultaneously transmit data, a receiving apparatus may not properly receive the data due to the interference. For example, it is assumed that a first transmitting apparatus transmits data to a first receiving apparatus and simultaneously a second transmitting apparatus transmits data to a second receiving apparatus. When the first receiving apparatus receives the data from the first transmitting apparatus, the interference may occur due to the data received from the second transmitting apparatus. Similarly, when the second receiving apparatus receives the data from the second transmitting apparatus, the interference may occur due to the data received from the first transmitting apparatus. Due to the interference, the first receiving apparatus and the second receiving apparatus may not properly receive the data.

To solve these problems, methods for allowing each apparatus to efficiently access resources are required. In particular, in a band (for example, unlicensed band, TV white space, etc.) sharing and using the frequency, a frequency access management method based on frequency provisions for operation in the corresponding frequency is required. The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for efficiently allocating and using radio resources.

Further, the present invention has been made in an effort to provide a method and an apparatus for efficiently managing allocation and use of radio resources.

Further, the present invention has been made in an effort to provide a method and an apparatus for efficiently managing and controlling wireless transmission by managing allocation and use of radio resources.

Further, the present invention has been made in an effort to provide a method and an apparatus for efficiently accessing radio resources.

An exemplary embodiment of the present invention provides a method for transmitting, by a transmitter, a first data having periodicity through a channel of an unlicensed band. The method includes: adjusting at least one of transmission timing of the first data and clear channel assessment (CCA) timing for the channel to occupy the channel; determining whether the channel is occupied by performing the CCA on the channel at the CCA timing; and when it is determined that the channel is occupied, transmitting the first data through the channel at the transmission timing of the first data.

The adjusting may include: adjusting a transmission offset for the transmission timing of the first data so that the transmission timing of the first data does not overlap with timing when other apparatuses transmit the data having the periodicity through the channel.

The determining may include: continuously performing the CCA on the channel until the channel is occupied, independent of the transmission offset for the transmission timing of the first data.

The transmitting may include: transmitting the first data at the timing when the channel is occupied, not timing when the first data is scheduled to be transmitted; and informing a receiver receiving the first data that the first data is transmitted at timing different from the scheduled timing.

The adjusting may include: when the first data is not transmitted within a previous transmission period for the first data, configuring the CCA timing to be timing earlier than timing when the CCA starts within the previous transmission period by a predetermined value.

The configuring of the CCA timing may include: when a sum of a first duration between the transmission timing of the first data defined by the transmission offset for the first data and timing when the CCA ends and a second duration for the transmission of the first data exceeds a limited occupation time for the channel, configuring the CCA timing to be the timing when the CCA starts within the previous transmission period.

The transmitting may include: when the channel is occupied, transmitting a special signal through the channel to prevent other apparatuses from occupying the channel, from the timing when the CCA ends to the transmission timing of the first data.

The method may further include: when the first data is successfully transmitted through the channel, configuring the CCA timing for a subsequent transmission period so that the CCA ends before the transmission timing of the first data defined by the transmission offset of the first data within the subsequent transmission period for the first data.

The transmitter may be a base station and the first data may be a discovery signal (DRS).

The transmitter may be a terminal and the first data may be an uplink signal transmitted to the base station.

Another embodiment of the present invention provides a method for transmitting, by a transmitter, a first data having periodicity and a second data having aperiodicity through a channel of an unlicensed band. The method includes: adjusting at least one of first clear channel assessment (CCA) for transmission of the first data, second CCA for transmission of the second data, and transmission of the second data, in consideration of a limited occupation time for the channel; and when the channel is occupied through at least one of the first CCA and the second CCA, transmitting the first data through the channel at first timing defined by a transmission offset of the first data.

The method may further include: prior to the adjusting, transmitting the second data through the channel when the channel is occupied through the second CCA.

The adjusting may include: early ending the transmission of the second data to secure a duration in which the first CCA is performed.

The adjusting includes: omitting the first CCA when the channel is occupied through the second CCA.

The transmitting may include: transmitting the first data and the second data through the channel occupied through the second CCA.

The adjusting includes: omitting the second CCA when the channel is occupied through the first CCA.

The transmitting may include: transmitting the first data and then transmitting the second data, through the channel occupied through the first CCA.

The adjusting includes: when a time interval between timing when the second data is transmitted and the first timing is equal to or less than a predetermined value, delaying the timing of the second CCA to after the timing when the first data is transmitted.

Yet another embodiment of the present invention provides a method for transmitting, by a transmitter, a first data having periodicity and a second data having aperiodicity through a channel of an unlicensed band. The method may include: adjusting at least one of a first duration in which a clear channel assessment (CCA) for transmission of the first data is performed, a second duration in which the CCA for transmission of the second data is performed, and a transmission period length of the first data to increase channel occupation possibility for transmission of the first data; performing the CCA during the first duration; and transmitting the first data through the channel when the channel is occupied through the CCA.

The adjusting may include: reducing at least one of the number of CCA unit times for the first duration and a length of the CCA unit time; and determining the first duration by multiplying the number of CCA unit times by the length of the CCA unit time.

The adjusting may include: configuring a first range as a range of values included in the number of CCA unit times for the first duration to be smaller than a second range as a range of values included in the number of CCA unit times for the second duration; and determining the first duration by multiplying the number of CCA unit times selected within the first range by a length of the CCA unit time for the first duration.

The adjusting may include: reducing or maintaining the first range as the range of the values included in the number of CCA unit times for the first duration and increasing the second range as the range of the values included in the number of CCA unit times for the second duration, when the first data is not transmitted within a previous transmission period for the first data; selecting the number of CCA unit times for the first duration within the first range; and determining the first duration by multiplying the selected number of CCA unit times by the length of the CCA unit time for the first duration.

The adjusting may include: reducing the transmission period length of the first data, when the first data is not transmitted within the previous transmission period for the first data.

BRIEF DESCRIPTION OF THE DRAWINGS

FIG. 6 is a diagram illustrating a method for allocating resource using an enhanced physical downlink control channel (EPDCCH) when a frame based equipment (FBE) method is used, according to an exemplary embodiment of the present invention.

FIG. 7 is a diagram illustrating a method for allocating resources using an EPDCCH when a load based equipment (LBE) method is used, according to another exemplary embodiment of the present invention.

FIG. 42 is a diagram illustrating a method for using a reference signal as the special signal according to an exemplary embodiment of the present invention.

FIGS. 44A, 44B, and 44C are diagrams illustrating a method for transmitting the special signal in some region of a subframe according to another exemplary embodiment of the present invention.

DETAILED DESCRIPTION OF THE EMBODIMENTS

Figure 1:
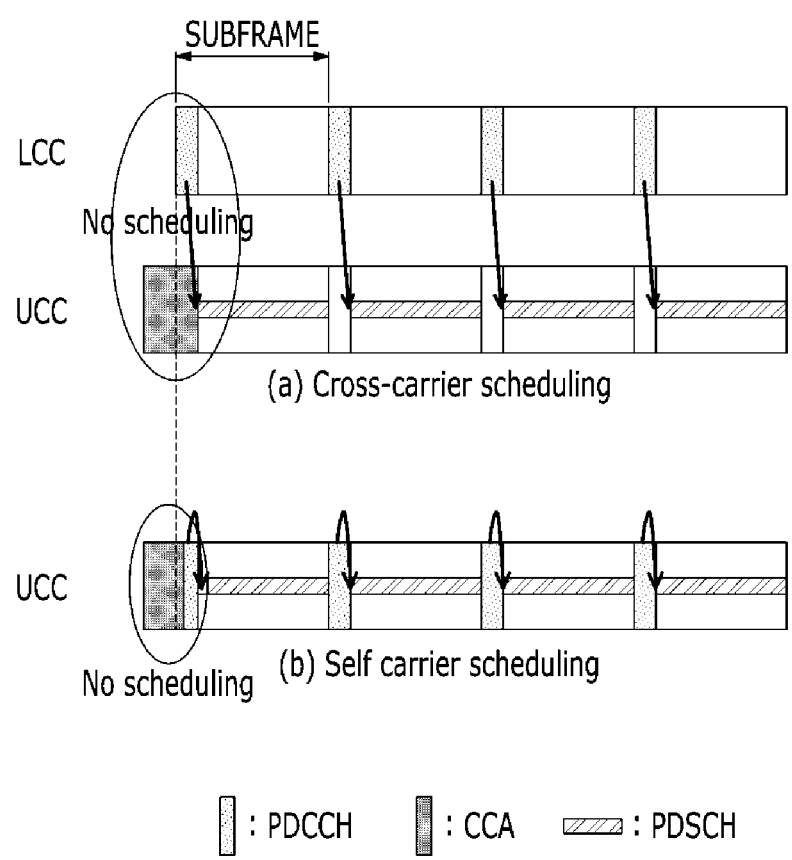
FIG. 1 is a diagram illustrating a problem of resource allocation occurring due to clear channel assessment (CCA) for channel occupation, when a frequency of an unlicensed band is operated.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may be called a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may also include all or some of the functions of the MT, the MS, the AMS, the HR-MS, the SS, the PSS, the AT, the UE, and the like Further, a base station (BS) may be called an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, a repeater, a macro base station, a small base station, and the like and may also include functions of all or some of the ABS, the HR-BS, the nodeB, the eNodeB, the AP, the RAS, the BTS, the MMR-BS, the RS, the HR-RS, the repeater, the macro base station, the small base station, and the like, 1. Method for Managing Allocation and Use of Radio Resource Hereinafter, for convenience of explanation, under the environment that a carrier (or channel) is aggregated, a carrier operated in a licensed band is called a licensed component carrier (LCC) and a carrier operated in an unlicensed band is called as an unlicensed component carrier (UCC). Hereinafter, for convenience of explanation, the carrier operated by a primary cell (PCell) among the LCC is referred to as a primary LCC (P-LCC) and the carrier operated by a secondary cell (SCell) among the LCC is called a secondary LCC (S-LCC). Meanwhile, when the UCC and the LCC have a difference only in a frequency band, the UCC may be operated by the PCell. In this case, the operating method of the UCC may be the same as or similar to the operating method of the LCC. Hereinafter, it is assumed that the UCC is operated only by the SCell or is operated by the restrictive PCell. Meanwhile, the plurality of UCCs may be configured in a single SCell or may be operated by a single SCell, but hereinafter, for convenience of explanation, it is assumed that the single UCC is used. Further, the method for the case in which the single UCC is used may be identically or similarly applied to even the case in which the plurality of UCCs are used.

FIG. 1 is a diagram illustrating a problem of resource allocation occurring due to clear channel assessment (CCA) for channel occupation, when a frequency of an unlicensed band is operated. In FIG. 1, it is assumed that the unlicensed band frequency is operated by carrier aggregation, as an supplemental carrier or the SCell for the licensed band frequency. In detail, (a) of FIG. 1 illustrates the case in which the base station uses a physical downlink control channel (PDCCH) of the LCC to schedule (cross-carrier scheduling) a physical downlink shared channel (PDSCH) of the UCC. (b) of (a) of of FIG. 1 illustrates the case in which the base station uses the PDCCH of the UCC to schedule (self carrier scheduling) the PDSCH of the UCC.

The base station performs the CCA to access an unlicensed band channel as the supplemental carrier depending on regulatory requirements of the unlicensed band frequency. As illustrated in (a) and (b) of FIG. 1, the base station occupies the channel through the CCA, but may not normally allocate resources since CCA performance timing and PDCCH transmission timing overlap with each other due to characteristics of the LTE system performing the allocation and transmission of the resource by a subframe unit.

In particular, considering the characteristics of the unlicensed band, devices operated in the unlicensed band may be used by occupying the channel. In this case, there are a coexisting restriction between the devices operated in the unlicensed band and an operating restriction in the unlicensed band. Therefore, a carrier aggregation technology considering the characteristics of the licensed band and the unlicensed band and an operating method thereof are required.

1.1. Basic Operation for Data Transmission Through Licensed/Unlicensed Band

A data transmission operation using the licensed/unlicensed band may be basically performed by the LCC and the UCC, and therefore data may be transmitted or received between the base station and the terminal through the LCC and the UCC. In particular, in the case of the terminal, data may be transmitted/received through the LCC and may be received through the UCC. In the case of the initial access of the terminal to the base station, in the case of performing a cell change (handover), or in the case of attempting data exchange through the unlicensed band, the base station exchanges the terminal capability with the terminal.

The terminal holds at least one of the following five capabilities and may perform data exchange.

- Data transmission/reception only through the licensed band
- Simultaneous data transmission through the licensed/unlicensed band
- No simultaneous data transmission through the licensed/unlicensed band (for example, data transmission through the licensed band at a specific instant and data transmission through the unlicensed band at other instants in time)

Simultaneous data reception through the licensed/unlicensed band

No simultaneous data reception through the licensed/unlicensed band (for example, data reception through the licensed band at a specific instant and data reception through the unlicensed band at other instants in time)

As another method for exchanging terminal capability, there is a method for transmitting, by an apparatus (for example, base station for providing a service of a previous cell or apparatus for managing the base station) storing terminal capability, the terminal capability to a base station providing a service in a new cell when the terminal changes a cell. According to the method, the capability exchange between the base station and the terminal may be omitted.

Further, the base station exchanges the channel through which data may be transmitted/received among several channels (frequencies) of the unlicensed band with the terminal to enable the terminal not to transmit the data through a channel through which the data may not be transmitted/received or are hard to be transmitted/received while the data service is provided and enable the terminal to prevent an operations (for example, handover, cell search, channel quality measurement/report, and the like) for a data service from being performed. In detail, if the base station informs the terminal of a service possible channel among the channels in the unlicensed band, the terminal may measure a quality of the service possible channel and report the measured quality of the service possible channel to the base station. By doing so, the base station may select a channel suitable for the data service and serve the selected channel to the terminal. In this case, the base station and the terminal may continuously transmit data by performing data aggregation newly adding a carrier or a carrier change changing (or, adding, deleting a previous channel) to the selected channel. If the channel which may provide services to terminal is a carrier managed by other base stations, not by the current base station, the terminal may change to the cell managing the corresponding carrier to continuously receive the data service.

1.2. Deployment Scenario for Data Transmission Through Licensed/Unlicensed Band

Figure 2A:
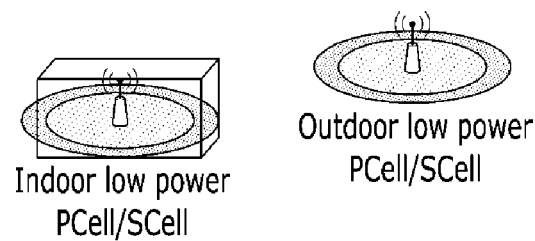
FIGS. 2A, 2B, and 2C are diagrams illustrating a license assisted access (LAA) deployment scenario according to an exemplary embodiment of the present invention.
Figure 2B:
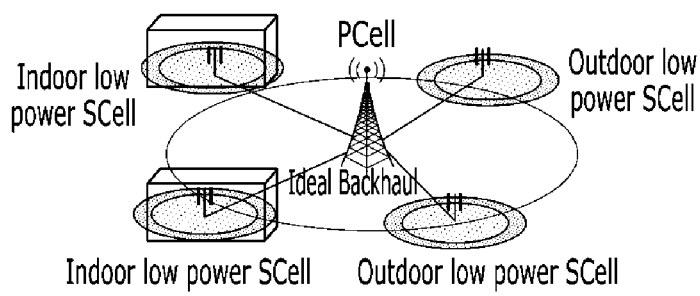
Figure 2C:
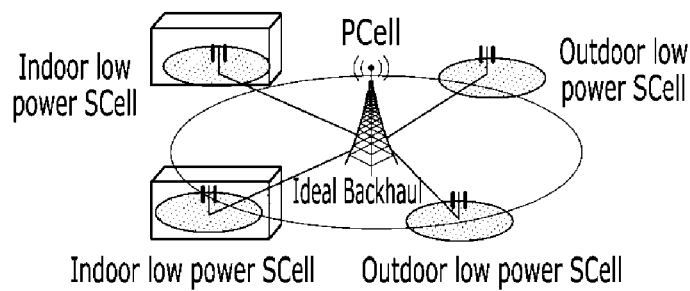

FIGS. 2A to 2C are diagrams illustrating a license assisted access (LAA) deployment scenario according to an exemplary embodiment of the present invention. FIGS. 2B and 2C illustrate the case in which the PCell and a low power SCell (for example, small cell) are connected to each other though an ideal backhaul. However, even when the PCell and the low power SCell are connected to each other through a non-ideal backhaul, the PCell and the low power SCell may be deployed similarly to LAA deployment scenarios 2a, 2b, 3a, and 3b illustrated in FIGS. 2B and 2C.

FIG. 2A illustrates LAA deployment scenarios 1a and 1b. In the LAA deployment scenario 1a, the low power PCell or the low power SCell is deployed outdoors. In the LAA deployment scenario 1b, the low power PCell or the low power SCell is deployed indoors. In the LAA deployment scenarios 1a and 1b, the low power PCell or SCell may use licensed band frequencies F1 and F2 or an unlicensed band frequency F3.

FIG. 2B illustrates the LAA deployment scenarios 2a and 2b. In the LAA deployment scenario 2a, the low power SCell may be deployed outdoors and in the LAA deployment scenario 2b, the low power SCell may be deployed indoors. In the LAA deployment scenarios 2a and 2b, the SCell may use the same frequency as the licensed band frequency F1 used by the PCell, another licensed band frequency F2, or the unlicensed band frequency F3.

FIG. 2C illustrates the LAA deployment scenarios 3a and 3b. In the LAA deployment scenario 3a, the low power SCell may be deployed outdoors and in the LAA deployment scenario 3b, the low power SCell may be deployed indoors. In the LAA deployment scenarios 3a and 3b, the SCell may use the unlicensed band frequency F3 different from the licensed band frequency F1 used by the PCell.

1.3. Operation of LCC and UCC for Data Transmission Through Licensed/Unlicensed Band The following Table 1 illustrates the operating method of the LCC and the UCC according to the LAA deployment scenario.

TABLE 1

Operations of LCC and UCC according to LAA deployment scenario of FIGS. 2A to 2C

| LAA Development scenario | Indoor/Outdoor | Relevant LTE CA scenarios | Carrier configures | Co-located | Note |
|---|---|---|---|---|---|
| Scenario 1a | Outdoor (small cell scenario 2a) | LTE CA scenarios 2, 3 in low power cell | Low power Cell (L + U) | LCC and UCC are co-located | LTE CA is configured in low power cell |
| Scenario 1b | Indoor (small cell scenario 2b) | | | | PCell and SCell are configured in a single low power cell (co-located PCell and SCell) UCC is configured to SCell P-LCC is configured to PCell if S-LCC is configured (P-LCC + S-LCC + UCC), S-LCC is configured in to SCell |

TABLE 1-continued

Operations of LCC and UCC according to LAA deployment scenario of FIGS. 2A to 2C

| LAA Development scenario | Indoor/Outdoor | Relevant LTE CA scenarios | Carrier configures | Co-located | Note |
|---|---|---|---|---|---|
| Scenario 2a | Outdoor (small cell scenario 2a) | LTE CA scenarios 4, 5 between PCell and SCell with IB LTE CA scenarios 2, 3 in low power SCell | PCell (L) + low power SCell (L + U) with IB | S-LCC and UCC are co-located | LTE CA is configured in PCell and low power SCell with ideal backhaul (non-co-located PCell and SCell) S-LCC and UCC are configured in a single low power SCell |
| Scenario 2b | Indoor (small cell scenario 2b) | | | | |
| Scenario 3a | Outdoor (small cell scenario 2a) | LTE CA scenarios 4, 5 between PCell and SCell with IB | PCell (L) + low power SCell (U) with IB | (P-)LCC and UCC are non-co-located | CA is configured in PCell and low power SCell with ideal backhaul (non-co-located PCell and SCell) LCC is only configured in a PCell UCC is only configured in a single low power SCell |
| Scenario 3b | Indoor (small cell scenario 2b) | | | | |

In the LAA deployment scenarios 1a, 2a, and 3a, the UCC is used by the apparatus (for example, base station) operated by being deployed outdoors. In the LAA deployment scenarios 1b, 2b, and 3b, the UCC is used by the apparatus (for example, base station) operated by being deployed indoors.

The LAA deployment scenarios 1a and 1b allow the PCell and the SCell to be deployed co-locately each other and operated. The LAA deployment scenarios 2a, 2b, 3a, and 3b are operated by allowing the PCell and the SCell not to be deployed co-locately each other and the PCell and the SCell are connected to each other through the ideal backhaul.

Since the LAA deployment scenarios 1a and 1b are operated by allowing the PCell and the SCell to be co-locately deployed at the same location (there is a difference only in the fact that the PCell and the SCell are deployed outdoors or indoors), the LCC and the UCC are configured in the same apparatus. Upon configuring two or more LCCs, at least one of the two or more LCCs may be configured in the PCell and at least one of the rest LCCs may be configured in the SCell or may not be configured in the SCell.

The case in which the LAA deployment scenarios 2a and 2b are operated by configuring the LCC and the UCC in the SCell is described. If the PCell and the SCell are connected to each other through the non-ideal backhaul, the LCC may be configured as a primary SCell (pSCell or a special SCell).

The case in which the LAA deployment scenarios 3a and 3b is operated by configuring only the UCC in the SCell is described.

FIGS. 3A to 3D are diagrams illustrating methods for allocating resources and methods for transmitting data when the licensed band carrier (LCC) and the unlicensed band carrier (UCC) are aggregated, according to an exemplary embodiment of the present invention. In detail, FIGS. 3A to 3D illustrate methods for allocating and transmitting downlink/uplink resources depending on the LCC and the UCC. Unless specially mentioned, the exemplary embodiment of the present invention uses terms or methods operated/used in an LTE CA. The terms or the methods may be replaced by terms or methods operated/used for the same purpose as or a similar purpose to the use purpose of the LTE CA in other wireless access systems or mobile communication systems.

As described above, due to the restriction of the unlicensed band, the unlicensed band may be usefully used in a service for downlink data. However, when for the downlink data transmitted from the base station to the terminal, the terminal intends to transmit reliable uplink data (for example, hybrid automatic retransmit reQuest (HARQ) acknowledge (ACK)/negative acknowledge (NACK), channel quality indicator (CQI)) to the base station, the terminal may transmit the reliable uplink data to the base station through more reliable P-LCC (LCC on PCell) than the UCC. Alternatively, when the base station and the terminal intend to change a service operating channel during the unlicensed band operation, if the terminal searches for other channels of the unlicensed band, not the currently operated channel, to report channel states (for example, channel identifier, whether a channel is used, interference or power intensity upon the use of the channel, etc.) to the base station, the terminal may transmit (report) the channel state to the base station through the more reliable P-LCC than the UCC. For this purpose, the base station may use the method for allocating resources and the method for transmitting resources as in the following Table 2 to indicate (or allocate, schedule) resource allocation information of the uplink/downlink data.

TABLE 2

Scenarios for method for allocating and transmitting uplink/downlink resources depending on LCC and UCC

| LAA scheduling alternative | DL(Downlink) service | | UL(Uplink) service | |
|---|---|---|---|---|
| | LCC (DL) | UCC (DL) | UL relevant LCC DL | UL relevant UCC DL |
| Scenario 1 | DL-self scheduling (scheduled by LCC) | DL-self scheduling (scheduled by UCC) | indicated by LCC | indicated by UCC |
| Scenario 2 | DL-self scheduling (scheduled by LCC) | DL cross-carrier scheduling (scheduled by LCC) | indicated by LCC | indicated by LCC |
| Scenario 3 | DL cross-carrier scheduling (scheduled by UCC) | DL cross-carrier scheduling (scheduled by LCC) | indicated by UCC | indicated by LCC |
| Scenario 4 | DL cross-carrier scheduling (scheduled by UCC) | DL-self scheduling (scheduled by UCC) | indicated by UCC | indicated by UCC |

Figure 3A:
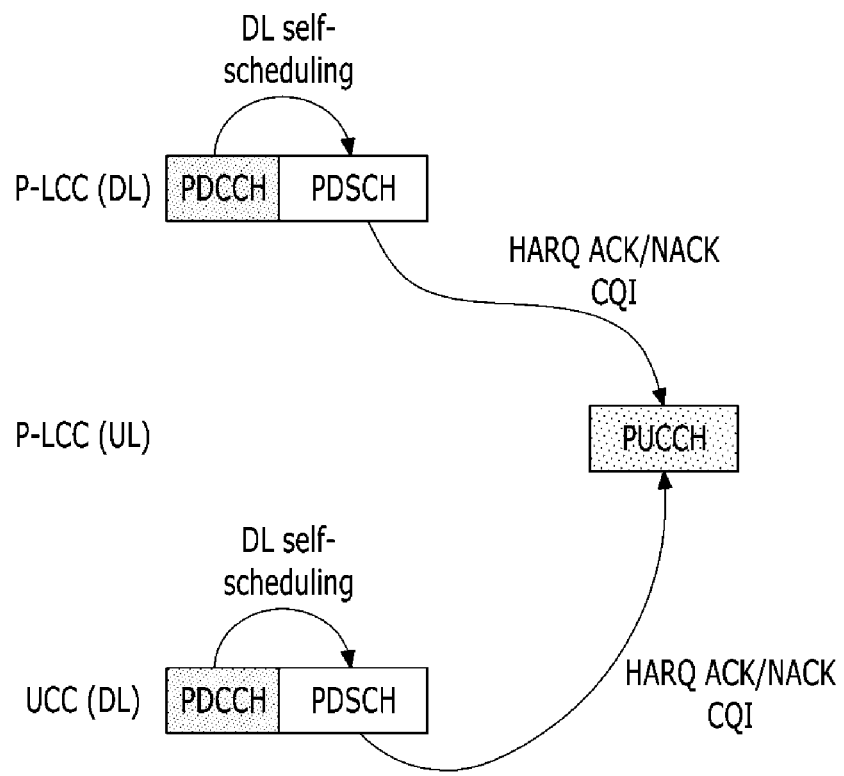
FIGS. 3A, 3B, 3C, and 3D are diagrams illustrating a method for allocating resources and a method for transmitting data when a licensed band carrier and an unlicensed band carrier are aggregated, according to an exemplary embodiment of the present invention.

FIG. 3A illustrates LAA scheduling scenario 1 (LAA scheduling alternative 1). Self carrier scheduling is performed on a downlink P-LCC and a downlink UCC, respectively and an uplink feedback (for example, HARQ ACK/NACK, CQI) is transmitted through a physical uplink control channel (PUCCH) of an uplink P-LCC. In detail, resource allocation information of the downlink data allocated to the LCC and resource allocation information of the uplink data for a downlink data service are indicated through a resource allocation information channel (for example, channel indicating resource allocation information, including the resource allocation information such as PDCCH and EPDCCH; hereinafter, the PDCCH will be described as an example) of the same LCC. Resource allocation information of the downlink data allocated to the UCC and resource allocation information of the uplink data for the downlink data service are indicated through the PDCCH of the same UCC. Further, unless specially mentioned, the resource indicated by the resource allocation information may be at least one of the uplink resource and the downlink resource and an exemplary embodiment of the present invention will be described under the assumption that the uplink resource is transmitted through the PUSCH (or PUCCH) and the downlink resource is transmitted through the PDSCH. Hereinafter, the PUSCH (or PUCCH) or the uplink resource may be applied to a portion described as the PDSCH or the downlink resources.

Figure 3B:
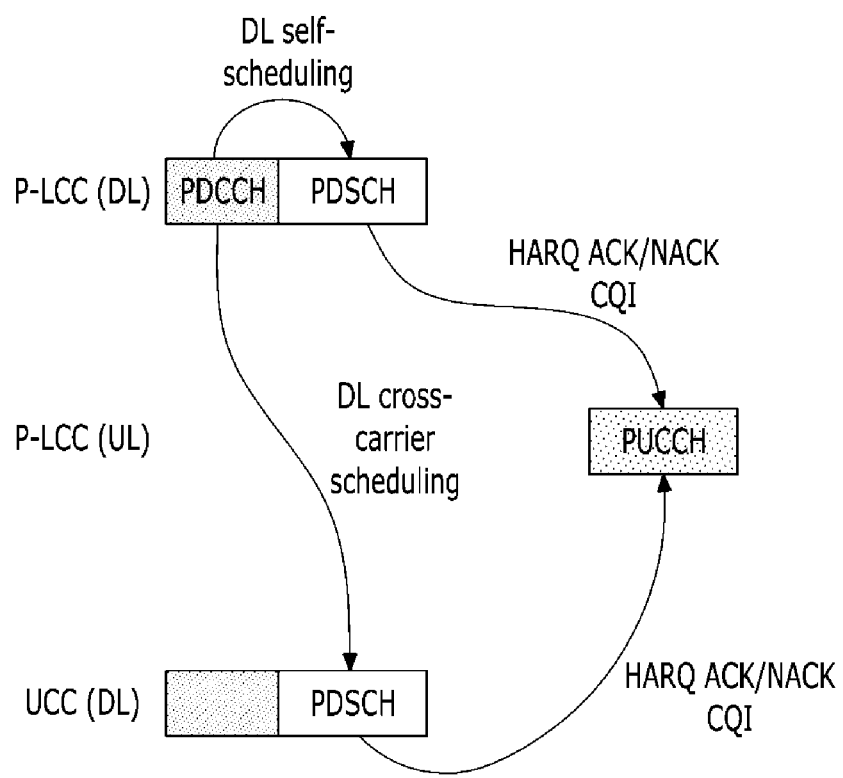

FIG. 3B illustrates LAA scheduling scenario 2 (LAA scheduling alternative 2). The self carrier scheduling is performed on the downlink P-LCC and cross-carrier scheduling is performed on the downlink UCC by the P-LCC. The uplink feedback (for example, HARQ ACK/NACK, CQI) is transmitted through the PUCCH of the uplink P-LCC. In detail, the resource allocation information of the downlink data allocated to the LCC and the resource allocation information of the uplink data for the downlink data service are indicated through the PDCCH that is the resource allocation information channel of the LCC. The resource allocation information of the downlink data allocated to the UCC and the resource allocation information of the uplink data for the downlink data service are indicated through the PDCCH of the LCC.

Figure 3C:
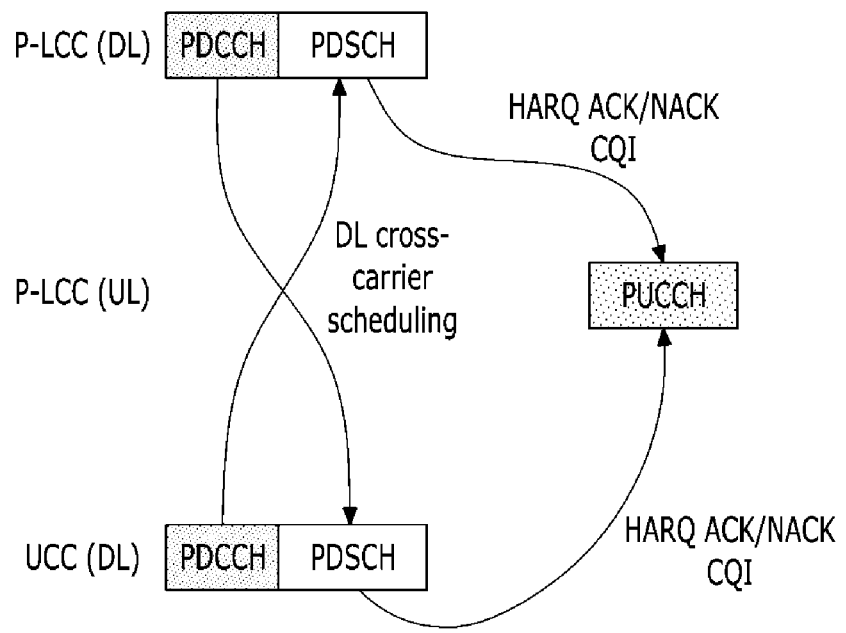

FIG. 3C illustrates LAA scheduling scenario 3 (LAA scheduling alternative 3). The cross-carrier scheduling is performed on the downlink P-LCC by the UCC and the cross-carrier scheduling is performed on the downlink UCC by the P-LCC. The uplink feedback (for example, HARQ ACK/NACK, CQI) is transmitted through the PUCCH of the uplink P-LCC. In detail, the resource allocation information of the downlink data allocated to the LCC and the resource allocation information of the uplink data for the downlink data service are indicated through the PDCCH that is the resource allocation information channel of the UCC. The resource allocation information of the downlink data allocated to the UCC and the resource allocation information of the uplink data for the downlink data service are indicated through the PDCCH of the LCC.

Figure 3D:
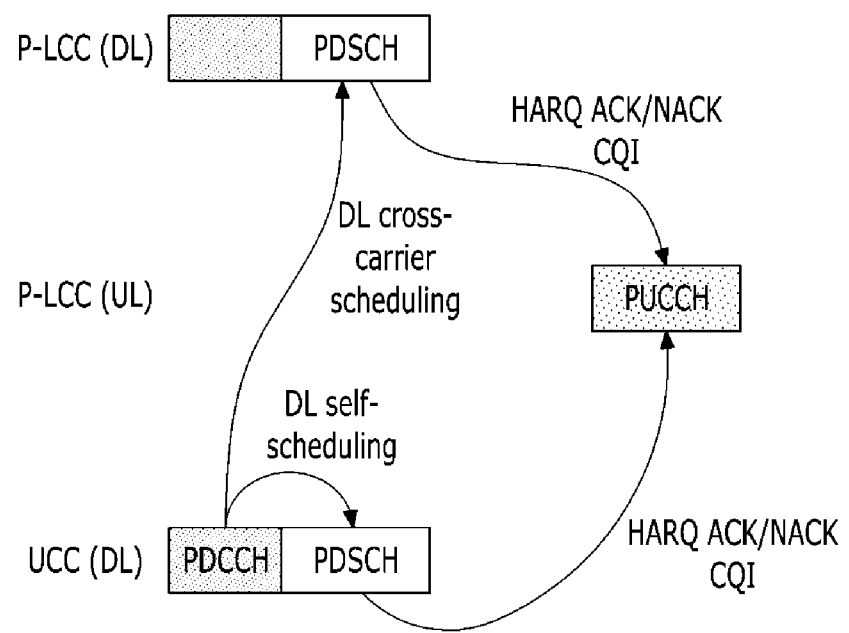

FIG. 3D illustrates LAA scheduling scenario 4 (LAA scheduling alternative 4). The cross-carrier scheduling is performed on the downlink P-LCC by the UCC and the self scheduling is performed on the downlink UCC. The uplink feedback (for example, HARQ ACK/NACK, CQI) is transmitted through the PUCCH of the uplink P-LCC. In detail, the resource allocation information of the downlink data allocated to the LCC and the resource allocation information of the uplink data for the downlink data service are indicated through the PDCCH that is the resource allocation information channel of the UCC. The resource allocation information of the downlink data allocated to the UCC and the resource allocation information of the uplink data for the downlink data service are indicated through the PDCCH of the UCC.

Figure 4A:
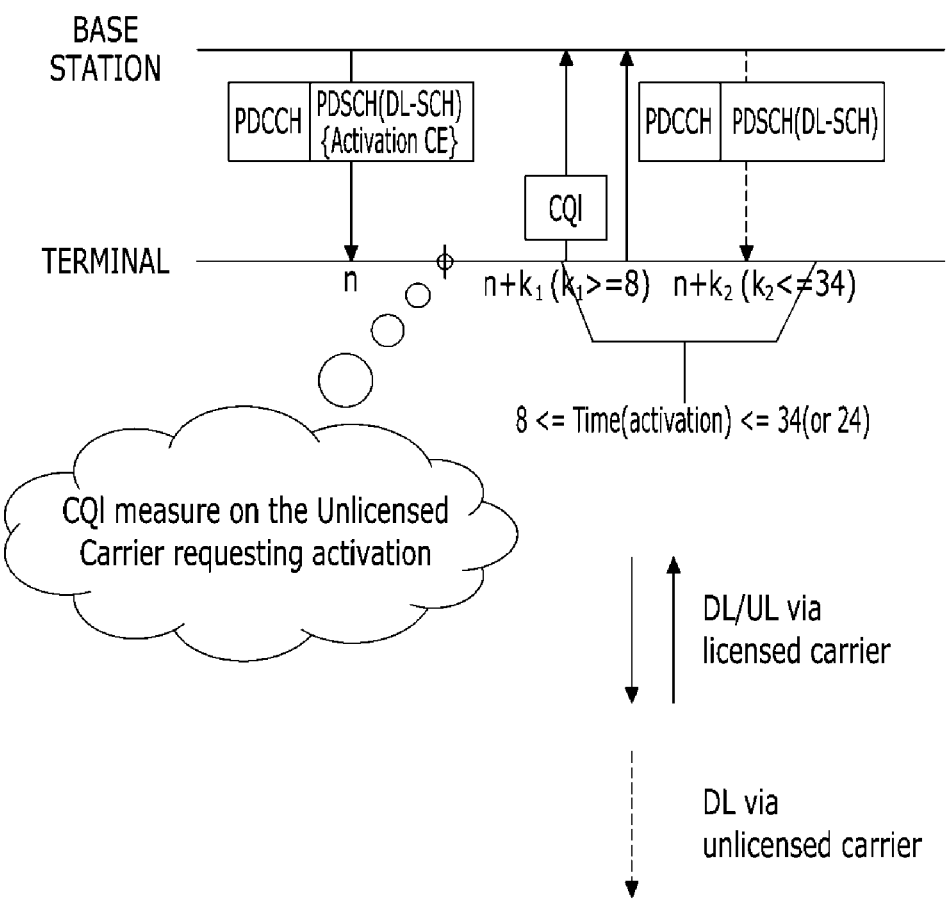
FIGS. 4A and 4B are diagrams illustrating a method for activating and deactivating a carrier when the licensed band carrier and the unlicensed band carrier are aggregated, according to an exemplary embodiment of the present invention.
Figure 4B:
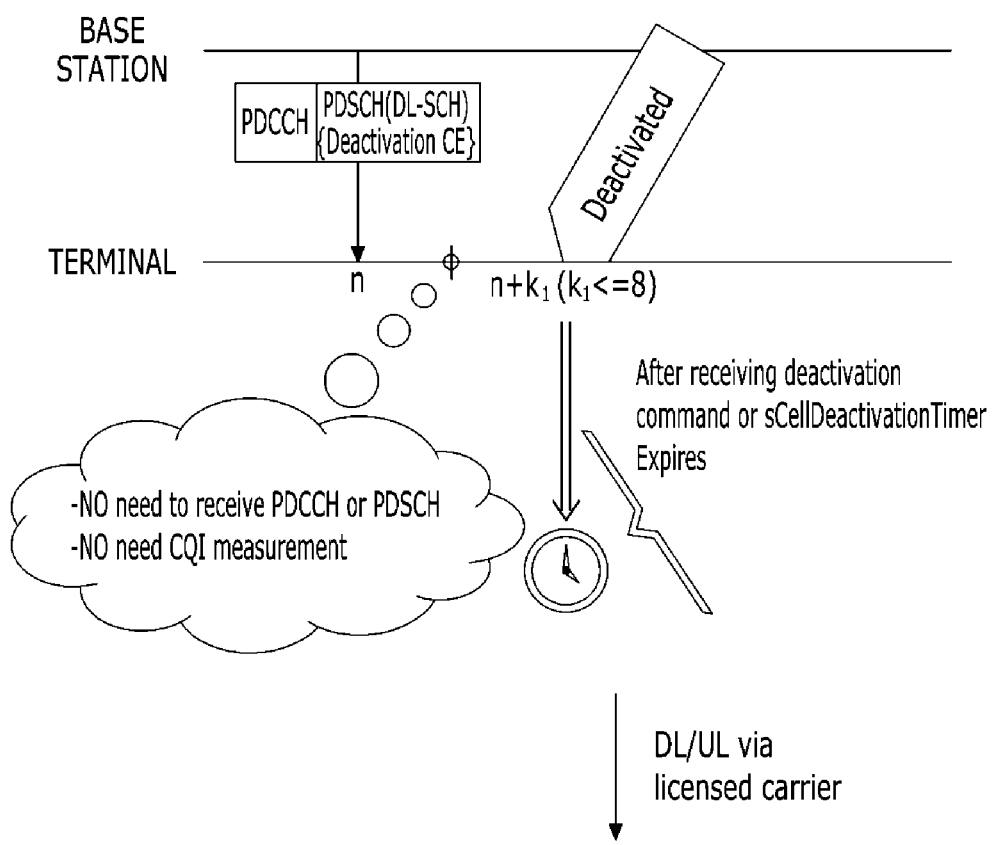

FIGS. 4A and 4B illustrate a method for activating or deactivating an unlicensed band carrier in the licensed band service for the scenario operation proposed in FIGS. 3A to 3D and the above Table 2. In detail, FIG. 4A illustrates the method for activating an unlicensed band carrier under the environment that the licensed band carrier (LCC) and the unlicensed band carrier (UCC) are aggregated and FIG. 4B illustrates the method for deactivating an unlicensed band carrier. FIGS. 4A and 4B illustrate the case in which the activation and the deactivation of the unlicensed band are controlled by the licensed band, which is only an example. Further, the activation and the deactivation of the unlicensed band may also be controlled by other unlicensed bands (for example, when the downlink data are transmitted through other unlicensed bands).

Depending on the above-mentioned scenarios, the control for activation and deactivation is performed by the licensed band. In detail, as illustrated in FIG. 4A, the base station transmits an activation command for the UCC to the terminal through the LCC at timing n. When receiving the activation command from the base station, the terminal measures the channel state of the UCC indicated by the activation command (or activation control element (CE)). When measuring the channel state of the UCC, the terminal reports the measured results (for example, channel state information (CSI) report) to the base station through the LCC. Here, the CSI includes CQI, precoding matrix indicator (PMI), rank indicator (RI), procedure transaction Identity (PTI), etc. Further, the HARQ ACK/NACK for data reception may be transmitted through the LCC. Meanwhile, the UCC corresponding to the activation command is activated between timing $n+k_1$ when $k_1$ (however, 8 (ms)$\leq k_1$ or predetermined time or longer) time elapses and timing $n+k_2$ when $k_2$ (however, $k_2 \leq 34$ (ms), $k_2 \leq 24$ (ms) or predetermined time or shorter) time elapses from timing n when the activation command is transmitted. After the UCC is activated, the base station transmits the downlink data to the terminal through the activated UCC.

As illustrated in FIG. 4B, the UCC may be deactivated by the control through the LCC. In detail, the base station transmits the deactivation command (or, deactivation CE) for the UCC to the terminal through the LCC at timing n. The terminal does not have to receive the downlink channel (for example, PDCCH, PDSCH, EPDCCH, etc.) for the UCC indicated by the deactivation command and does not have to measure the channel state of the UCC indicated by the deactivation command. Meanwhile, the UCC corresponding to the deactivation command is deactivated at timing $n+k_1$ when the $k_1$ (however, $k_1 \leq 8$ (ms) or predetermined time or shorter) time elapses from timing n when the deactivation command is transmitted or timing when an sCellDeactivationTimer timer expires. Here, the sCellDeactivationTimer timer starts at the timing n when the activation command is transmitted in FIG. 4A.

Meanwhile, when the carrier is changed similarly to the method for activating/deactivating a carrier, the carrier may be managed by the following method. In detail, the base station may deactivate (by deactivation CE) a previous carrier and then activate (by activation CE) a new carrier. Alternatively, the base station may activate (by activation CE) the new carrier and then deactivate (by deactivation CE) the previous carrier. Alternatively, the base station may activate (by activation CE) the new carrier and deactive (by deactivation CE) the previous carrier at the same time. For example, when the base station performs the activation and the deactivation at the same time, if a value mapped to the previously activated carrier is reset from 1 to 0, the activated carrier is deactivated, if a value previously configured for activation/deactivation is configured to be 1 from 0, the carrier is activated, and if the value configured for activation/deactivation is maintained at 1 without being changed, the activated carrier may be continuously used. Further, if the value configured for the activation/deactivation is maintained at 0 without being changed, the base station does not activate the deactivated carrier.

1.4. Solution of Coexistence and Interference in Unlicensed Band

To solve the interference occurring when the devices of homogeneous/heterogeneous system operated in the unlicensed band coexist, the following method may be used.

1.4.1. Method for Efficiently Selecting Channel

For the plurality of apparatuses not to use the co-channel within the unlicensed band, each apparatus may select a channel among idle channels (channel determined not to be used by other devices) upon selecting the operating channel or select the channel having the smallest interference among the channels as the operating channel based on the interference measured by the base station or the terminal.

1.4.2. Method for Efficiently Using Resource in Co-Channel

The apparatus may access resources through a method (CCA) for determining whether to access resources proposed in unlicensed band operation regulatory requirement.

Alternatively, the apparatus may prevent other apparatuses from using resources during the service. In detail, while occupying channels for a service, an apparatus continuously provides a service to prevent other apparatuses from occupying the corresponding channel. Alternatively, to prevent other apparatuses from occupying the corresponding channel when an apparatus does not serve data while occupying the channel, data or a reference signal for energy detection of the other apparatuses may also be transmitted.

Alternatively, an apparatus may provide a service only in a specific duration (or part) and other apparatuses may provide a service in the rest duration (or part). For example, an apparatus may provide a service only in a DL duration of a TDD frame. Alternatively, an apparatus may divide a channel into a discontinuous transmission (DTX) on/off durations to provide a service only in the DTX on duration. Alternatively, an apparatus may reuse a value configured for a multicast broadcast single frequency network (MBSFN) to provide a service only in the part which is not configured as the MBSFN. Alternatively, an apparatus may allow other apparatuses to provide a service in the part configured as the MBSFN, or the apparatus itself may also provide a service only in the part that is configured as the MBSFN. Alternatively, an apparatus may also be operated to perform different configuration in the parts configured as the MBSFN and the parts that is not configured as the MBSFN, respectively, thereby allowing the parts configured as the MBSFN and the parts that is not configured as the MBSFN to simultaneously serve at least one or two methods. Alternatively, the apparatus may also use an almost blank subframe (ABC) (service only in a specific subframe) scheme for an inter-cell interference coordination (ICIC). Further, the apparatus may also be operated by performing the same or different configuration in each duration divided as described above to allow the divided durations to provide the same or similar service.

1.5. Allocation and Use of Resource for Unlicensed Band Operation

Meanwhile, FIGS. 5A to 5E illustrate a frame structure when the licensed band carrier (LCC) and the unlicensed band carrier (UCC) are aggregated, according to an exemplary embodiment of the present invention.

Figure 5A:
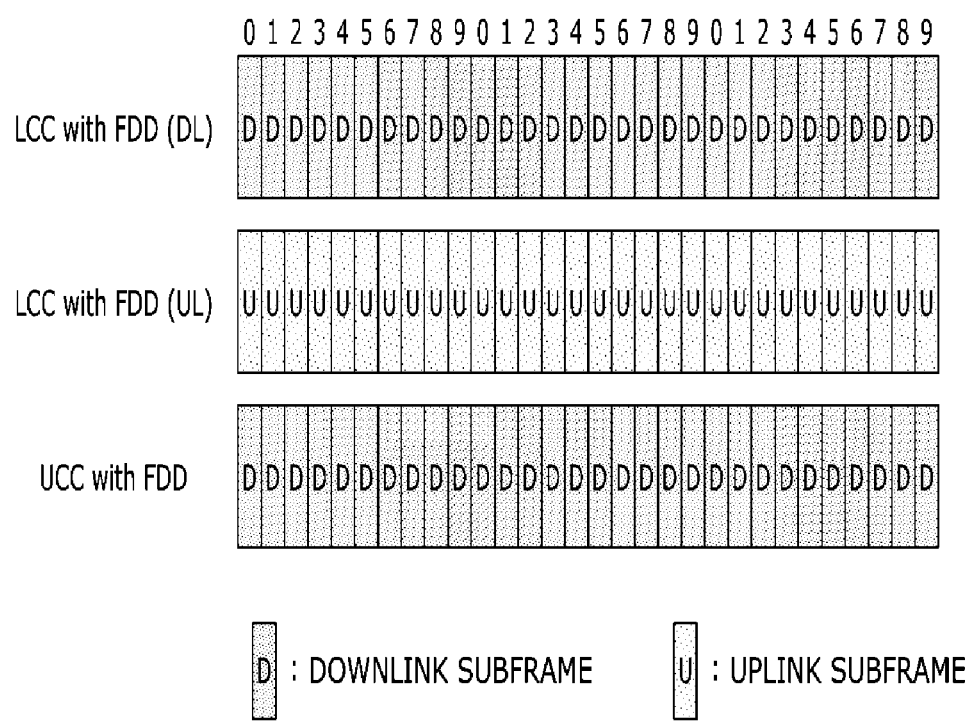
FIGS. 5A, 5B, 5C, 5D, and 5E are diagrams illustrating a frame structure depending on the carrier aggregation between the licensed band carrier and the unlicensed band carrier, according to an exemplary embodiment of the present invention.

FIG. 5A illustrates the frame structures for each carrier depending on the aggregation between LCC-FDD (licensed band carrier operated as FDD) and UCC-FDD (unlicensed band carrier operated as FDD).

Figure 5B:
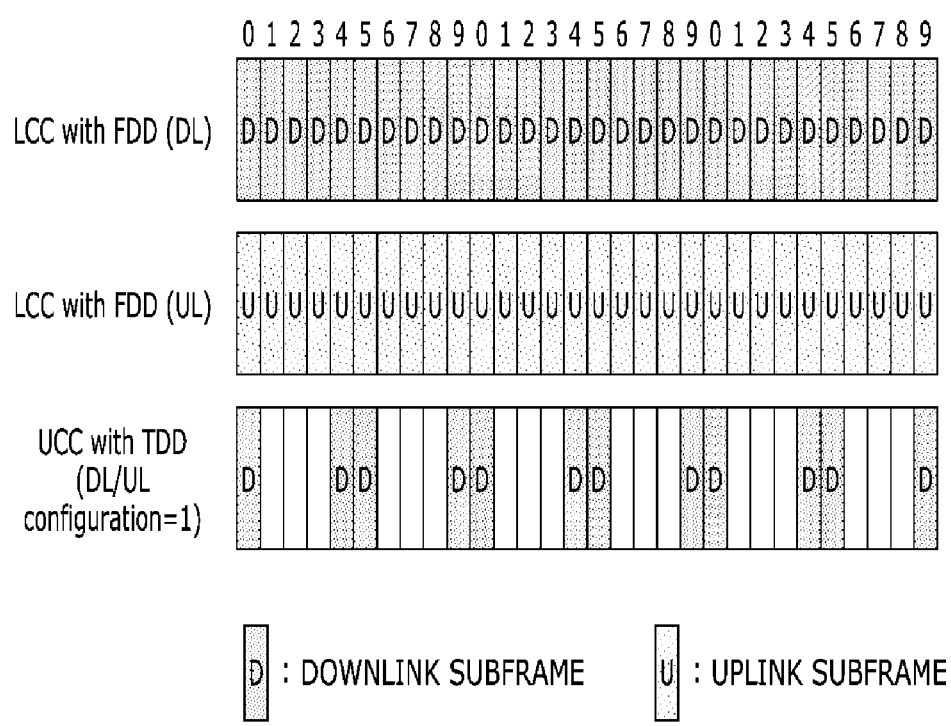

FIG. 5B illustrates the frame structures for each carrier depending on the aggregation between the LCC-FDD and the UCC-TDD (unlicensed band carrier operated as TDD). FIG. 5B illustrates the case in which DL/UL configuration 1 is applied to the UCC-TDD.

Figure 5C:
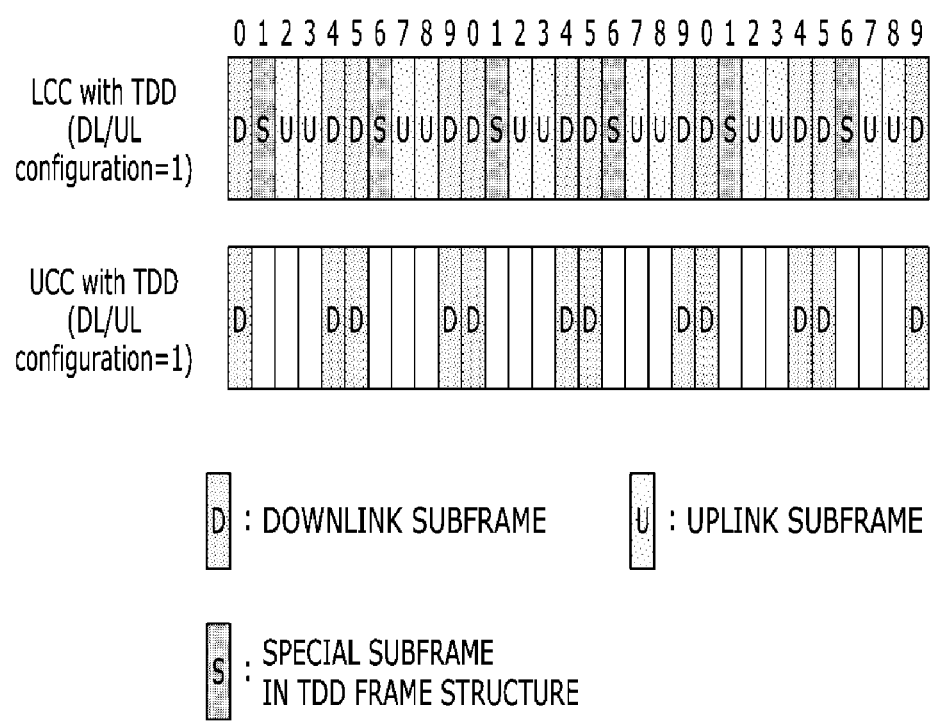

FIG. 5C illustrates the frame structures for each carrier depending on the aggregation between the LCC-TDD (licensed band carrier operated as TDD) and the UCC-TDD. FIG. 5C illustrates the case in which the DL/UL configuration 1 is applied to the LCC-TDD and the UCC-TDD.

Figure 5D:
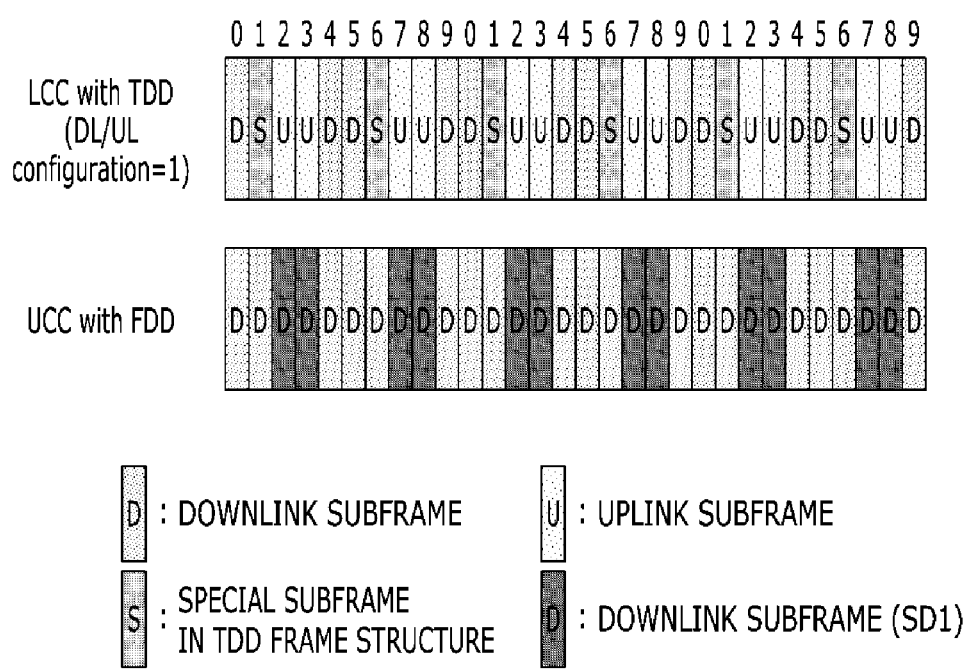

FIG. 5D illustrates the frame structures for each carrier depending on the aggregation between the LCC-TDD and the UCC-FDD. FIG. 5D illustrates the case in which DL/UL configuration 1 is applied to the LCC-TDD.

Figure 5E:
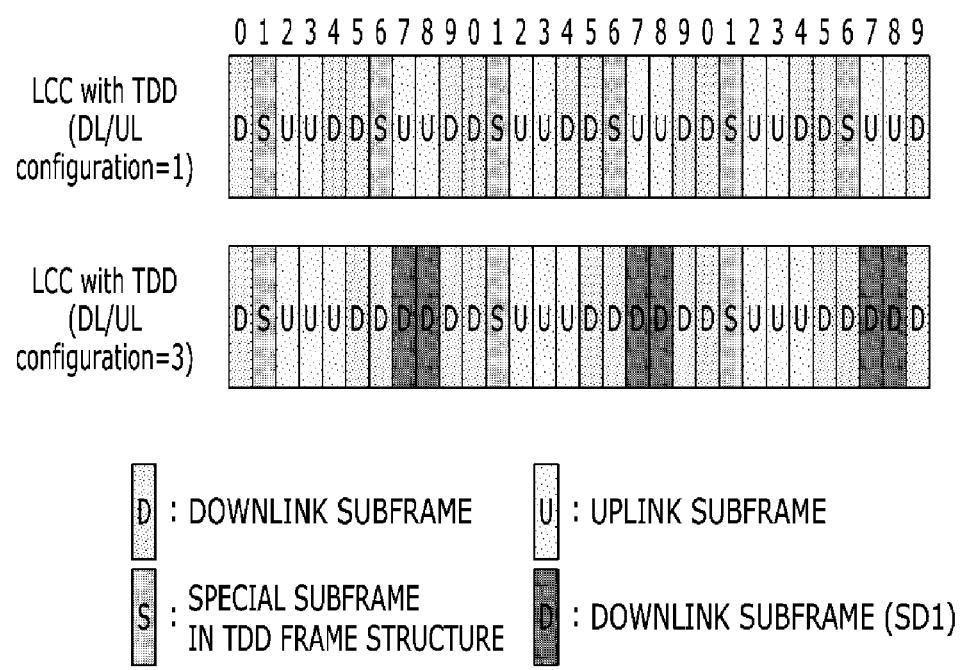

FIG. 5E illustrates the frame structures for each carrier depending on the aggregation between the LCC-TDD and the UCC-TDD. FIG. 5E illustrates the case in which the DL/UL configuration 1 is applied to the LCC-TDD and DU/UL configuration 3 is applied to the UCC-TDD.

Meanwhile, when the carriers are aggregated as illustrated FIGS. 5D and 5E according to the scenarios described in FIG. 3 and the above Table 2, if the subframe of the licensed band is an uplink subframe and the subframe of the unlicensed band is a downlink subframe SD1, DL cross-carrier scheduling to allocate resources of the UCC through the LCC may not be used. A method for performing DL cross-carrier scheduling is required. One of the methods for performing DL cross-carrier scheduling is a method for aggregating carriers of a licensed band and an unlicensed band with the same frame structure (for example, LCC-FDD+UCC-FDD or LCC-TDD+UCC-TDD to which the same DU/UL configuration is applied) as illustrated in FIG. 5A. Another one of the methods for performing DL cross-carrier scheduling is a method for performing subframe muting not to serve the downlink subframe of the corresponding UCC, when the DL/UL configuration is different each other and the UCC provides the downlink service at timing corresponding to the uplink subframe of the LCC-TDD. Another one of the methods for performing DL cross-carrier scheduling is a method for aggregating between LCC-FDD and UCC-TDD as illustrated in FIG. 5B. Another one of the methods for performing DL cross-carrier scheduling is a method for applying the same DL/UL configuration to LCC-TDD and UCC-TDD as illustrated in FIG. 5C. As illustrated in FIGS. 5B and 5C, the LCC performing the scheduling on the carrier additionally providing a service to the UCC may be configured as at least downlink carrier. As another method, there is a method allowing an UCC to perform the self carrier scheduling to the same carrier in a duration in which the cross-carrier scheduling from the LCC to the UCC is impossible. As another method, there is a method for allowing UCC to perform self carrier scheduling during all the channel occupation time when some subframe (duration) is a duration in which the cross-carrier scheduling is impossible within the channel occupation time.

The following Table 3 shows another example of the methods for allocating resources for each subframe depending on the carrier aggregation between the LCC and the UCC.

TABLE 3

Scenarios for method for allocating downlink/uplink resources for each subframe depending on LCC and UCC

| | subframe | | |
|---|---|---|---|
| scenarios | P-LCC | UCC | Note |
| Scenario 1 | DL | DL | either cross-carrier scheduling from P-LCC or Self-scheduling on UCC |
| Scenario 2 | DL | UL | self-scheduling only in P-LCC no cross-carrier scheduling from P-LCC (No scheduling UCC) |
| Scenario 3 | UL | DL | self-scheduling only in UCC no cross-carrier scheduling from P-LCC (No scheduling LCC) |
| Scenario 4 | UL | UL | schedules neither LCC nor UCC |

As in the scenario 1 of the above Table 3, when the subframe of the P-LCC is the DL subframe and the subframe of the UCC is the DL subframe, the DL cross-carrier scheduling to allocate the resources of the UCC through the P-LCC or the DL self carrier scheduling to allocate the resources of the UCC through the UCC may be applied.

However, as in the scenario 3 of the above Table 3, when the subframe of the P-LCC is an UL subframe and the subframe of the UCC is the DL subframe providing the downlink data service, the DL cross-carrier scheduling by the P-LCC may not be applied. In this case, for the resource allocation, instead of the DL cross-carrier scheduling, the DL self carrier scheduling allocating the resources of the UCC through the UCC may be used.

As in the scenarios 2 and 4 of the above Table 3, since the subframe of the UCC is the UL subframe, the UCC does not provide the DL service independent of whether the subframe of the P-LCC is the DL subframe or the UL subframe. However, when the LCC is the DL subframe at timing n-k when the uplink resource is allocated to the current subframe n, the uplink resource may be allocated by the cross-carrier scheduling and when the UCC is the DL subframe at the timing n-k when the uplink resource is allocated to the current subframe n, the uplink resource may be allocated by the self carrier scheduling. Meanwhile, as described above, when the LCC is the UL subframe at timing n-k, the resource allocation based on the cross-carrier scheduling is not restricted to be performed or the resource allocation based on the cross-carrier scheduling in the DL subframe may also be performed at n-k-m (here, m is a predetermined value).

1.6. Resource Allocation Considering Characteristics of Resource Occupation Operation (CCA) of Unlicensed Band A method for solving a problem as illustrated in FIG. 1 will be described in detail with reference to FIGS. 6 to 12. In FIGS. 6 to 11, $T_{Frame}$ represents a frame time, $T_{occupancy}$ represents the channel occupation time, $T_{ide}$ represents the channel idle time, and $T_{CCA}$ represents the CCA time.

FIGS. 6 and 7 illustrate a method for indicating data allocation information through a PDCCH and an enhanced physical downlink control channel (EPDCCH) when the resources of the unlicensed band are allocated. In detail, FIG. 6 illustrates a method for allocating resources using the enhanced physical downlink control channel (EPDCCH) when a frame based equipment (FBE) method is used. (a) of FIG. 6 illustrates the case in which the cross-carrier scheduling is performed and (b) of FIG. 6 illustrates the case in which the self carrier scheduling is performed. FIG. 7 is a diagram illustrating a method for allocating resources using the EPDCCH when a load based equipment (LBE) method is used. The CCA illustrated in FIG. 7 is the CCA performed by the LBE method, in which an extended CCA may be additionally performed on the initial CCA. (a) of FIG. 7 illustrates the case in which the cross-carrier scheduling is performed and (b) of FIG. 7 illustrates the case in which the self carrier scheduling is performed.

Figure 8:
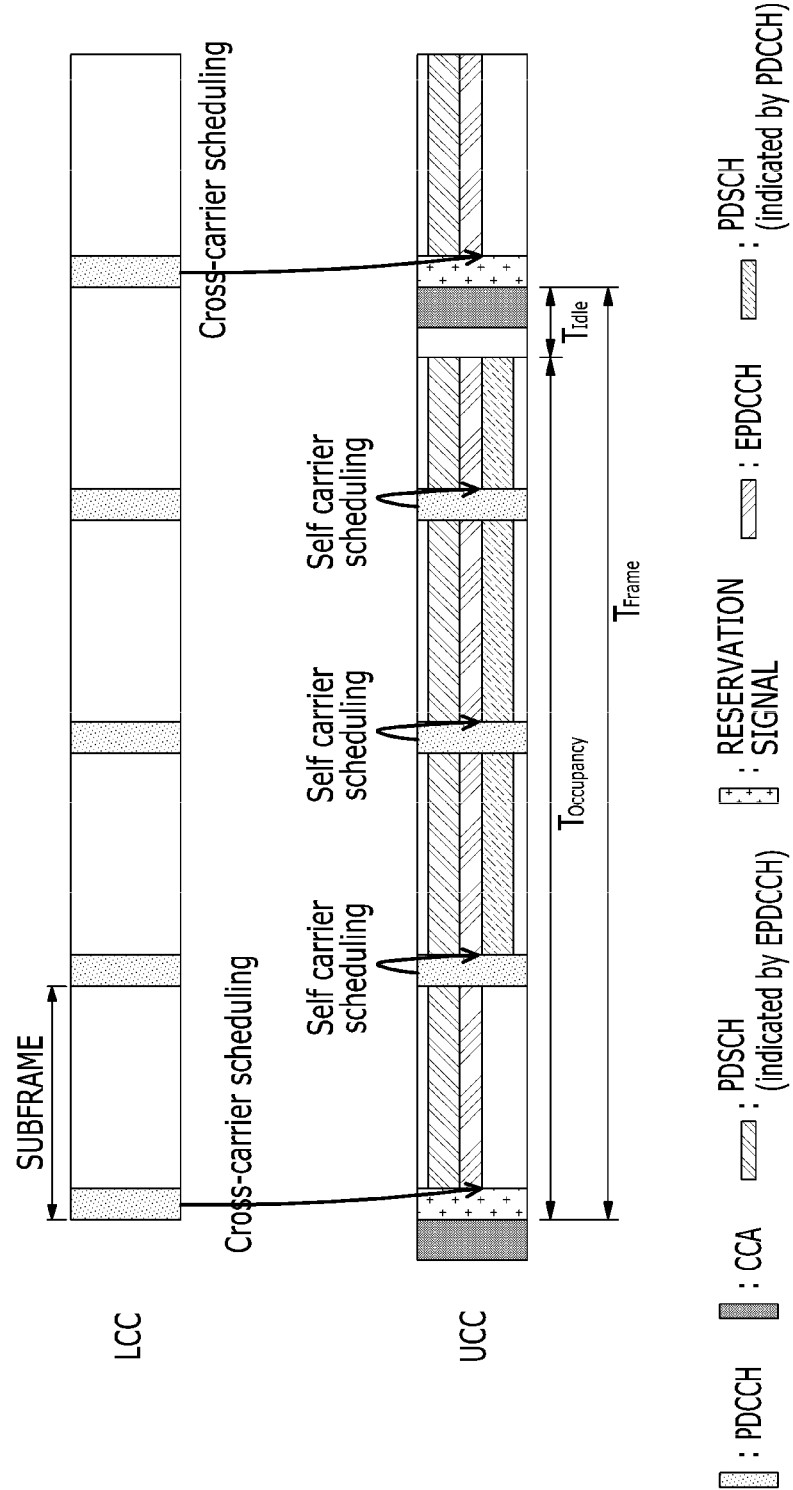
FIG. 8 is a diagram illustrating a method for allocating resources using the EPDCCH, according to another exemplary embodiment of the present invention.

FIG. 8 is a diagram illustrating another method for allocating resources using the EPDCCH. In detail, in the exemplary embodiment of FIG. 8, the base station performs the cross-carrier scheduling at the CCA timing and performs the self carrier scheduling during the subsequent channel occupation time. Meanwhile, the CCA illustrated in FIG. 8 is the CCA performed by the FBE method or the LBE method, and in particular, when the LBE method is used, the extended CCA may also be performed.

Figure 9:
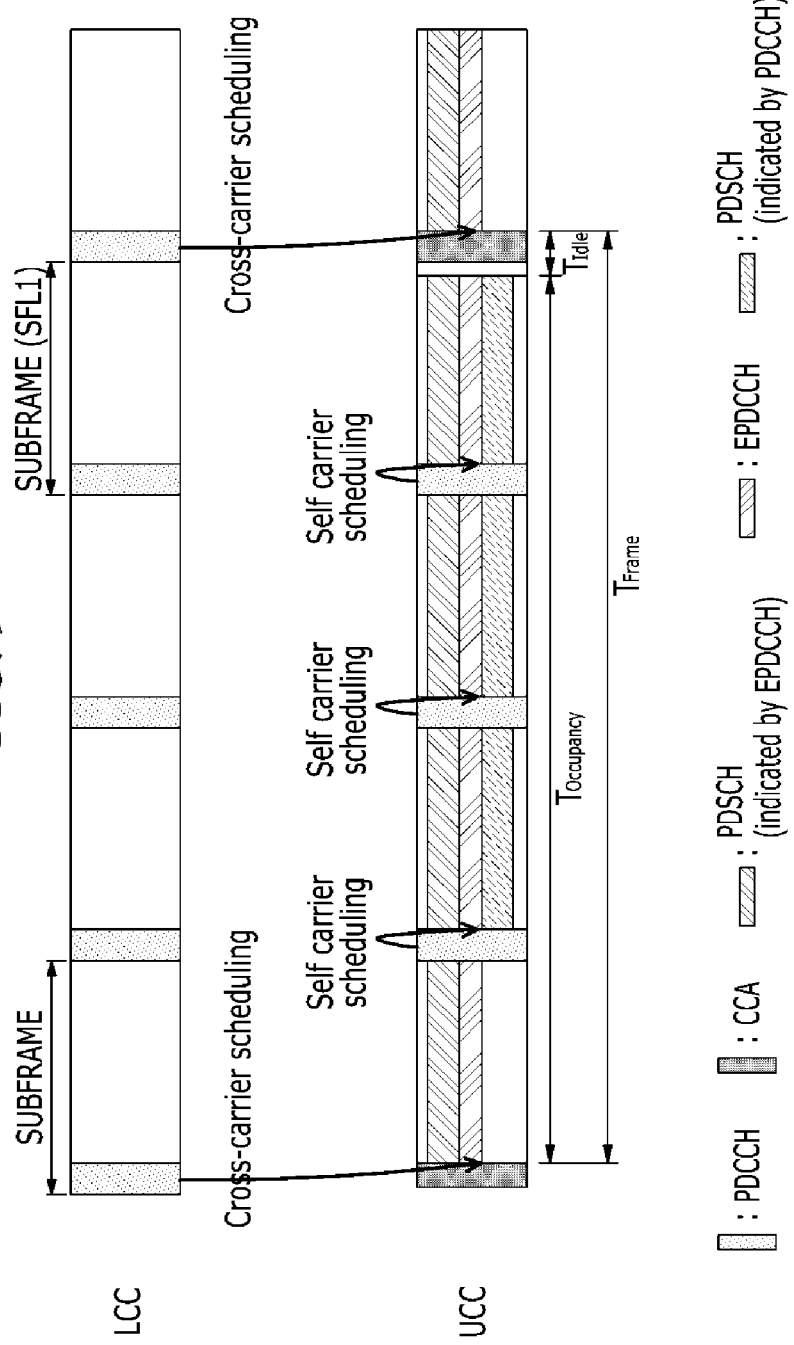
FIG. 9 is a diagram illustrating the method for allocating resources using the EPDCCH, according to another exemplary embodiment of the present invention.

FIG. 9 is a diagram illustrating another method for allocating resources using the EPDCCH. In detail, in the exemplary embodiment of FIG. 9, the base station performs the cross-carrier scheduling at the CCA timing and performs the self carrier scheduling during the subsequent channel occupation time. Meanwhile, the CCA timing illustrated in FIG. 9 is PDCCH transmission timing. The CCA illustrated in FIG. 9 is the CCA performed by the FBE method or the LBE method, and in particular, when the LBE method is used, the extended CCA may also be performed.

As illustrated in (a) of FIG. 6 and (a) of FIG. 7, when the resources are allocated by the cross-carrier scheduling method, the base station transmits the PDCCH through the licensed band carrier (LCC) to indicate the EPDCCH of the unlicensed band carrier (UCC). Alternatively, instead of the method allowing the base station to directly indicate the EPDCCH through the PDDCH, the EPDCCH is predefined (or pre-configured), such that the terminal expects the EPDCCH transmission through the resources predefined (configured) by the base station without indication from the base station (indication through the PDCCH) and the operation for receiving the predefined (configured) resources may also be performed (hereinafter, 'reception method through predefined EPDCCH'). Meanwhile, the EPDCCH indicates the data transmission (PDSCH). In this case, even if the ending timing of the CCA overlaps with the PDCCH transmission timing at timing when the CCA is performed, if the CCA ends prior to the EPDCCH transmission timing, the base station may transmit the PDCCH through the LCC and the terminal may receive the PDCCH and may be ready to receive the EPDCCH and PDSCH of the UCC that are expected to be transmitted.

As the results of allowing the base station to perform the CCA on the UCC, since the channel is busy by other apparatuses, the case in which the channel is not occupied (or used) will be described. The base station may not transmit data (for example, PDCCH, EPDCCH, PDSCH, etc.) through the UCC, and therefore the base station in a first subframe after the CCA transmits only the PDCCH through the LCC and does not transmit data (for example, EPDCCH, PDSCH, etc.) through the UCC. The base station does not include the information indicating the EPDCCH or the resource allocations (PDSCH, PUSCH) of the corresponding UCC in the PDCCH before the subsequent CCA starts. Meanwhile, in the reception method through the predefined EPDCCH, the terminal may determine that the channel is occupied (or used) by the serving base station when at least EPDCCH is received properly, perform the operation for receiving the PDSCH in the resources indicated by the EPDCCH, and determine that the channel is used by other apparatuses when the EPDCCH is not received properly.

As the result of allowing the base station to perform the CCA, the channel is usable and thus the case in which the channel is occupied/used will be described. The base station transmits the PDCCH through the LCC for the channel occupation time $T_{occupancy}$ after the CCA to indicate the EPDCCH transmitted through the UCC. The EPDCCH transmitted through the UCC indicates the PDSCH, including the data (PDSCH) allocation information of the corresponding subframe. Meanwhile, in the reception method through the predefined EPDCCH, the terminal may determine that the channel is occupied (or used) by the serving base station when at least EPDCCH is received properly, perform the operation for receiving the PDSCH in the resources indicated by the EPDCCH, and determine that the channel is used by other apparatuses when the EPDCCH is not received properly.

Meanwhile, upon the application of the method, since the data transmission is not made through the UCC for the time (for example, the least 1 OFDM symbol, the maximum 4 OFDM symbols) corresponding to the PDCCH transmitted through the LCC, to prevent other apparatuses from using the corresponding channel for the corresponding time, the base station may transmit a reservation signal. By doing so, as the result of CCA, other apparatuses determine that the corresponding channel is busy or occupied. To this end, the following methods may be used.

The base station may include the PDCCH information transmitted through the LCC in the reservation signal and transmit the reservation signal. By doing so, the PDCCH including the same information may be transmitted through the LCC and the UCC.

Alternatively, as illustrated in (b) of FIG. 6, the base station may also terminate the CCA prior to transmitting the PDCCH to perform the self carrier scheduling on the UCC. By doing so, the base station may allocate the resources of the UCC. Meanwhile, when allocating the resources of the UCC using the self carrier scheduling, the base station may omit the EPDCCH and directly indicate the resource allocation information (for example, PDSCH) through the PDCCH.

Alternatively, as illustrated in FIG. 8, the base station performs the cross-carrier scheduling through the LCC at the timing when the CCA is performed to allocate the resources of the UCC and may also perform the self carrier scheduling through the UCC in the subsequent subframe or the subsequent channel occupation time $T_{occupancy}$ to allocate the resources of the UCC. Meanwhile, when allocating the resources of the UCC using the self carrier scheduling, the base station may omit the EPDCCH and directly indicate the resource allocation information (for example, PDSCH) through the PDCCH. Meanwhile, as illustrated in FIG. 9, instead of the CCA timing defined as timing before the PDCCH transmission (before subframe), the CCA timing may also be defined as the timing when the PDCCH is transmitted. According to the exemplary embodiment of FIG. 9, it is possible to improve resource use efficiency for a final subframe SFL1 of the channel occupation time $T_{occupancy}$.

Alternatively, the base station may also transmit the reservation signal when the channel is idle. The terminal receiving the reservation signal determines that the corresponding channel is being occupied (or busy) by its own serving base station to perform the operations (receiving PDCCH, EPDCCH, PDSCH, etc.) for receiving data.

Meanwhile, when intending to inform the terminal of the CCA result, the base station may use the method illustrated in FIG. 8. The terminal determines the UCC that is expected to transmit data through the PDCCH of the LCC and is ready to receive the data for the corresponding UCC. In this case, the terminal may appreciate that the CCA is performed on the corresponding UCC and that the data may be transmitted through the corresponding UCC. As the result of CCA, if the corresponding channel is occupied (or used), the base station transmits the EPDCCH and the PDSCH through the UCC. As the CCA result, if the corresponding channel is occupied (or used) by other apparatuses, the base station may not transmit data such as EPDCCH and PDSCH through the corresponding UCC, such that the terminal fails in receiving the data. The terminal failing in receiving data may recognize that the CCA result, that is, the channel is busy by other apparatuses (channel is busy or occupied). Even when the base station changes the UCC to allocate/transmit resources, the base station may change a carrier to a new UCC through the carrier identification information (including information on the previous UCC and information on the new UCC) included in the PDCCH. The base station may perform operations of selecting a carrier to be newly changed, transmitting and receiving data, searching for and measuring a channel, etc.

Figure 10:
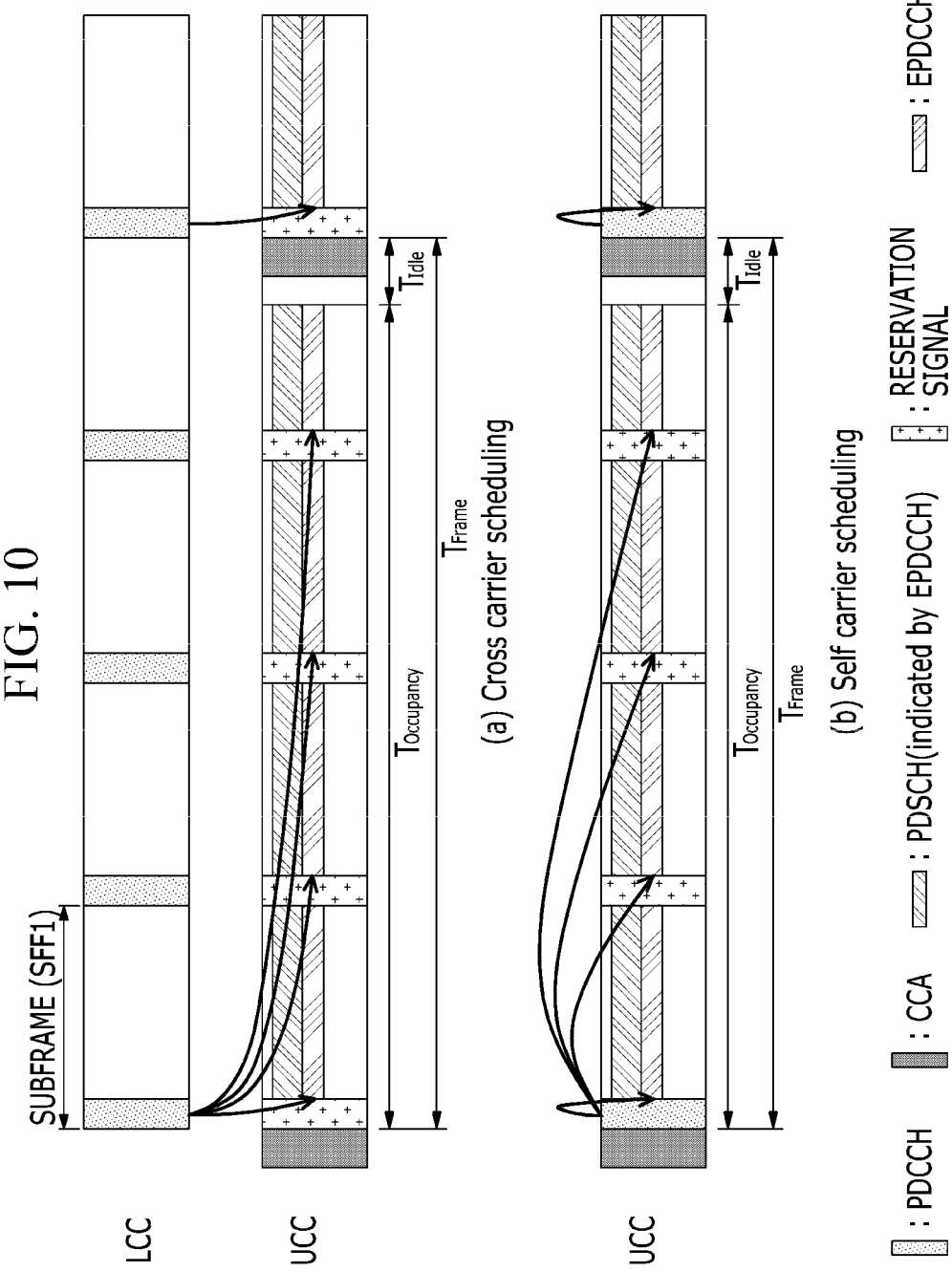
FIG. 10 is a diagram illustrating a method for allocating resources for a multi subframe according to an exemplary embodiment of the present invention.
Figure 11:
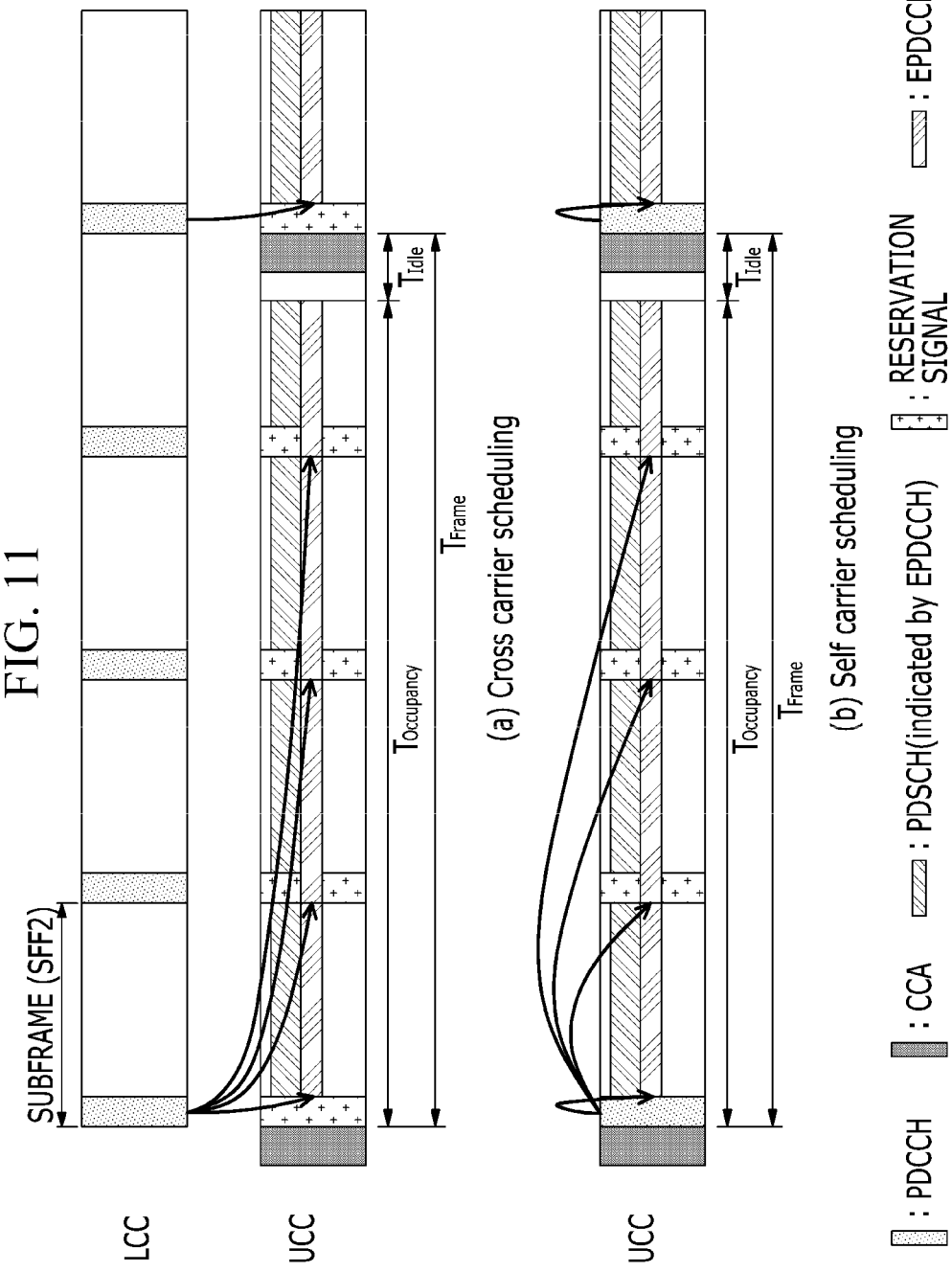
FIG. 11 is a diagram illustrating a method for allocating resources for a multi subframe according to another exemplary embodiment of the present invention.
Figure 12:
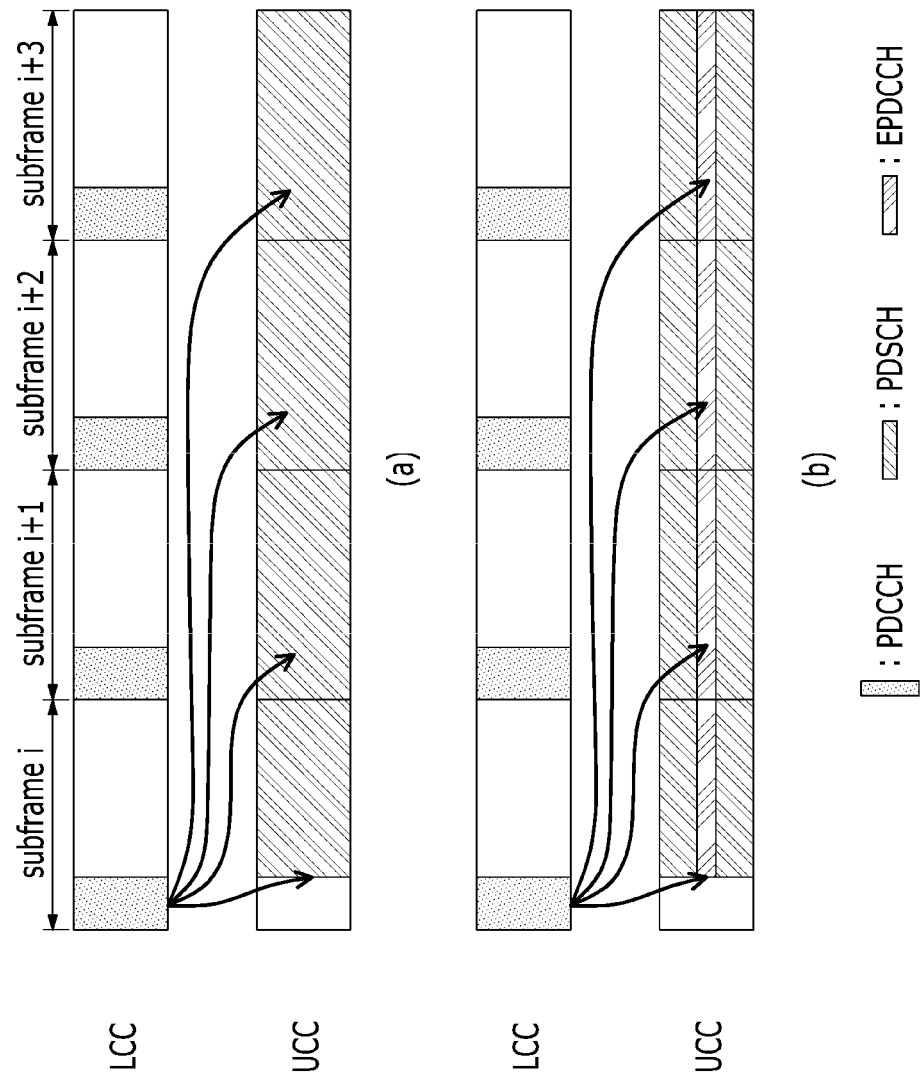
FIG. 12 is a diagram illustrating a method for allocating resources for a multi subframe according to another exemplary embodiment of the present invention.

FIGS. 10 to 12 are diagrams illustrating a method for allocating resources for a multi subframe or a multi transmission time interval (TTI), according to an exemplary embodiment of the present invention. (a) of in detail, (a) of FIG. 10 illustrates the case in which the cross-carrier scheduling is performed and (b) of FIG. 10 illustrates the case in which the self carrier scheduling is performed. (a) of FIG. 11 illustrates the case in which the cross-carrier scheduling is performed and (b) of FIG. 11 illustrates the case in which the self carrier scheduling is performed. (a) and (b) of FIG. 12 illustrate the case in which the cross-carrier scheduling is performed.

FIG. 10 illustrates a method for performing scheduling for the channel occupation time $T_{occupancy}$ in a first subframe SFF1 after the CCA if the base station determines that the channel is occupied (or used), as the CCA result. The base station may omit the PDCCH transmission in the final (or predetermined) subframe from a second subframe after the CCA. That is, the base station may perform the scheduling on the plurality of subframes belonging to the channel occupation time $T_{occupancy}$ of the UCC in one subframe SFF1 to allocate and use resources.

Meanwhile, as illustrated in FIG. 11, the base station may also use a resource region for reservation signal transmission to transmit the EPDCCH, in a subframe after a first subframe SFF2 among the subframes belonging to the channel occupation time $T_{occupancy}$ of the UCC. That is, the difference between the exemplary embodiment of FIG. 10 and the exemplary embodiment of FIG. 11 is up to which range the base station uses the EPDCCH region of the UCC.

Meanwhile, as illustrated in (b) of FIG. 12, the base station may also transmit the data (PDSCH) in the rest region other than the EPDCCH region among the resource region of a subframe (subframe i–i+3) belonging to the channel occupation time of the UCC. Alternatively, as illustrated in (a) of FIG. 12, the base station may also transmit only the data (PDSCH) without the EPDCCH region among the resource region of a subframe (subframe i–i+3) belonging to the channel occupation time of the UCC. That is, the difference between the exemplary embodiment of FIG. 11 and the exemplary embodiment of FIG. 12 is up to which range the base station uses the PDSCH region of the UCC.

1.7. Configuration and Transmission of Subframe Shorter than 1 ms

According to the regulatory requirement of the unlicensed band frequency, the CCA is basically performed for channel access/occupation/use for data transmission. The CCA is hardly performed to be suited for a subframe unit that is a basic operation unit of the LTE. Further, transmitting data to be suited for the subframe within the channel occupation time (COT) causes a waste of occupation resources by the maximum 1/COT.

Figure 13A:
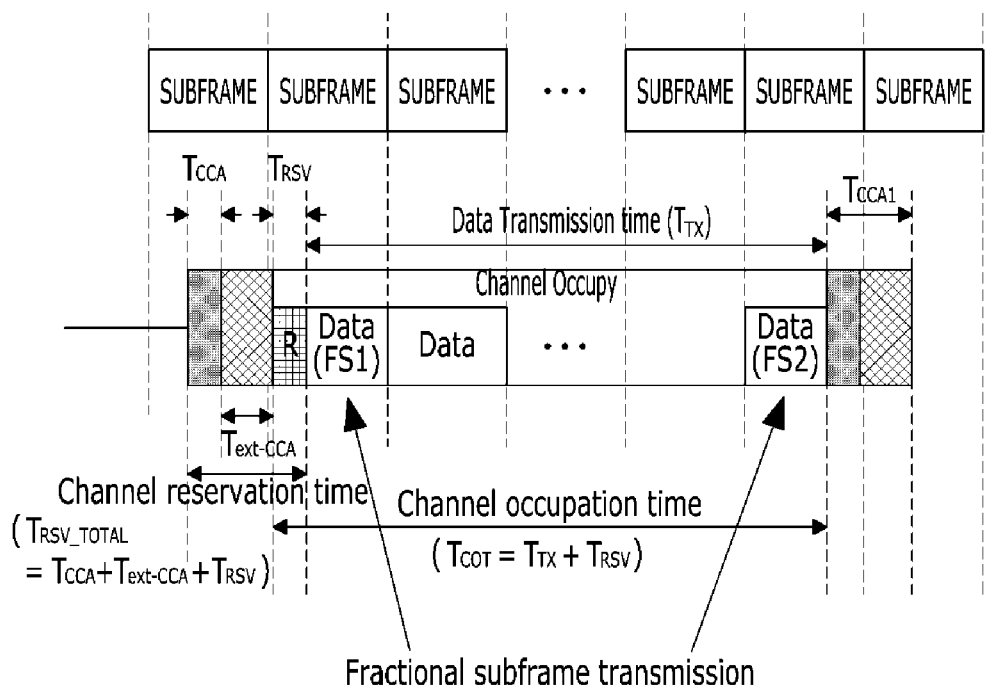
FIGS. 13A, 13B, and 13C are diagrams illustrating a method for transmitting a partial subframe.
Figure 13B:
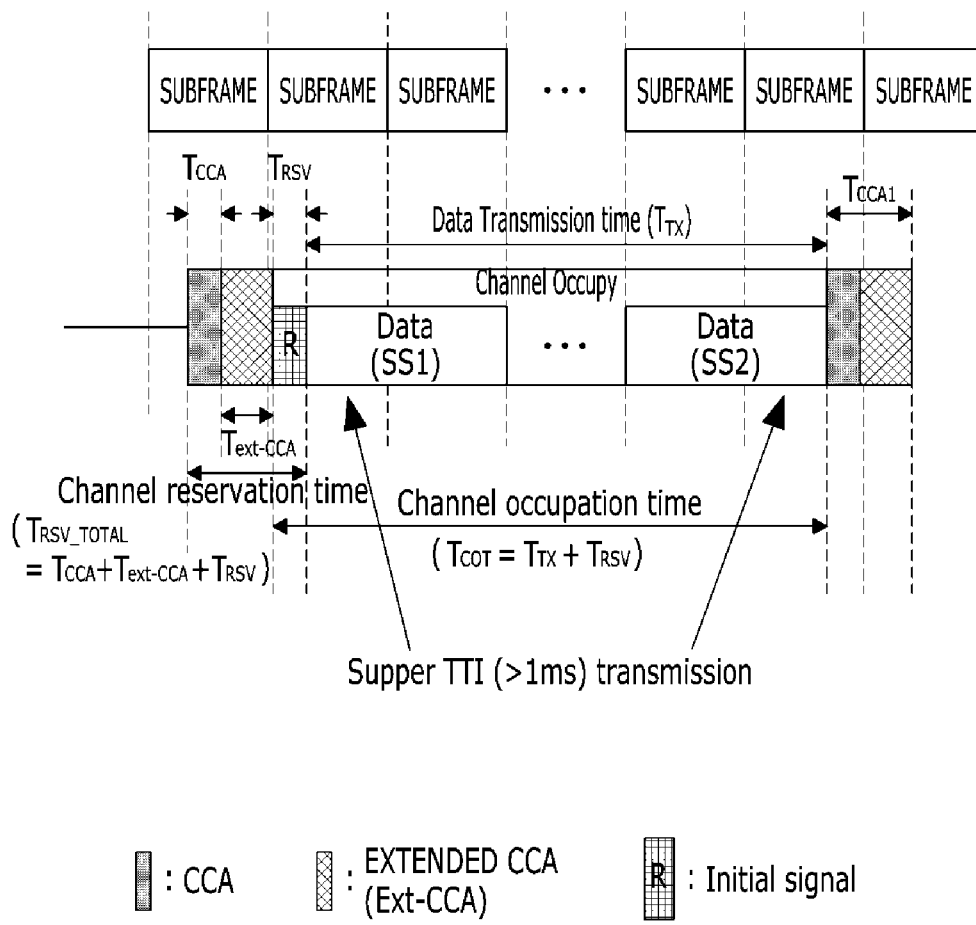
Figure 13C:
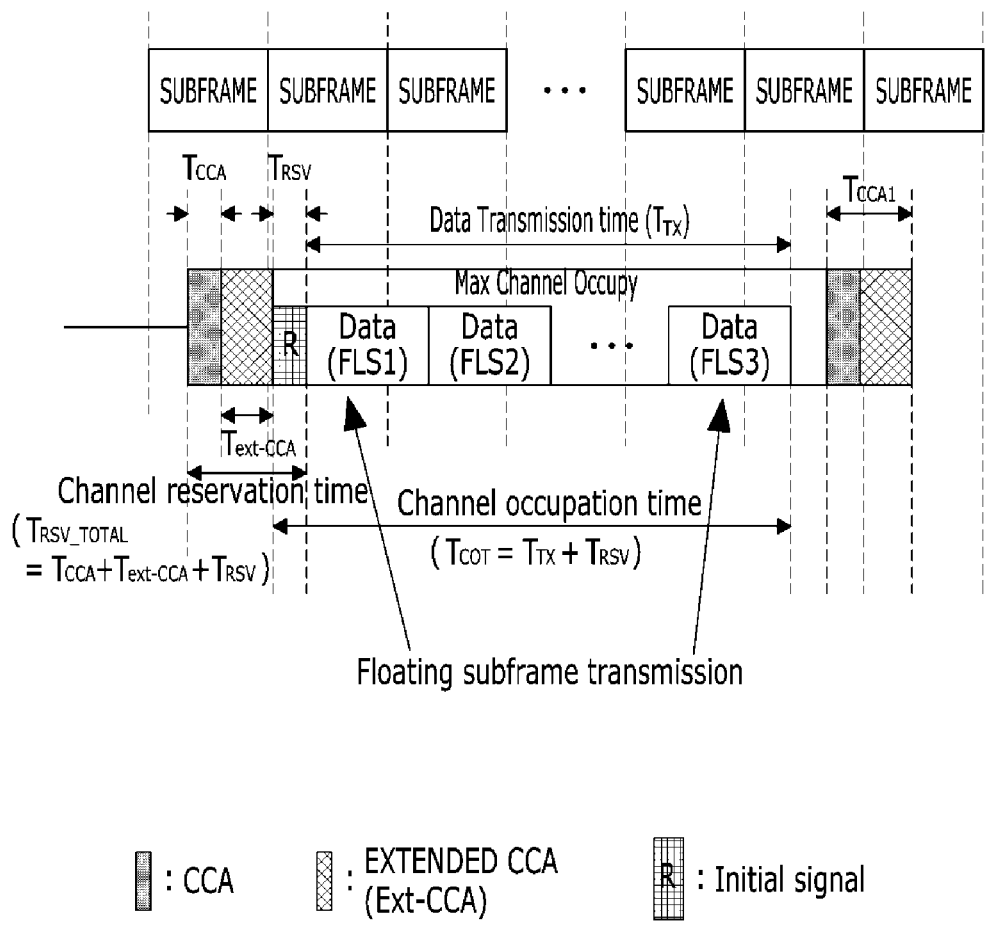

To this end, as illustrated in FIGS. 13A to 13C, a partial subframe transmission may be supported. FIGS. 13A to 13C are diagrams illustrating a method for transmitting a partial subframe. In FIGS. 13A to 13C, Ext-CCA represents the extended CCA, an initial signal represents the above-mentioned reservation signal, $T_{CCA}$, represents a CCA time, $T_{ext\text{-}CCA}$ represents an extended CCA time, and $T_{RSV}$ represents a reservation signal transmission time. $T_{RSV\_TOTAL}$ is a channel reservation time and is $T_{CCA}+T_{ext\text{-}CCA}+T_{RSV}$. $T_{TX}$ represents the data transmission time and $T_{COT}$ represents the channel occupation time. $T_{COT}$ is $T_{TX}+T_{RSV}$. $T_{CCA1}$ is $T_{CCA}+T_{ext\text{-}CCA}$.

In detail, FIG. 13A illustrates a fractional subframe to transmit data in durations FS1 and FS2 shorter than 1 ms.

FIG. 13B illustrates a super TTI subframe to transmit data in the duration shorter than 1 ms and durations SS1 and SS2 in which a 1 ms subframe adjacent to the shorter duration is added to the shorter duration.

FIG. 13C illustrates a floating subframe to reconfigure subframes FLS1, FLS2, . . . , FLS3 at a 1 ms unit after the CCA ending timing, thereby performing the data transmission. That is, the data transmission regions FLS1, FLS2, . . . , FLS3 each have a length of 1 ms.

Therefore, to apply the cellular technology to the unlicensed band and efficiently use the operation according to the unlicensed band frequency regulatory requirement and the occupation resources, a scheduling method or an HARQ retransmission method supported in the LTE needs to be supported considering the partial subframe transmission illustrated in FIGS. 13A to 13C.

Meanwhile, the TTI that is the subframe unit in the LTE includes the (E)PDCCH and the PDSCH. For data transmitted from the base station to the terminal, the resource allocation is performed in a resource block (RB) unit. For the RB indicated by downlink control information (DCI) transmitted upon the resource allocation, a modulation and coding scheme (MCS) for data transmission and a transport block size (TBS) depending on the MCS are determined. However, the CCA is performed to observe the regulatory requirement for the operation of the unlicensed band frequency and the starting and ending of the CCA may not be performed at the starting and ending timing of the subframe. Therefore, when the above-mentioned partial subframe is supported, the PDSCH transmission and the EPDCCH transmission may also be made in any orthogonal frequency division multiplexing (OFDM) symbol within the subframe, instead of the starting and ending timings depending on the LTE specification.

Meanwhile, the 3GPP LTE configures the TTI in a 1 ms unit, in which the TTI includes the PDCCH and the PDSCH for data transmission and further includes the EPDCCH depending on the configuration. In particular, since the unlicensed band carrier is operated as the supplemental carrier, the terminal in the unlicensed band may expect only the PDSCH and may receive and decode only the PDSCH, depending on the scheduling method (for example, cross-carrier scheduling) of the base station. Meanwhile, even in the system in which all the frames or some frames consist of only the TTI having one length (same length) of partial subframe lengths (length shorter than the 1 TTI length of the 3GPP, for example, 0.5 ms or 1 slot unit length) according to an exemplary embodiment of the present invention, the configuration and transmission method of the partial subframe according to the exemplary embodiment of the present invention may be applied. The frame of the system may consist of the subframe of the length corresponding to the TTI (having a length shorter than 1 ms) of the corresponding system among the first partial subframe and the final partial subframe described below.

Figure 14:
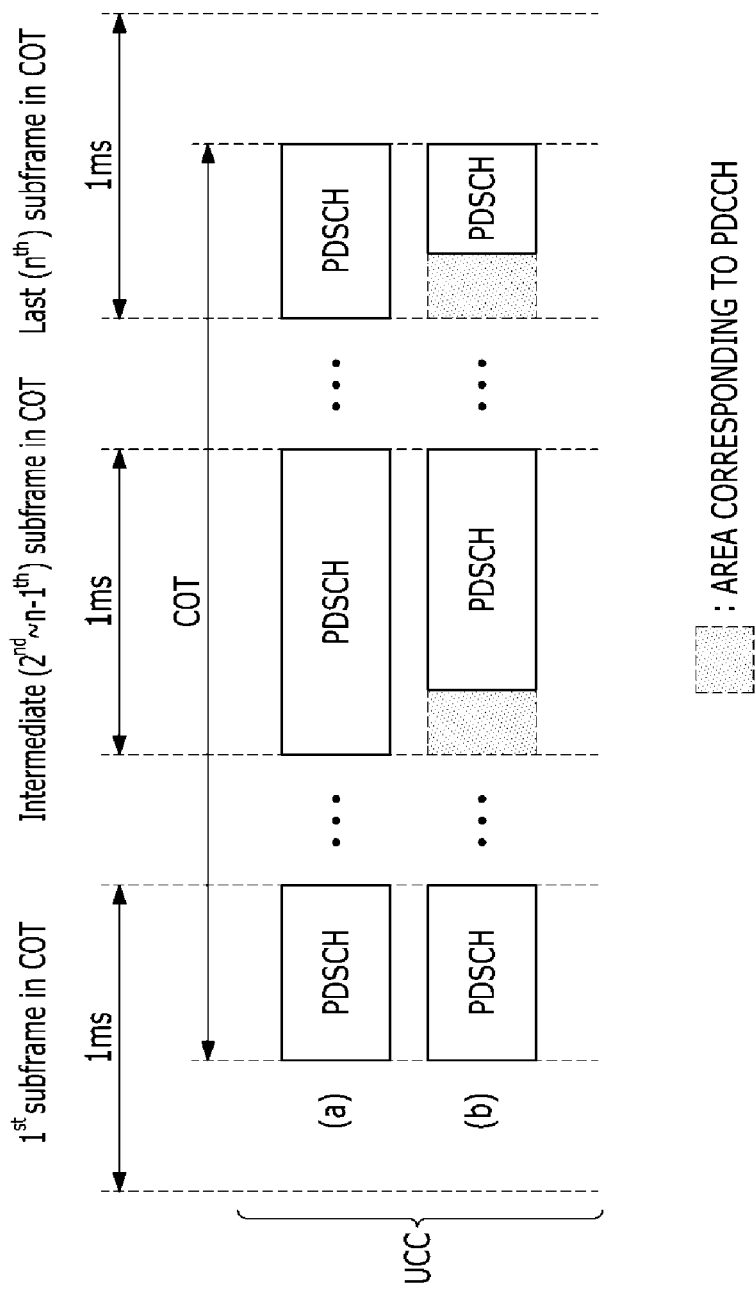
FIG. 14 is a diagram illustrating a PDSCH configuration method in the unlicensed band.

FIG. 14 illustrates methods (method M10 and method M11) for configuring PDSCH in the unlicensed band in which the cross-carrier scheduling is configured.

As illustrated in (b) of FIG. 14, the method M11 is a method in which a PDSCH region does not include a region corresponding to a PDCCH. In detail, the method M11 is a method that may be applied based on the existing LTE specification. For example, the PDSCH is transmitted in the rest region other than the region (for example, OFDM symbol NOs. 0 to 3) corresponding to the PDCCH in a resource region of an intermediate subframe belonging to the COT of the UCC. The method M11 may be used while minimizing the change (for example, redefinition of TBS determination) in the regulatory requirement for the PDSCH. However, according to the method M11, since other operating apparatuses in the unlicensed band may perform the channel access to the region corresponding to the PDCCH, a coexistence method such as a channel access avoidance method is required.

As illustrated in (a) of FIG. 14, the method M10 is a method in which a PDSCH region includes a region corresponding to a PDCCH region. For example, the PDSCH region of the intermediate subframe belonging to the COT of the UCC has a 1 ms TTI length. The method M10 may be applied to the cross-carrier scheduling technique and may prevent the channel access of other operating apparatuses in the unlicensed band to the region corresponding to the PDCCH. Therefore, the base station may use the region corresponding to the PDCCH as the PDSCH region. However, for this purpose, the redefinition of the TBS may be required.

Figure 15:
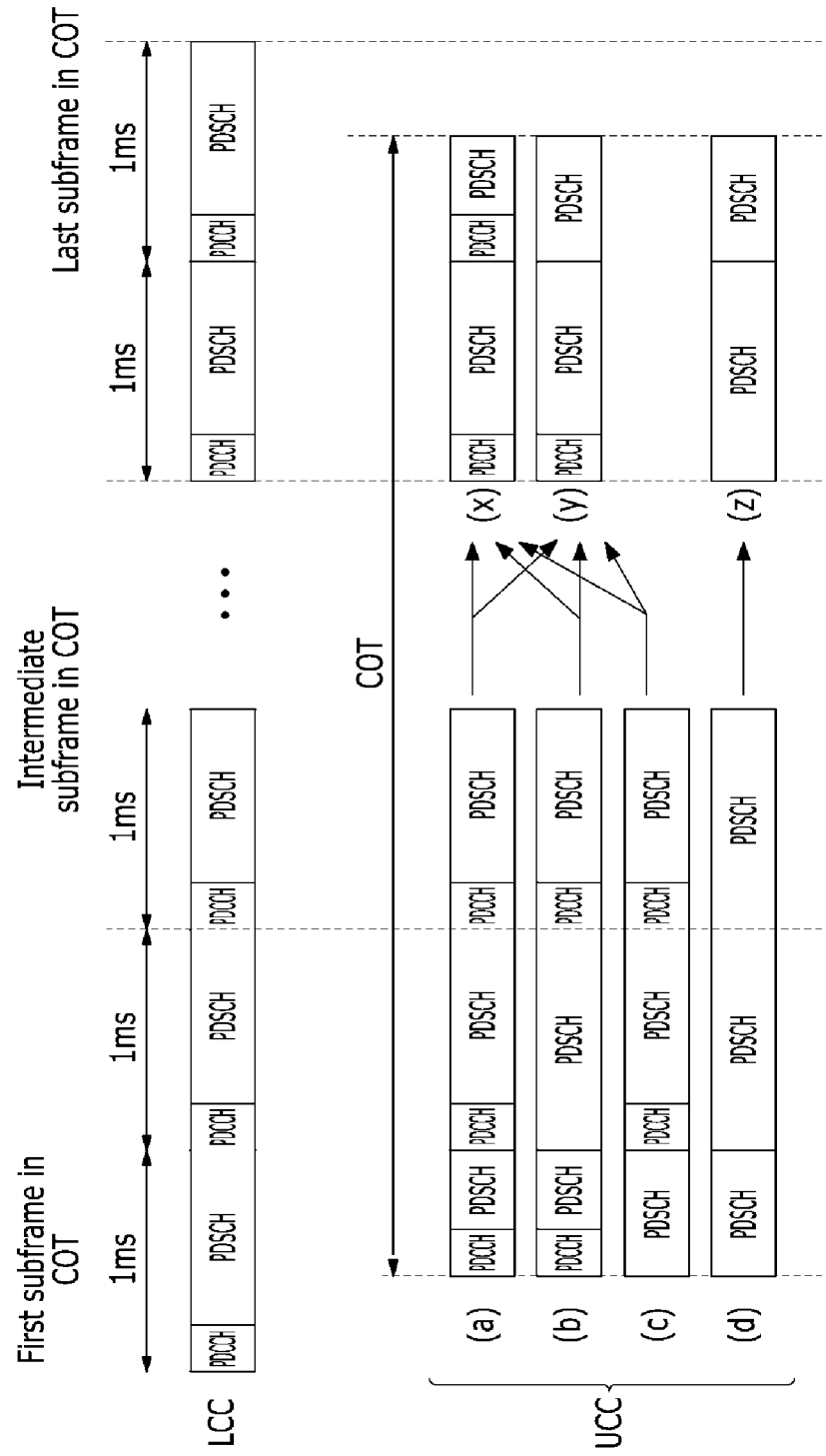
FIG. 15 is a diagram illustrating a partial subframe structure configured within COT of UCC after CCA.

Meanwhile, when the partial subframe transmission is supported, the base station may not access and use the OFDM symbol(s) to which the PDCCH transmits due to the characteristics of the CCA. FIG. 15 is a diagram illustrating a partial subframe structure configured within COT of UCC after CCA.

As illustrated in FIG. 15, a PDCCH+PDSCH region of each of the first subframe and the final subframe among the subframes belonging to the COT of the UCC may consist of the partial subframe. In the present specification, the PDCCH+PDSCH region may include the PDCCH region and the PDSCH region or may include only the PDSCH region. The PDCCH and the PDSCH may be configured by the following methods (method M20, method M21, method M22, method M23, method M24, method M25, and method M26). Further, unless specially mentioned, it is assumed that the self carrier scheduling to allow the PDCCH of the corresponding subframe to indicate the resource allocation information of the PDSCH is performed when the PDCCH and the PDSCH are simultaneously included in the subframe.

The method M20 illustrated in (a) and (x) of FIG. 15 is a method in which the partial subframe (having a length smaller than 1 ms) and a normal subframe (having 1 ms length) both include the PDCCH and the PDSCH. For example, as illustrated in (a) and (x) of FIG. 15, the first subframe and the final subframe belonging to the COT of the UCC each are the partial subframe and include the PDCCH and the PDSCH. The intermediate subframe belonging to the COT of the UCC is the normal subframe and includes the PDCCH and the PDSCH. The method M20 may be applied to a typical subframe structure of the LTE. To use the method M20, the related operations such as the PDCCH region and the PDSCH region of the terminal depending on the partial subframe structure and the TBS determination need to be defined. Meanwhile, according to the method M20, the final subframe belonging to the COT of the UCC may be reused as a downlink pilot time slot (DwPTS) structure of the TDD.

The method M21 illustrated in (b) and (y) of FIG. 15 is a method in which when the partial subframe and the normal subframe come out continuously, the PDCCH is included in a front subframe but the PDCCH is not included in the subsequent subframe. For example, as illustrated in (b) and (y) of FIG. 15, since the first subframe belonging to the COT of the UCC is the partial subframe and the second subframe is the normal subframe, the first subframe which is the front subframe includes the PDCCH and the PDSCH and the second subframe that is the subsequent subframe includes only the PDSCH. To use the method M21, the related operations such as the PDCCH region and the PDSCH region of the terminal depending on the partial subframe structure and the TBS determination need to be defined and the base station may be configured (operated) to indicate the resource allocation information of the PDCCH of the previous subframe (for example, first subframe) and the PDSCH of the same subframe (for example, first subframe) and the resource allocation information of the PDSCH of the subsequent subframe (for example, second subframe), respectively. Meanwhile, the method M21 may configure the partial subframe and the normal subframe continuously appearing may be configured as one TTI and therefore a relatively larger TBS determination or a higher coding rate may be used and the base station may be configured (operated) to allow the PDCCH of the previous subframe (for example, first subframe) to indicate the resource allocation information of the PDSCH consisting of one TTI.

The method M22 illustrated in (c) and (y) of FIG. 15 is a method in which the PDCCH is not included in the partial subframe. For example, as illustrated in (c) and (y) of FIG. 15, the first subframe and the final subframe belonging to the COT of the UCC each are the partial subframe and include only the PDSCH. The method M22 may be applied to the typical subframe structure of the LTE and therefore minimize the change in the regulatory requirement. However, according to the method M22, the base station may not apply the self carrier scheduling to the occupied channel of the first partial subframe and the final partial subframe belonging to the COT and may be configured (operated) to apply the cross-carrier scheduling or not to use the resources (for example, not to allocate the resources of the partial subframe).

The method M23 illustrated in (a) and (y) of FIG. 15 is a method in which the final partial subframe of the subframes belonging to the COT of the UCC includes only the PDSCH and the rest subframes include the PDCCH and the PDSCH. For example, as illustrated in (a) and (y) of FIG. 15, the first subframe belonging to the COT of the UCC is the partial subframe including the PDCCH and the PDSCH, the intermediate subframe(s) is(are) the normal subframe(s) including the PDCCH and the PDSCH, and the final subframe is the partial subframe including only the PDSCH. To use the method M23, the related operations such as the PDCCH region and the PDSCH region of the terminal depending on the partial subframe structure and the TBS determination need to be defined and the PDCCH of the previous subframe may be configured (operated) to indicate the resource allocation information of the PDSCH of the same subframe and the resource allocation information of the PDSCH of the subsequent subframe, respectively. Meanwhile, the method M23 may configure the partial subframe (for example, final subframe) and the normal subframe (for example, previous subframe of the final subframe) continuously appearing may be configured as one TTI and therefore the relatively larger TBS determination or the higher coding rate may be used and the PDCCH of the previous subframe may be configured (operated) to indicate the resource allocation information of the PDSCH (final subframe+previous subframe of the final subframe) consisting of one TTI.

The method M24 illustrated in (c) and (x) of FIG. 15 is a method in which the first partial subframe of the subframes belonging to the COT of the UCC includes only the PDSCH and the rest subframes include the PDCCH and the PDSCH. For example, as illustrated in (c) and (x) of FIG. 15, the first subframe belonging to the COT of the UCC is the partial subframe including only the PDSCH, the intermediate subframe(s) is(are) the normal subframe(s) including the PDCCH and the PDSCH, and the final subframe is the partial subframe including the PDCCH and the PDSCH. To use the method M24, the related operations such as the PDCCH region and the PDSCH region of the terminal depending on the partial subframe structure and the TBS determination need to be defined. The first subframe may not be applied with the self carrier scheduling but applied with the cross-carrier scheduling or may be configured (operated) not to use the resources. Meanwhile, the method M24 may configure the partial subframe and the normal subframe (for example, first two subframes or final two subframes belonging to the COT) continuously appearing as one TTI and therefore may use the relatively larger TBS determination or the higher coding rate and may be configured (operated) to indicate the corresponding resource allocation information through the PDCCH of the subframe consisting of one TTI.

The method M25 illustrated in (d) and (z) of FIG. 15 is a method in which the subframe of the unlicensed band includes only the PDSCH. For example, as illustrated in (d) and (z) of FIG. 15, the partial subframe and the normal subframe belonging to the COT of the UCC both include only the PDSCH. The method M25 may be used when the cross-carrier scheduling is configured. Meanwhile, according to the method M25, the relative PDCCH load may be applied in the licensed band.

The method M26 illustrated in (b) and (x) of FIG. 15 is a method in which the partial subframe and the normal subframe belonging to the COT of the UCC both include the PDCCH and the PDSCH and when the partial subframe and the normal subframe appear continuously, the subsequent subframe includes only the PDSCH. For example, as illustrated in (b) and (x) of FIG. 15, since the first subframe belonging to the COT of the UCC is the partial subframe and the second subframe is the normal subframe, the first subframe which is the front subframe includes the PDCCH and the PDSCH and the second subframe that is the subsequent subframe includes only the PDSCH. The PDCCH of the previous subframe (for example, first subframe) may be configured (operated) to indicate the resource allocation information of the PDSCH of the same subframe (for example, first subframe) and the resource allocation information of the PDSCH of the subsequent subframe (for example, second subframe), respectively.

The rest subframes include the PDCCH and the PDSCH.

Figure 16:
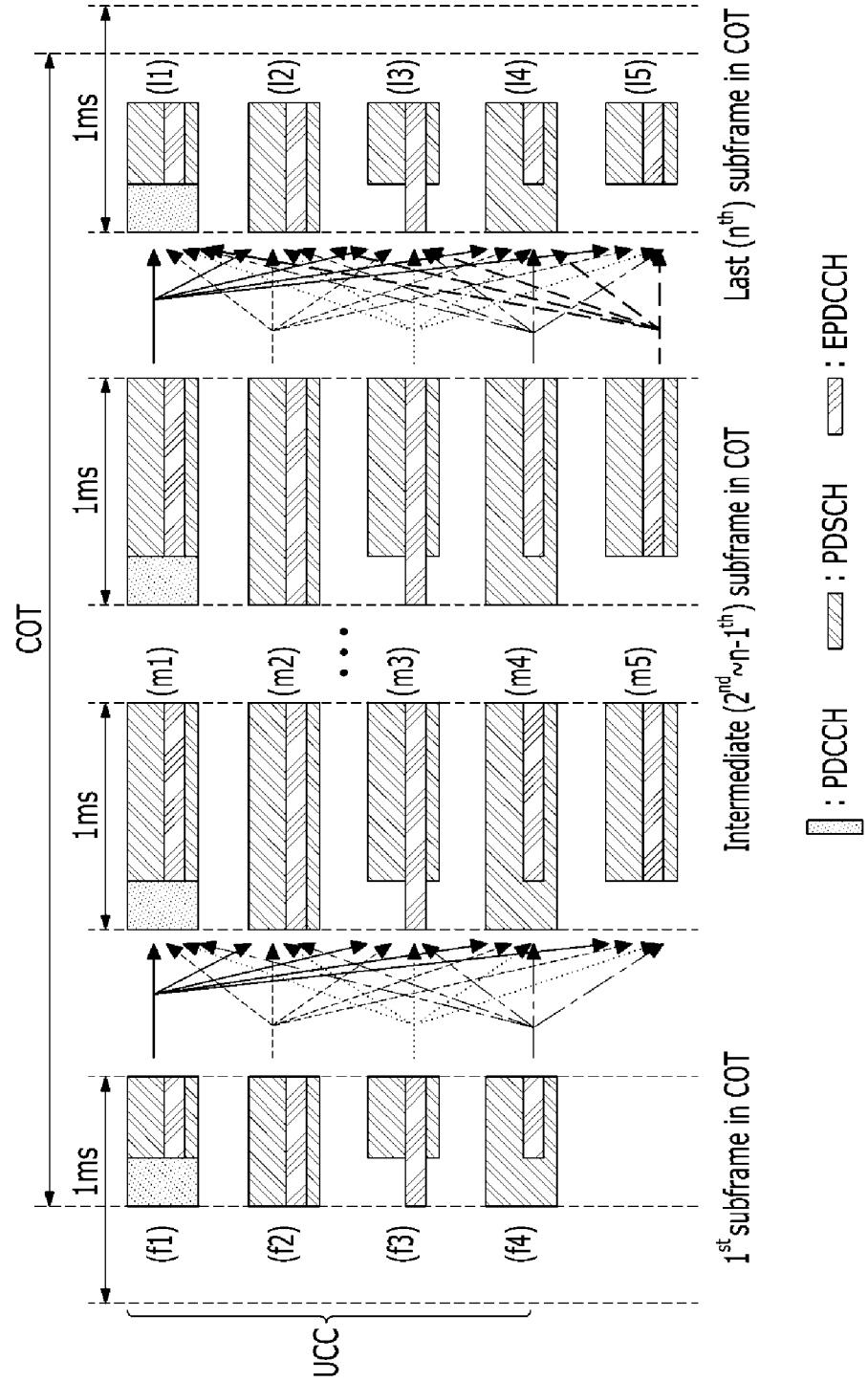
FIG. 16 is a diagram illustrating the partial subframe structure in which the EPDCCH is additionally included.

Meanwhile, FIG. 16 is a diagram illustrating the partial subframe structure further including the EPDCCH as well as the PDCCH and the PDSCH. As illustrated in FIG. 16, the first subframe and the final subframe of the subframes belonging to the COT of the UCC consist of the partial subframe and the rest subframes consist of the normal subframe. The PDCCH, the PDSCH, and the EPDCCH may be configured by the following methods (method M30, method M31, and method M32). Unless specially mentioned, it is assumed that the self carrier scheduling to allow the PDCCH of the corresponding subframe to indicate the resource allocation information of the PDSCH or the EPDCCH to indicate the resource allocation information of the PDSCH is performed when the PDCCH and the PDSCH are simultaneously included in the subframe.

The method M30 illustrated in (f1), (f2), (m1), (m2), (m5), (l1), (l2) and (l5) of FIG. 16 is a method in which the EPDCCH region has the same OFDM symbol length as the PDSCH region. In detail, the first subframe of the subframes belonging to the COT of the UCC is configured like one of (f1) and (f2) of FIG. 16, the intermediate subframe is configured like one of (m1), (m2), and (m5) of FIG. 16, and the final subframe is configured like one of (l1), (l2), and (l5) of FIG. 16. The method M30 is a method that may be applied to use the LTE specification. To use the method M30, the partial subframe illustrated in (f1), (f2), (l1), (l2), and (l5) of FIG. 16 needs to be defined and the configuration (configuration from OFDM symbol No. 0) illustrated in (m2) of FIG. 16 needs to be additionally defined. Meanwhile, when the subframe is configured as illustrated in (m5) and (l5) of FIG. 16, a method for preventing other operating apparatus in the unlicensed band from accessing to the channel in the region to which the PDCCH is not transmitted is required.

The method M31 illustrated in (f2) to (f4), (m2) to (m5), and (l2) to (l5) of FIG. 16 is a method in which the EPDCCH region is configured from OFDM symbol No. j (for example, j=0, 1, 2, 3, 4) independent of the length of the PDSCH. In detail, the first subframe of the subframes belonging to the COT of the UCC is configured like one of (f2) to (f4) of FIG. 16, the intermediate subframe is configured like one of (m2) to (m5) of FIG. 16, and the final subframe is configured like one of (l2) to (l5) of FIG. 16. When the OFDM symbol length of the EPDCCH region is configured to be the same as that of the PDSCH region, the OFDM symbol length of the EPDCCH region according to the method M31 may be the same as the OFDM symbol length of the EPDCCH region according to the method M30. However, when the OFDM symbol length of the EPDCCH region is configured to be different from that of the PDSCH region, the length of the corresponding EPDCCH region needs to be defined (or configured), which may be indicated from the base station to the terminal (for example, one or two combinations of RRC signaling, MAC CE, and L1 signaling, etc.). The method M31 may be applied when there is no PDSCH. Meanwhile, to prevent another unlicensed band operating apparatus from accessing to the channel of the region to which the PDCCH is not transmitted, the EPDCCH may be configured (operated) to be from OFDM symbol No. 0.

The method M32 illustrated in (f2), (f3), (l2), and (l3) of FIG. 16 is a method in which the EPDCCH region is configured from first OFDM symbol No. j (j=0, 1, 2, 3, 4) of the partial subframe. In detail, the first subframe of the subframes belonging to the COT of the UCC is configured like one of (f2) and (f3) of FIG. 16, the final subframe is configured like one of (l2) and (l3) of FIG. 16, and the intermediate subframe is configured like one of (m1) to (m5) of FIG. 16. Similar to the method M31, in the method M32, when the OFDM symbol length of the EPDCCH region is different from that of the PDSCH region, the length of the corresponding EPDCCH region needs to be defined (or configured), which may be indicated from the base station to the terminal (for example, one or two combinations of RRC signaling, MAC CE, and L1 signaling, etc.). The method M32 may be applied when there is no PDSCH. Meanwhile, the method M32 may prevent another unlicensed band operating apparatus from accessing to the channel within the partial subframe.

The method M33 illustrated in (f1), (f4), (m1), (m4), (m5), (l1), (l4), and (l5) of FIG. 16 is a method in which the EPDCCH region is configured from the first OFDM symbol of the rest OFDM symbols other than the OFDM symbols that may be configured as the PDCCH region among the OFDM symbols. In detail, the first subframe of the subframes belonging to the COT of the UCC is configured like one of (f1) and (f4) of FIG. 16, the intermediate subframe is configured like one of (m1), (m4), and (m5) of FIG. 16, and the final subframe is configured like one of (l1), (l4), and (l5) of FIG. 16. Meanwhile, the method M33 may be applied to the LTE specification, but to use the method M33, the case in which the OFDM length of the EPDCCH region is different from that of the PDSCH region (for example, (f4), (m4), and (l4) of FIG. 16) needs to be defined, which may be indicated from the base station to the terminal (for example, one or two combinations of RRC signaling, MAC CE, L1 signaling, etc.).

1.7.1. Resource Element (RE) and TBS for Data Transmission of Subframe

As illustrated in FIGS. 14 to 16, according to the configuration of the first subframe and the final subframe belonging to the COT of the unlicensed band, the subframe consists of the normal subframe defined in the 3GPP LTE specification or the partial subframe consisting of some OFDM symbols and may include the PDSCH or the PDCCH and the EPDCCH. Meanwhile, even in a system (for example, system in which all the durations or some durations consist of only the subframe in which 1 TTI has a length (for example, 0.5 ms or 1 slot size) shorter than 1 ms defined by the 3GPP specification and system in which a frame consists of only the first subframe or the final subframe illustrated in FIGS. 14 to 16) in which all the frames or some frames consist of only some of the subframes from the first subframe to the final subframe according to the exemplary embodiment of the present invention, the RE configuration according to an exemplary embodiment of the present invention (for example, frame consisting of only the subframes illustrated in FIGS. 17A to 17C or subframe consisting of the specific number of OFDM symbols shown in the following Table 4) and the subframe structure and the TBS size depending on the corresponding RE configuration may be determined.

Figure 17A:
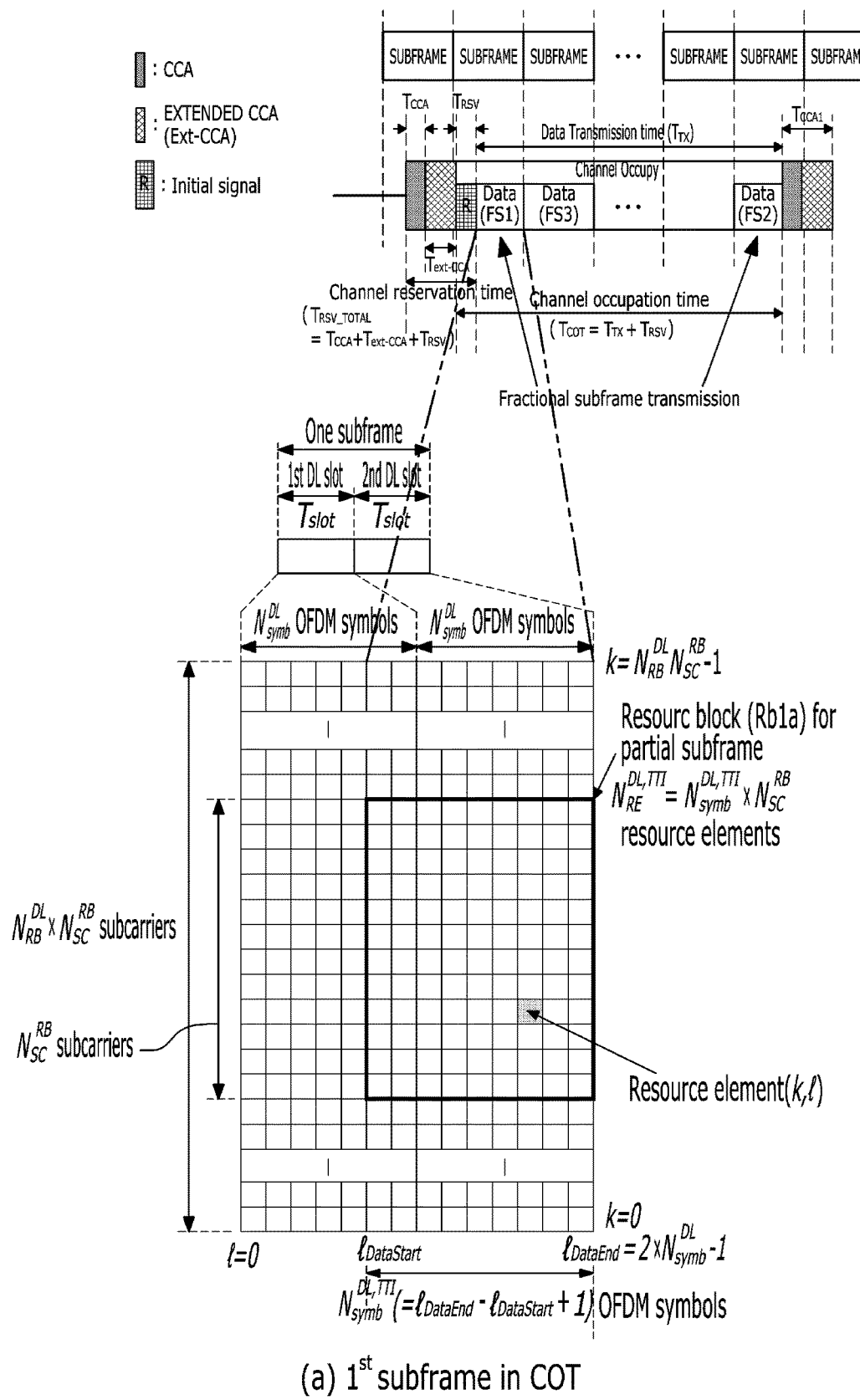
FIGS. 17A, 17B, and 17C are diagrams illustrating a resource grid corresponding to the subframe belonging to the COT of the UCC.
Figure 17B:
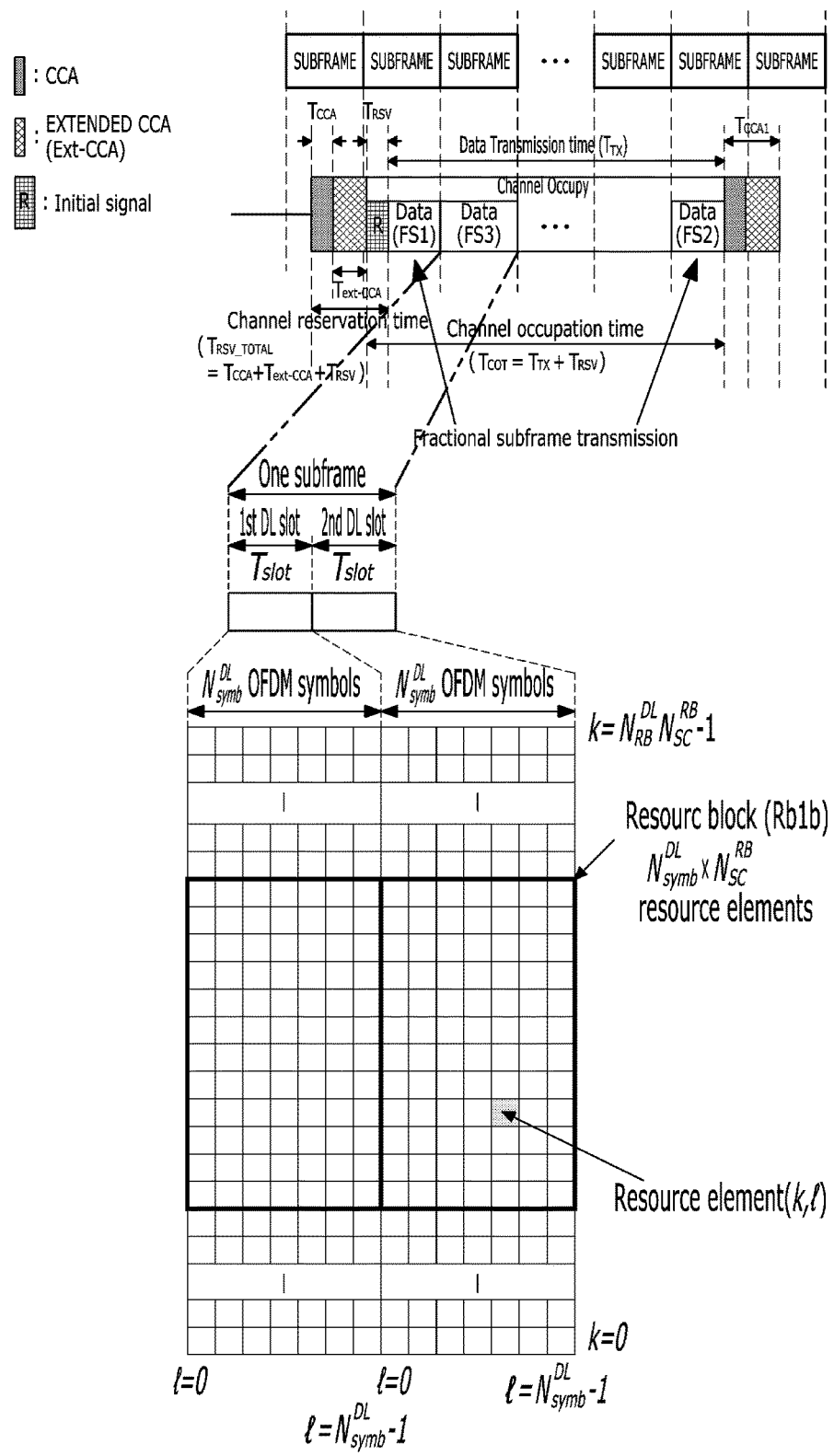
Figure 17C:
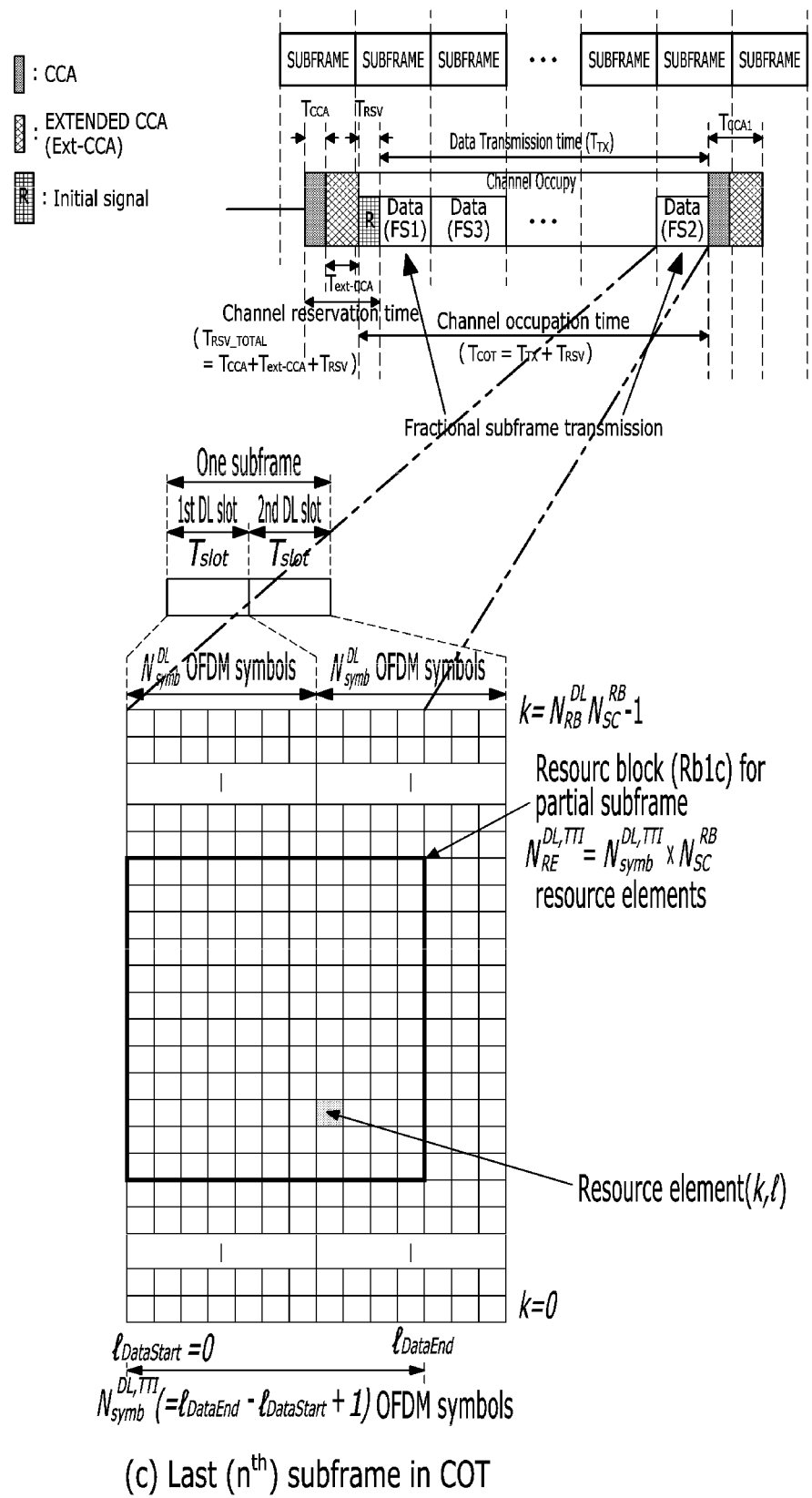

FIGS. 17A to 17C are diagrams illustrating a DL resource grid corresponding to the partial subframe and the normal subframe illustrated in FIG. 13A.

In detail, as illustrated in FIG. 17A, a resource block Rb1$a$ within the resource grid for the first subframe of the subframes belonging to the COT of the UCC corresponds to a duration FS1.

As illustrated in FIG. 17B, a resource block Rb1$a$ within the resource grid for the intermediate subframe of the subframes belonging to the COT of the UCC corresponds to a duration FS3.

As illustrated in FIG. 17C, a resource block Rb1$c$ within the resource grid for the final subframe of the subframes belonging to the COT of the UCC corresponds to a duration FS2.

The resource grids illustrated in FIGS. 17A to 17C follow the LTE specification and therefore the detailed description of the resource grids will be omitted.

1.7.1.1. Method (Method M40) for Determining TBS

The method M40 is a method for obtaining available REs for data transmission depending on the number of OFDM symbols configuring a subframe and obtaining TBS based on the obtained RE.

The following Table 4 shows an example of the available REs for the data transmission obtained based on the number of OFDM symbols configuring the subframe.

TABLE 4

Example of RE for partial subframe within COT

| | Idx | $I_{DataStart}$ | $I_{DataEnd}$ | the number of OFDM symbols $N_{symb}^{DL.TTI} =$ $I_{DataEnd} - I_{DataStart} + 1$ | the number of REs $N_{RE}^{DL.TTI} =$ $N_{symb}^{DL.TTI} \times N_{se}^{RB} - N_{over}^{TTI}$ | Note |
|---|---|---|---|---|---|---|
| First TTI of COT | 0 | 0 | 13 | 14 | 152 (=14 * 12 − 16) | No partial subframe in the whole sub frame |
| | 1 | 1 | 13 | 13 | 144 (=13 * 12 − 12) | |
| | 2 | 2 | 13 | 12 | 132 (=12 * 12 − 12) | |
| | 3 | 3 | 13 | 11 | 120 (=11 * 12 − 12) | TBS determination reference of current specification |
| | 4 | 4 | 13 | 10 | 108 (=10 * 12 − 12) | |
| | 5 | 5 | 13 | 9 | 100 (=9 * 12 − 8) | |
| | 6 | 6 | 13 | 8 | 88 (=8 * 12 − 8) | |
| | 7 | 7 | 13 | 7 | 76 (=7 * 12 − 8) | |
| | 8 | 8 | 13 | 6 | 68 (=6 * 12 − 4) | |
| | 9 | 9 | 13 | 5 | 56 (=5 * 12 − 4) | |
| | 10 | 10 | 13 | 4 | 44 (=4 * 12 − 4) | |
| | 11 | 11 | 13 | 3 | 32 (=3 * 12 − 4) | |
| | 12 | 12 | 13 | 2 | 24 (=2 * 12 − 0) | |
| | 13 | 13 | 13 | 1 | 12 (=1 * 12 − 0) | |
| Last TTI of COT | 14 | 0 | 0 | 1 | 8 (=1 * 12 − 4) | |
| | 15 | 0 | 1 | 2 | 20 (=2 * 12 − 4) | |
| | 16 | 0 | 2 | 3 | 32 (=3 * 12 − 4) | |
| | 17 | 0 | 3 | 4 | 44 (=4 * 12 − 4) | |
| | 18 | 0 | 4 | 5 | 52 (=5 * 12 − 8) | |
| | 19 | 0 | 5 | 6 | 64 (=6 * 12 − 8) | |
| | 20 | 0 | 6 | 7 | 76 (=7 * 12 − 8) | |
| | 21 | 0 | 7 | 8 | 84 (=8 * 12 − 12) | |
| | 22 | 0 | 8 | 9 | 96 (=9 * 12 − 12) | |
| | 23 | 0 | 9 | 10 | 108 (=10 * 12 − 12) | |
| | 24 | 0 | 10 | 11 | 120 (=11 * 12 − 12) | |
| | 25 | 0 | 11 | 12 | 132 (=12 * 12 − 16) | |
| | 26 | 0 | 12 | 13 | 144 (=13 * 12 − 16) | |
| | 27 | 0 | 13 | 14 | 152 (=14 * 12 − 16) | Same as Idx0 |

In detail, the TBS included in the partial subframe (for example, partial PDSCH or partial EPDCCH) within one subframe may be calculated by the following Equation 1.

$$TBS'(I_{TBS}, N_{PRB}) = \left\lfloor TBS(I_{TBS}, N_{PRB}) \times \frac{N_{RE}^{TTI} - N_{RE,PDCCH}^{TTI}}{N_{RE}^{TBS}} \times 8 \right\rfloor \times 8$$ [Equation 1]

In the above Equation 1, TBS' ($I_{TBS}$,$N_{PRB}$) represents the TBS according to the method M40 and TBS($I_{TBS}$, $N_{PRB}$) represents the TBS (defined in specification TS 36.213) depending on $I_{TBS}$ and $N_{PRB}$.

In the above Equation 1, $N_{RE}^{TTI} = N_{symb}^{DL,TTI} \times N_{sc}^{RB} - N_{over}^{PDSCH}$. Here, $N_{over}^{PDSCH}$ represents the number of excepted REs to obtain the TBS using RS (CRS, CSI-RS, etc.) included in the PDSCH.

$$N_{symb}^{DL,TTI} = l_{DataEnd} - l_{DataStart} + 1,$$

which represents the number of OFDM symbols configuring one subframe. Here, $l_{DataEnd}$ and $l_{DataStart}$ are an OFDM symbol index representing the ending and starting of the subframe, respectively.

In the above Equation 1, $N_{TBS}^{RE} = 120$ $N_{sc}^{RB}$ represents the number of subcarriers within one RB and over $N_{over}^{TTI}$ represents the number of cell-specific reference signals (CRS) within the partial subframe. If the TBS defined in the 3GPP LTE specification is used as it is and $N_{symb}^{DL,TTI}$ is 11($l_{DataEnd}$=13, $l_{DataStart}$=3), $N_{sc}^{RB}$=12 and $N_{over}^{TTI}$ is 0, 4, 8, 12, or 16.

If $l_{DataEnd} = 2 \times n_{symb}^{DL} - 3( = 13)$, $$N_{over}^{TTI} = \begin{cases} 0, & \text{if } l_{DataStart} = 12, 13 \\ 4, & \text{if } l_{DataStart} = 8, 9, 10, 11 \\ 8, & \text{if } l_{DataStart} = 5, 6, 7 \\ 12, & \text{if } l_{DataStart} = 1, 2, 3, 4 \\ 16, & \text{if } l_{DataStart} = 0 \end{cases}$$

In the above Equation, $N_{over}^{TTI}$ may be changed depending on the number of REs that are not used for the data transmission.

If $l_{DataStart} = 0$, $$N_{over}^{TTI} = \begin{cases} 4, & \text{if } l_{DataEnd} = 0, 1, 2, 3 \\ 8, & \text{if } l_{DataEnd} = 4, 5, 6 \\ 12, & \text{if } l_{DataEnd} = 7, 8, 9, 10 \\ 16, & \text{if } l_{DataEnd} = 11, 12, 13 \end{cases}$$

In the above Equation, $N_{over}^{TTI}$ may be changed depending on the number of REs that are not used for the data transmission.

$N_{symb}^{DL}$ is the number (for example, seven) of OFDM symbols within the downlink slot.

$$N_{RE,PDCCH}^{TTI} = \begin{cases} 0, & \text{if } N_{symb}^{PDCCH} = 0 \\ 8, & \text{if } N_{symb}^{PDCCH} = 1 \\ 20, & \text{if } N_{symb}^{PDCCH} = 2 \\ 32, & \text{if } N_{symb}^{PDCCH} = 3 \\ 44, & \text{if } N_{symb}^{PDCCH} = 4 \end{cases}$$

$N_{symb}^{PDCCH}$ is the number of OFDM symbols for the PDCCH.

Meanwhile, in the case of the super TTI subframe (for example, super TTI subframes SS1 and SS2 of FIG. 13B) consisting of two subframes (for example, partial subframe+ normal subframe), like the following Equation 2, the method M40 obtains the TBS for each of the configuration subframes of the super TTI subframe and then obtains all the TBSs.

$$TBS'(I_{TBS}, N_{PRB}) = TBS'_1(I_{TBS}, N_{PRB}) + TBS'_2(I_{TBS}, N_{PRS}).$$ [Equation 2]

In the above Equation 2, TBS'($I_{TBS}$,$N_{PRB}$) represents the TBS of the super TTI subframe.

TBS'$_1$($I_{TBS}$,$N_{PRB}$) represents the TBS of the first subframe of the configuration subframes of the super TTI subframe and may be calculated by the above Equation 1.

TBS'$_2$($I_{TBS}$,$N_{PRB}$) represents the TBS of the second subframe of the configuration subframes of the super TTI subframe and may be calculated by the above Equation 1.

Meanwhile, in the case of the floating subframe (for example, floating subframes FLS1, FLS2, and FLS3 of FIG. 13C) reconfigured in a 1 ms unit after the CCA ending timing, the method M40 may use the above Equation 1 to which $l_{Datastart}$=0, 1, 2, 3 and $l_{DataEnd}$=13 are applied to calculate the TBS of the floating subframe.

1.7.1.2. Method (Method M41) for Determining TBS

The method M41 is a method similar to the method for defining NPRB of the TBS table defined in the 3GPP LTE depending on a special subframe configuration and obtains the TBS using $N_{PRB}$ defined by the following Equation 3.

$$N_{PRB} = \begin{cases} \max\{\lceil \alpha \times N'_{PRB} \rceil, 1\}, & \text{if } \alpha < 1 \\ \min\{\lceil \alpha \times N'_{PRB} \rceil, N_{DL}^{RB}\} & \text{if } \alpha > 1 \\ N'_{PRB} & \text{otherwise} \end{cases}$$ [Equation 3]

In the above Equation 3, N'$_{PRB}$ is the number of physical RBs (PRBs) of the resources allocated upon the data transmission. Here, $N_{DL}^{RB}$ represents the number of RBs of the downlink system depending on the serving system bandwidth (for example, 100 RBs in the case of a 20 MHz system).

α represents a compensation value for reflecting the case in which the number of OFDM symbols actually using $N_{PRB}$ is different from that of the normal subframe and is determined by the following method M41-1 or method M41-2.

The method M41-1 is a method for determining a corresponding to the DwPTS depending on the number of OFDM symbols of the partial subframe like the special subframe configuration for the DwPTS transmission defined in the 3GPP LTE.

The method M41-2 is a method for determining a based on the number (for example, $$\frac{N_{symb}^{DL,TTI}}{2 \times N_{symb}^{DL} - 1}$$

Alternatively, the method M41-2 may also determine a using the following Equation 4 reflecting the number of OFDM symbols used for the data transmission, excluding the OFDM symbols corresponding to the PDCCH region.

$$\frac{N_{symb}^{DL,TTI} - N_{symb}^{PDCCH,TTI}}{2 \times N_{symb}^{DL} - 1 - N_{symb}^{PDCCH}}$$ [Equation 4]

In the above Equation 4, $N_{symb}^{PDCCH,TTI}$ represents the number of OFDM symbols corresponding to the PDCCH region of the partial subframe.

In the above Equation 4, $N_{symb}^{PDCCH}$ represents the number of OFDM symbols corresponding to the PDCCH of the normal subframe or the value already used to define the TBS, for example, 3.

Meanwhile, in the case of the super TTI subframe (for example, super TTI subframes SS1 and SS2 of FIG. 13B) consisting of two subframes (for example, partial subframe+ normal subframe), the method M41 may obtain the $N_{PRB}$ for each of the configuration subframes of the super TTI subframe and then obtain all the TBSs.

1.7.2. Configuration of Subframe Depending on Channel Occupation of Unlicensed Band The partial subframe is hardly operated to be suited for a subframe boundary due to a maximum channel occupation time constraint according to the frequency operation regulatory requirement in the unlicensed band and diversity of the CCA timing. Therefore, the partial subframe may perform the transmission starting/ending in any OFDM symbol unit within the subframe. As described above, the partial subframe may be included in the first portion and the final portion within the COT and other subframes apply the subframe definition depending on the LTE specification.

The first partial subframe belonging to the COT includes the OFDM symbol duration from any OFDM symbol of the first OFDM symbol (i.e., OFDM symbol No. 0) to the final OFDM symbol (where OFDM symbol No. is $2 \times N_{symb}^{DL} - 1$, for example, if $N_{symb}^{DL} = 7$, OFDM symbol No. is 13) to the final OFDM symbol (where OFDM symbol No. is $2 \times N_{symb}^{DL} - 1$, for example, if $N_{symb}^{DL} = 7$, OFDM symbol No. is 13). That is, the first partial subframe belonging to the COT may include OFDM symbols from Nos. 0 to 13, OFDM symbols from Nos. 1 to 13, . . . , or OFDM symbol NOs. 13 to 13.

The final partial subframe belonging to the COT includes the OFDM symbol duration from the first OFDM symbol (i.e., OFDM symbol No. 0) to any OFDM symbol of the first OFDM symbol (i.e., OFDM symbol No. 0) to the final OFDM symbol (where OFDM symbol No. is $2 \times N_{symb}^{DL} - 1$, for example, if $N_{symb}^{DL} = 7$, OFDM symbol No. is 13). That is, the final partial subframe belonging to the COT may include OFDM symbols from Nos. 0 to 0, OFDM symbols from Nos. 0 to 1, . . . , or OFDM symbol NOs. 0 to 13.

As shown in the above Table 4, the number of OFDM symbols is $N_{symb}^{DL,TTI} = 1_{DataEnd} - 1_{DataStart} + 1$.

Meanwhile, upon the data (PDSCH) transmission, the reference signal (RS) included in the data (PDSCH) is demodulated RS (DM-RS), CRS, channel State Information-RS (CSI-RS), etc., and the RS is used for data transmission/reception, channel state measurement/report, etc.

Further, the apparatus operated in the unlicensed band according to the frequency regulatory requirement in the unlicensed band may access and use the channel. Since one TTI is included in all or some OFDM symbols of the subframe, there is a need to adjust the region (hereinafter, 'RS region') in which the RS is included. Meanwhile, even when some frames or all the frames of the system are configured in time shorter than 1 ms (for example, when all the durations or some durations consist of only the subframe in which 1 TTI has a length (for example, 0.5 ms or 1 slot size) shorter than a length defined by the 3GPP), a method for adjusting an RS region according to an exemplary 1.0 embodiment of the present invention described below may be applied.

Figure 18A:
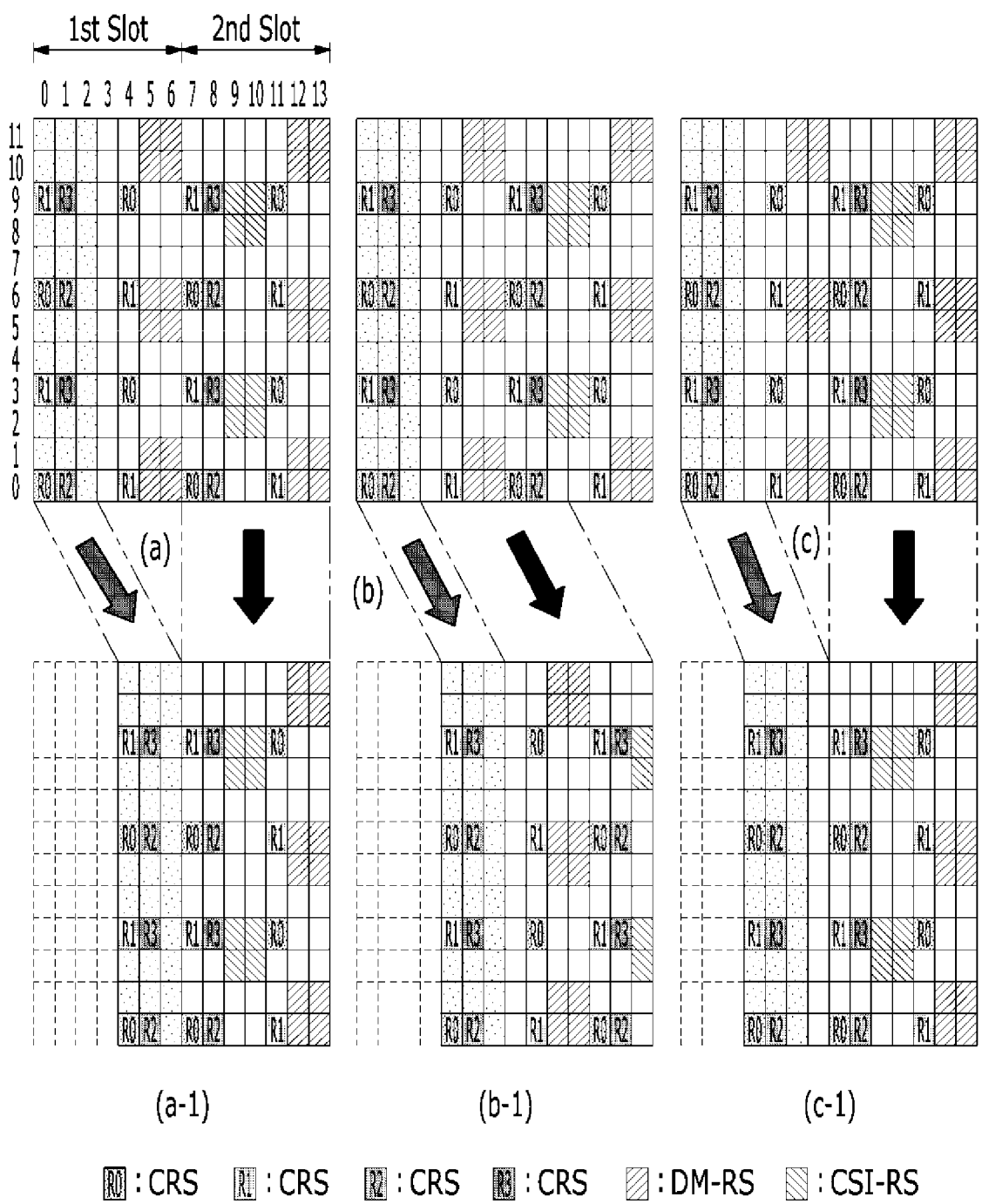
FIG. 18A and 18B are diagrams illustrating the partial subframe including a reference signal region when data are transmitted in a portion of the subframe after the CCA.
Figure 18B:
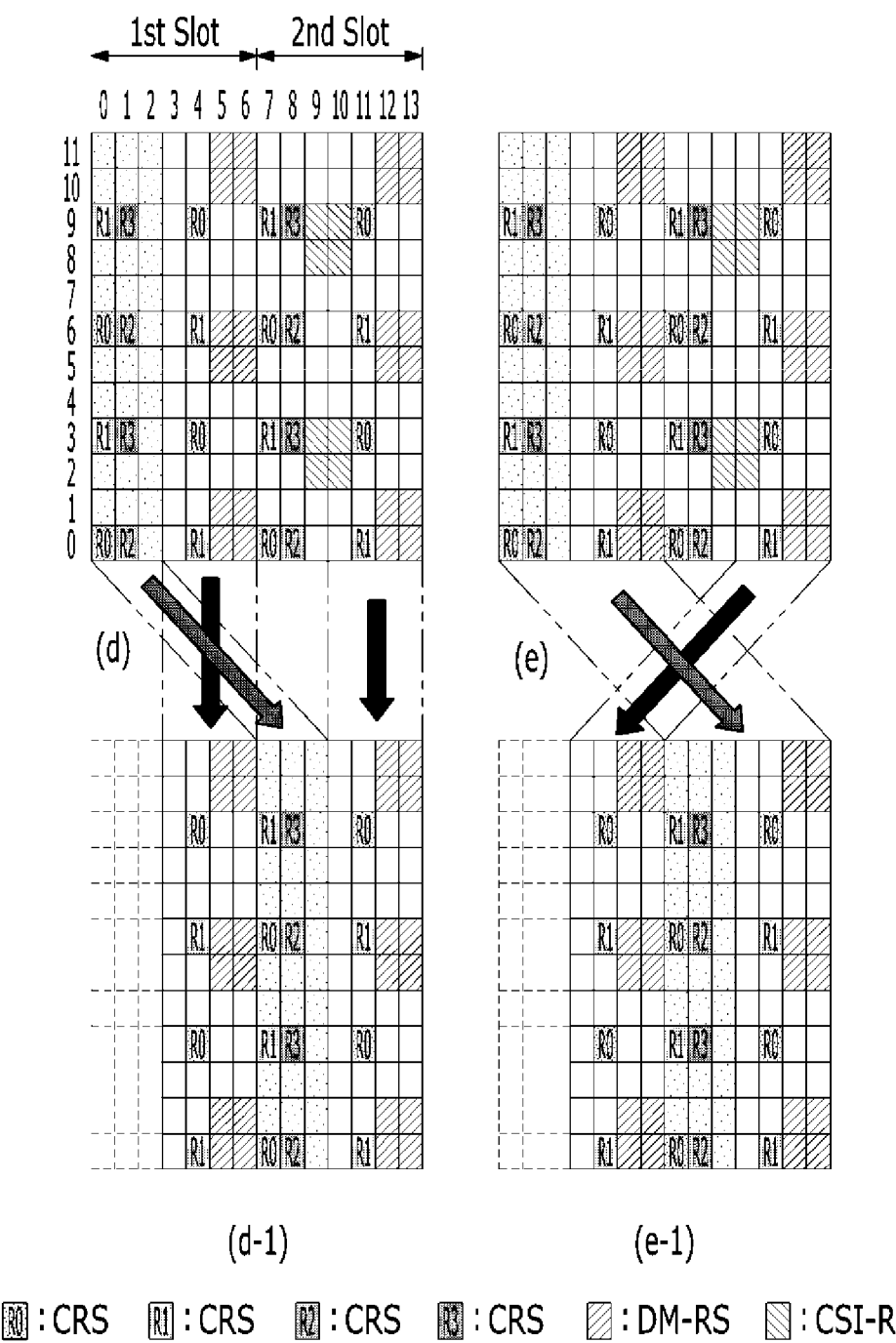

As illustrated in FIGS. 18A and 18B, when only a portion of one subframe is used for the data transmission due to the CCA, the RS region may be configured by one or two combinations of the following configuration methods (method M50, method M51, method M52, method M53, and M54). For convenience of explanation, in FIGS. 18A and 18B, the OFDM symbol number within one subframe is described by Nos. 0 to 13 and OFDM symbol Nos. 0 to 6 are for a first slot and OFDM symbol NOs. 7 to 13 are for a second slot. In particular, the OFDM symbol NOs. 7 to 13 represent the OFDM symbol NOs. 0 to 6 of the second slot.

(a), (b), and (c) of FIGS. 18A and (d) and (e) of FIG. 18B represent the normal subframe including the RS region and (a-1), (b-1), and (c-1) of FIG. 18A and (d-1) and (e-1) of FIG. 18B represent the partial subframe including the adjusted RS region.

The method M50 is a method for shifting the PDCCH region of the normal subframe by the number of first OFDM symbols of the partial subframe to be mapped in the partial subframe and mapping the PDSCH region of the normal subframe at the same position within the partial subframe. That is, the PDCCH region of the normal subframe is mapped in the partial subframe to start from the first OFDM symbol of the partial subframe and the PDSCH region of the normal subframe is mapped at the same position within the partial subframe.

For example, (a) of FIG. 18A illustrates the case in which the OFDM symbol Nos. 0 to 2 are configured as the PDCCH region and (a-1) of FIG. 18A illustrates the case in which the first OFDM symbol of the partial subframe is OFDM symbol No. 4. In this case, the PDCCH region corresponding to the OFDM symbol Nos. 0 to 2 of the normal subframe is mapped in the region corresponding to the OFDM symbol Nos. 4 to 6 of the partial subframe. Further, the PDSCH region corresponding to the OFDM symbol Nos. 7 to 13 of the normal subframe is mapped in the region corresponding to the OFDM symbol Nos. 7 to 13 of the partial subframe. As another example, it is assumed that the OFDM symbol Nos. 0 and 1 of the normal subframe are configured as the PDCCH region and the first OFDM symbol of the partial subframe is the OFDM symbol No. 4. In this case, the PDCCH region corresponding to the OFDM symbol Nos. 0 and 1 of the normal subframe is mapped in a region corresponding to the OFDM symbol Nos. 4 and 5 of the partial subframe and the PDSCH region corresponding to the OFDM symbol Nos. 6 to 13 of the normal subframe is mapped in a region corresponding to the OFDM symbol Nos. 6 to 13 of the partial subframe.

The method M51 is a method for shifting the PDCCH and the PDSCH regions of the normal subframe by the number of first OFDM symbol of the partial subframe. That is, the PDCCH region and the PDSCH region of the normal subframe are mapped to start from the first OFDM symbol of the partial subframe. For example, (b) of FIG. 18A illustrates the case in which the OFDM symbol Nos. 0 to 2 are configured as the PDCCH regions and (b-1) of FIG. 18A illustrates the case in which the first OFDM symbol of the partial subframe is OFDM symbol No. 4. In this case, the region corresponding to the OFDM symbol Nos. 0 to 9 of the normal subframe is mapped in the region corresponding to the OFDM symbol Nos. 4 to 13 of the partial subframe.

The method M52 is a method for configuring a partial subframe in a slot unit. In detail, the method M52 is a method for shifting the first slot of the normal subframe by the number of first OFDM symbols of the partial subframe to be mapped in the partial subframe and mapping a second slot of the normal subframe at the same position within the partial subframe. For example, (c) of FIG. 18A illustrates the case in which the OFDM symbol Nos. 0 to 2 are configured as the PDCCH regions and (c-1) of FIG. 18A illustrates the case in which the first OFDM symbol of the partial subframe is OFDM symbol No. 3. In this case, a region corresponding to OFDM symbol Nos. 0 to 3 of the first slot within the normal subframe is mapped in the region corresponding to the OFDM symbol Nos. 3 to 6 of the first slot within the partial subframe and the PDSCH region corresponding to OFDM symbol Nos. 0 to 6 (OFDM symbol Nos. 7 to 13) of the second slot within the normal subframe is mapped in the region corresponding to the OFDM symbol Nos. 0 to 6 (OFDM symbol Nos. 7 to 13) of the second slot within the partial subframe.

The method M53 is a method for mapping the PDCCH region of the normal subframe to start from the first OFDM symbol of the second slot within the partial subframe and mapping the PDSCH region of the normal subframe at the same position within the partial subframe. That is, in the PDSCH region of the partial subframe, the OFDM symbol number 1:1 maps to the OFDM symbol number for the PDSCH region of the normal subframe. For example, (d) of FIG. 18B illustrates the case in which the OFDM symbol Nos. 0 to 2 are configured as the PDCCH regions and (d-1) of FIG. 18B illustrates the case in which the first OFDM symbol of the partial subframe is OFDM symbol No. 3. In this case, the PDCCH region corresponding to the OFDM symbol Nos. 0 to 2 of the normal subframe is mapped in the region corresponding to the OFDM symbol Nos. 0 to 2 (OFDM symbol Nos. 7 to 9) of the second slot within the partial subframe. Further, the PDSCH region corresponding to the OFDM symbol Nos. 3 to 6 of the normal subframe is mapped in a region corresponding to the OFDM symbol Nos. 3 to 6 of the partial subframe and the PDSCH region corresponding to the OFDM symbol Nos. 10 to 13 of the normal subframe is mapped in a region corresponding to the OFDM symbol Nos. 10 to 13 of the partial subframe. Meanwhile, according to the method M53, positions of resources R0 to R3 for the CRS within the partial subframe are the same as the positions of the resources R0 to R3 for the CRS within the normal subframe.

The method M54 is a method for mapping the second slot of the normal subframe at the first slot of the partial subframe and mapping the first slot of the normal subframe at the second slot of the partial subframe. In particular, the second slot of the normal subframe is omitted by the number of first OFDM symbols of the partial subframe and the rest thereof are mapped at the first slot of the partial subframe. For example, (e) of FIG. 18B illustrates the case in which the OFDM symbol Nos. 0 to 2 are configured as the PDCCH regions and (e-1) of FIG. 18B illustrates the case in which the first OFDM symbol of the partial subframe is OFDM symbol No. 3. In this case, the region corresponding to the OFDM symbol Nos. 0 to 6 of the first slot within the normal subframe is mapped in the region corresponding to the OFDM symbol Nos. 0 to 6 (OFDM symbol Nos. 7 to 13) of the second slot within the partial subframe. Further, the region corresponding to the OFDM symbol Nos. 3 to 6 (OFDM symbol Nos. 10 to 13) of the second slot within the normal subframe is mapped in the region corresponding to the OFDM symbol Nos. 3 to 6 of the first slot within the partial subframe.

Figure 19:
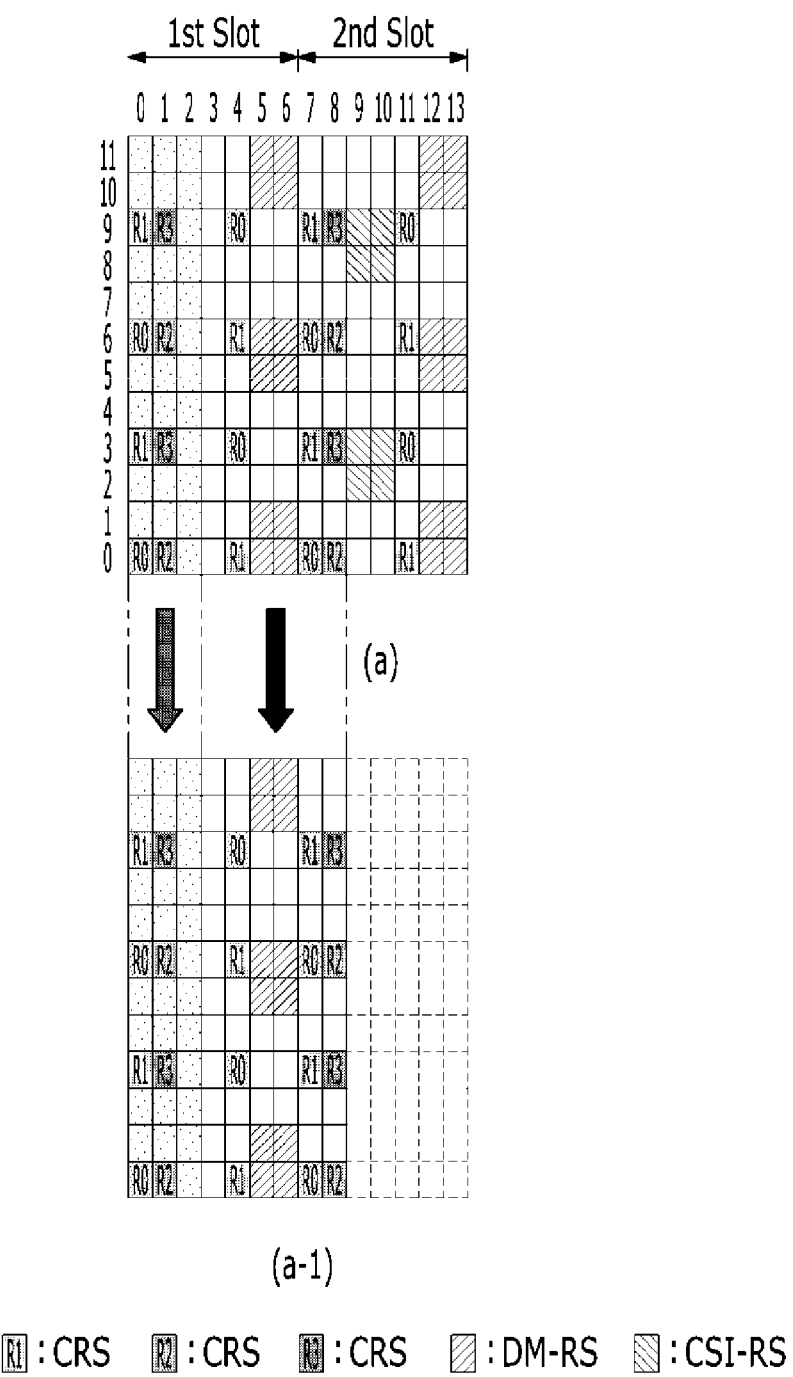
FIG. 19 is a diagram illustrating the partial subframe including an RS region when data are transmitted in a portion of a final subframe within a range in which a maximum COT does not exceed.

FIG. 19 is a diagram illustrating the partial subframe including an RS region when data are transmitted in a portion of a final subframe within a range in which a maximum COT does not exceed. In detail, (a) of FIG. 19 illustrates the normal subframe including the RS region and (a-1) of FIG. 19 illustrates the partial subframe including the adjusted RS region. As illustrated in FIG. 19, the final subframe of the UCC occupied channel may be configured to include (start from the OFDM symbol No. 0) the number of OFDM symbols corresponding to the length of the final subframe. The method illustrated in FIG. 19 is similar to the method M51. For example, (a) of FIG. 19 illustrates the case in which the OFDM symbol Nos. 0 to 2 are configured as the PDCCH region, (a-1) of FIG. 19 illustrates the case in which the final subframe belonging to the COT is the partial subframe and the final OFDM symbol of the partial subframe is OFDM symbol No. 8. In this case, the PDCCH region corresponding to the OFDM symbol Nos. 0 to 2 of the normal subframe is mapped in a region corresponding to the OFDM symbol Nos. 0 to 2 of the partial subframe and the PDSCH region corresponding to the OFDM symbol Nos. 3 to 8 of the normal subframe is mapped in a region corresponding to the OFDM symbol Nos. 3 to 8 of the partial subframe.

1.7.3. Frame Configuration Depending on Channel Occupation of Unlicensed Band

As described above, when the channel of the unlicensed band is occupied, the frame is configured to include the first subframe, the final subframe, the intermediate subframe, and the initial signal (initial signal illustrated in FIGS. 13A to 13C) transmitted if necessary. In detail, the frame is configured within a range which does not exceed the maximum COT as the following Equation 5.

$$\Sigma_{i=0}^{n-1} T_{TX,i} + T_{RSV} \leq \max COT \quad \text{[Equation 5]}$$

In the above Equation 5, $T_{TX,i}$ represents a transmission time of an i-th subframe.

$T_{TX,0}$ represents the transmission time of the first subframe among n subframes belonging to the COT and $T_{TX,n-1}$ represents the transmission time of the final subframe among n subframes belonging to the COT. $T_{TX,0}$ $T_{TX,1}, T_{TX,2}, \ldots, T_{TX,n-2}$ represent a transmission time of $2^{nd}, 3^{rd}, \ldots, n-1^{th}$ subframes of the intermediate subframe among n subframes belonging to the COT. $T_{TX,1}, T_{TX,2}, \ldots, T_{TX,n-2}$ $T_{RSV}$ represents a transmission time of the initial signal when the initial signal is included in the frame. $T_{RSV}$ Meanwhile, the LTE has characteristics of performing the data transmission TTI in the subframe consisting of the OFDM in a 1 ms unit. Due to the characteristics of the LTE, the first subframe other than the initial signal among the subframes belonging to the occupied channel has characteristics of $1_{DataStart} \geq 0$, $1_{DataEnd} = 2 \times N_{symb}^{DL} - 1$ as shown in the above Table 4. In this case, the first subframe belonging to the occupied channel may be configured to include the first OFDM symbol immediately after the initial signal transmission to a $2 \times N_{symb}^{DL} - 1$-th OFDM symbol (final OFDM symbol) of the corresponding subframe. In detail, the first subframe belonging to the occupied channel may be configured by one or two combinations of the following methods (method M60, method M61, method M62, and method M63).

The methods M60 to M63 are a method for configuring $l_{DataStart}$ to be k. Here, k represents the OFDM symbol number in the 1 ms TTI. In detail, k is the OFDM symbol number performing the data transmission after the initial signal transmission and is any integer of $0 \sim 2 \times N_{symb}^{DL}-1$.

The method M60 is the case in which the partial subframe is not allowed (i.e., the same as the method for configuring k to be 0). That is, when only the subframe in the 1 ms unit is allowed, the method M60 configures the first subframe as shown in the following Table 5.

TABLE 5

| $l_{DataStart}$ | $l_{DataEnd}$ | $N_{symb}^{DL,TTI}$ ($= l_{DataEnd} - l_{DataStart} + 1$) |
|---|---|---|
| 0 | $2 \times N_{symb}^{DL} - 1$ | $2 \times N_{symb}^{DL}$ |

The method M61 is a method for configuring k to be 0 or $N_{symb}^{DL}$ when the partial subframe is configured in a slot unit.

That is, $l_{DataStart}=0$ or $N_{symb}^{DL}$, $l_{DataEnd}=N_{symb}^{DL}-1$ or $2 \times N_{symb}^{DL}-1$ and $N_{symb}^{DL,TTI}=N_{symb}^{DL}$. The method M61 configures the first subframe as shown in the following Table 6.

TABLE 6

| $l_{DataStart}$ | $l_{DataEnd}$ | $N_{symb}^{DL,TTI}$ ($= l_{DataEnd} - l_{DataStart} + 1$) | Note |
|---|---|---|---|
| 0 | $N_{symb}^{DL} - 1$ | $N_{symb}^{DL}$ | Second Subframe is also configured in slot unit and subframes since second subframe are configured of slot (0.5 ms)/1 ms subframe |
| $N_{symb}^{DL}$ | $2 \times N_{symb}^{DL} - 1$ | $N_{symb}^{DL}$ | Subframes since first subframe are configured of slot (0.5 ms)/1 ms subframe |

The method M62 is a method for configuring k to be 0 or synth when the subframe is configured in the slot unit or the 1 ms subframe (normal subframe) unit. That is, and $l_{DataStart}=0$ or $N_{symb}^{DL}$ and $l_{DataEnd}=2 \times N_{symb}^{DL}-1$ and, $N_{symb}^{DL,TTI}=2 \times N_{symb}^{DL}$ or $N_{symb}^{DL}$. The method M62 configures the first subframe as shown in the following Table 7.

TABLE 7

| $l_{DataStart}$ | $l_{DataEnd}$ | $N_{symb}^{DL,TTI}$ ($= l_{DataEnd} - l_{DataStart} + 1$) |
|---|---|---|
| 0 | $2 \times N_{symb}^{DL} - 1$ | $2 \times N_{symb}^{DL}$ |
| $N_{symb}^{DL}$ | $2 \times N_{symb}^{DL} - 1$ | $N_{symb}^{DL}$ |

The method M63 is a method for configuring $N_{symb}^{DL,TTI}$ to be one of 3, 9, 10, 11, 12, and 6 defined in the 3GPP specification when $N_{symb}^{DL,TTI}$ is configured as one of the configurable lengths of the DwPTS within the special subframe defined in the LTE frame structure type 2 (TDD). The method M63 configures the first subframe as shown in the following Table 8.

TABLE 8

| $l_{DataStart}$ | $l_{DataEnd}$ | $N_{symb}^{DL,TTI}$ ($= l_{DataEnd} - l_{DataStart} + 1$) | Note (DwPTS having same size) |
|---|---|---|---|
| $2 \times N_{symb}^{DL} - 3$ | $2 \times N_{symb}^{DL} - 1$ | 3 | Special subframe conf. 0.3 |
| $2 \times N_{symb}^{DL} - 9$ | $2 \times N_{symb}^{DL} - 1$ | 9 | Special subframe conf. 1.6 |
| $2 \times N_{symb}^{DL} - 10$ | $2 \times N_{symb}^{DL} - 1$ | 10 | Special subframe conf. 2.7 |
| $2 \times N_{symb}^{DL} - 11$ | $2 \times N_{symb}^{DL} - 1$ | 11 | Special subframe conf. 3.8 |
| $2 \times N_{symb}^{DL} - 12$ | $2 \times N_{symb}^{DL} - 1$ | 12 | Special subframe conf. 4 |
| $2 \times N_{symb}^{DL} - 6$ | $2 \times N_{symb}^{DL} - 1$ | 6 | Special subframe conf. 9 |

Meanwhile, the final subframe within the limited COT of the channel occupied after the CCA is performed has characteristics of $l_{DataStart}=0$, $l_{DataEnd} \leq 2 \times N_{symb}^{DL}-1$ as shown in Table 4. The subframe may be configured to include the number of largest OFDM symbols of the final subframe satisfying the conditions of the above Equation 5. In detail, the final subframe belonging to the occupied channel may be configured by one or two combinations of the following methods (method M70, method M71, method M72, and method M73).

The methods M70, the method M71, the method M72, and the method M73 are a method for configuring $l_{DataEnd}$ to be m. Here, m represents the OFDM symbol number within the 1 ms TTI. In detail, m is the OFDM symbol number satisfying the condition of the above Equation 5 and is any integer between 0 and $2 \times N_{symb}^{DL}-1$.

The method M70 may be operated (configured) to be the same as the method for configuring m to be $2 \times N_{symb}^{DL}-1$ when the partial subframe is not allowed. That is, when only the subframe (normal subframe) in the 1 ms unit is allowed, the method M70 configures the final subframe as shown in the following Table 9.

TABLE 9

| $l_{DataStart}$ | $l_{DataEnd}$ | $N_{symb}^{DL,TTI}$ ($= l_{DataEnd} - l_{DataStart} + 1$) |
|---|---|---|
| 0 | $2 \times N_{symb}^{DL} - 1$ | $2 \times N_{symb}^{DL}$ |

The method M71 is a method for configuring m to be $N_{symb}^{DL}-1$ or $2 \times N_{symb}^{DL}-1$ when the partial subframe is configured in the slot unit. That is, $l_{DataStart}=0$ or $N_{symb}^{DL}$, $l_{DataEnd}=N_{symb}^{DL}-1$ or $2 \times N_{symb}^{DL}-1$ and $N_{symb}^{DL,TTI}=N_{symb}^{DL}$. The method M71 configures the final subframe as shown in the following Table 10.

TABLE 10

| $l_{DataStart}$ | $l_{DataEnd}$ | $N_{symb}^{DL,TTI}$ ($= l_{DataEnd} - l_{DataStart} + 1$) | Note |
|---|---|---|---|
| 0 | $N_{symb}^{DL} - 1$ | $N_{symb}^{DL}$ | — |
| $N_{symb}^{DL}$ | $2 \times N_{symb}^{DL} - 1$ | $N_{symb}^{DL}$ | Subframe just before DRS transmisssion is also configured in slot unit |

The method M72 is a method for configuring m to be $N_{symb}^{DL}-1$ or $2 \times N_{symb}^{DL}-1$ when the subframe is configured in the slot unit or the 1 ms subframe (normal subframe) unit. That is, $l_{DataStart}=0$ and, $l_{DataEnd}=N_{symb}^{DL}+1$ or $2 \times N_{symb}^{DL}-1$ and, $N_{symb}^{DL,TTI}=N_{symb}^{DL}$ or $2 \times N_{symb}^{DL}$. The method M72 configures the final subframe as shown in the following Table 11.

TABLE 11

| $l_{DataStart}$ | $l_{DataEnd}$ | $N_{symb}^{DL,TTI}$ ($= l_{DataEnd} - l_{DataStart} + 1$) |
|---|---|---|
| 0 | $N_{symb}^{DL} - 1$ | $N_{symb}^{DL}$ |
| 0 | $2 \times N_{symb}^{DL} - 1$ | $2 \times N_{symb}^{DL}$ |

The method M73 is a method for configuring $N_{symb}^{DL,TTI}$ to be one of 3, 9, 10, 11, 12, and 6 defined in the 3GPP specification when $N_{symb}^{DL,TTI}$ is configured as one of the configurable lengths of the DwPTS within the special subframe defined in the LTE frame structure type 2 (TDD). The method M73 configures the final subframe as shown in the following Table 12.

TABLE 12

| $l_{DataStart}$ | $l_{DataEnd}$ | $N_{symb}^{DL,TTI}$ ($= l_{DataEnd} - l_{DataStart} + 1$) | Note (DwPTS having same size) |
|---|---|---|---|
| 0 | 2 | 3 | Special subframe conf. 0.5 |
| 0 | 8 | 9 | Special subframe conf. 1.6 |
| 0 | 9 | 10 | Special subframe conf. 2.7 |
| 0 | 11 | 12 | Special subframe conf. 3.8 |
| 0 | 11 | 12 | Special subframe conf. 4 |
| 0 | 5 | 6 | Special subframe conf. 9 |

Meanwhile, the base station transmits any signal (blocking signal: for example, signal including the same information as the information of the initial signal, any dummy signal, or the like) from the timing when the CCA is performed/ends to before the initial signal is transmitted (i.e., duration other than the duration in which data are transmitted and the duration in which the initial signal is transmitted), thereby allowing other operating apparatuses in the unlicensed band not to occupy the channel.

In particular, the duration in which data are transmitted means $l_{DataStart}(=2 \times N_{symb}^{DL}-1-T_{TX,0})$ to $l_{DataEnd}(=2 \times N_{symb}^{DL}-1)$ and the duration in which the initial signal is transmitted means $l_{DataStart}-T_{RSV}$.

Hereinafter, a method for configuring the frame within the COT depending on the above Equation 5 will be described in detail with reference to FIGS. 20 to 26. Hereinafter, it is assumed that the maximum COT is C (=predetermined time such as 4, 10, and 13 ms) and the initial signal has a 1 OFDM symbol length (for example, changeable to OFDM symbol units of 0, 2, 3, etc., or a predetermined time). Further, it is assumed that the blocking signal is used to allow the base station to perform the operation of the OFDM symbol unit after ending the CCA or prevent other operating apparatuses in the unlicensed band from being accessed to the channel and may have a time of a unit smaller than the OFDM symbol, the OFDM symbol unit, a unit larger than the OFDM symbol, or the like.

All the first subframe, the final subframe, and the intermediate subframe are not the subframe consisting of only some OFDM symbols within the 1 TTI or only the first subframe or only the final subframe may be the subframe consisting of only some OFDM symbols within 1 TTI. Hereinafter, it is assumed that one of the first subframe and the final subframe or both of the first subframe and the final subframe are the subframe consisting of only some OFDM symbols within the 1 TTI.

The case in which the intermediate subframe other than the first subframe and the final subframe among the subframes belonging to the COT has the 1 TTI length (as one subframe unit, defined as 1 ms in the LTE) will be described. If the first subframe and the final subframe are the partial subframe consisting of only some OFDM symbols within the subframe as described above, the first subframe and the final subframe may satisfy the following Equation 6.

$$[T_{TX,0}+T_{TX,n-1}+T_{RSV}] \leq n \qquad \text{[Equation 6]}$$

In the above Equation 6, n (=0, 1, . . . , C)≤C. C.

The length of the final subframe may be derived through the first subframe, the initial signal and blocking signal depending on Equations 5 and 6 or may be indicated by the initial signal or the predefined method (final subframe mapping, etc., depending on the first subframe).

Meanwhile, the case in which the subframe of the occupied channel is configured to include the subframe of the slot unit (for example, 0.5 ms) will be described.

Figure 20:
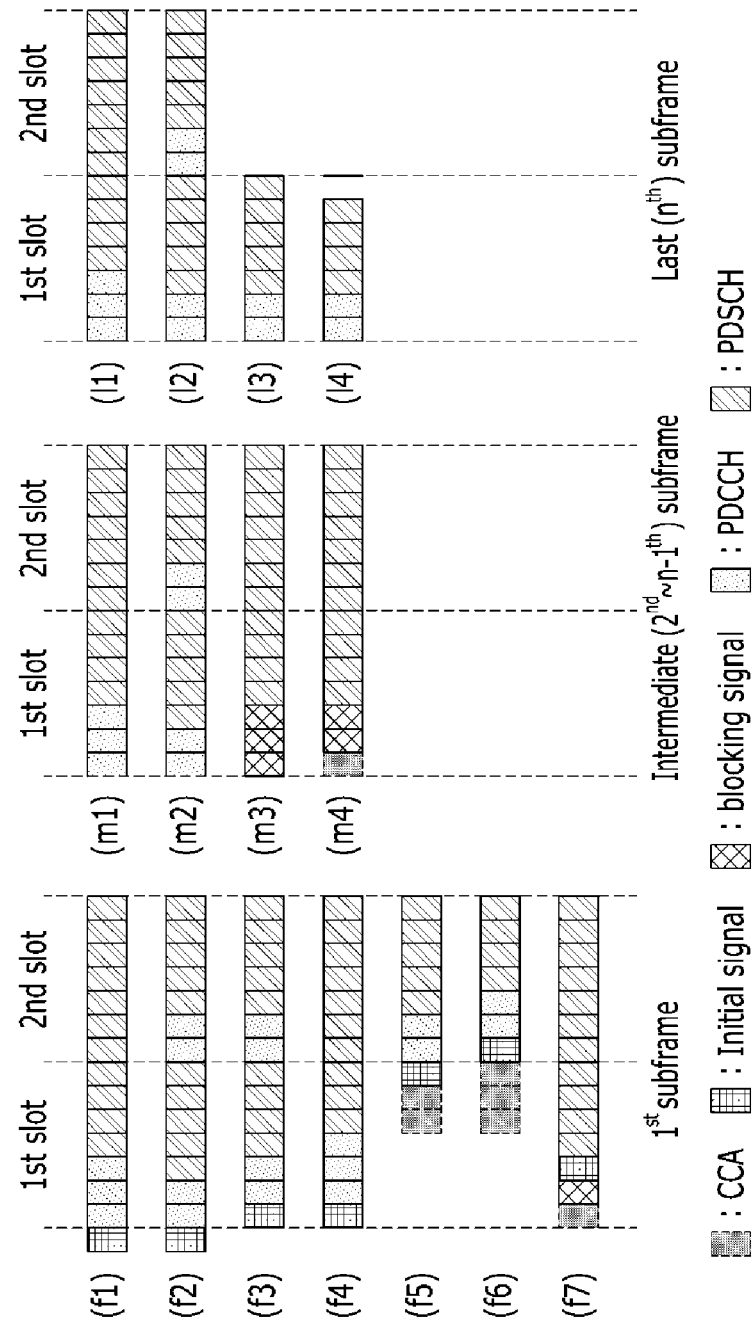
FIG. 20 is a diagram illustrating a first subframe, an intermediate subframe, and a final subframe of an occupied channel.

FIG. 20 is a diagram illustrating the first subframe, the intermediate subframe, and the final subframe of the occupied channel. In FIG. 20, the starting and ending of the first subframe are made in the slot unit.

As illustrated in (f1), (f2), and (f5) of FIG. 20, if the CCA ends before the slot starts, the base station transmits the initial signal or the blocking signal up to the starting timing of the slot to perform the data transmission while allowing other operating apparatuses in the unlicensed band not to occupy the channel.

As illustrated in (f3) and (f6) of FIG. 20, the first subframe includes the initial signal and may be configured in the slot unit.

As illustrated in (f4) of FIG. 20, the first subframe may be limited to the subframe length of the 1 ms TTI.

Further, as illustrated in (f7) of FIG. 20, the base station may also perform the CCA, the initial signal transmission, the blocking signal transmission, etc., instead of transmitting the PDCCH in the PDCCH region within the first subframe.

To this end, the base station may be defined (or configured) to perform (start, end) the CCA as follows by reflecting the characteristics of the LTE consisting of the subframe and the OFDM symbol unit. In detail, the base station may be configured (operated) to perform (start, end) the CCA before the subframe boundary, before the PDCCH ending (PDSCH starting or EPDCCH starting), or before the slot boundary. The base station notifies (configures) the terminal of the data transmission timing to allow the terminal to perform the operation for receiving data at the data transmission timing. In particular, the data transmission timing may include the size of the first/final subframe (or starting/ending position) and the terminal may efficiently perform the operation for receiving data by recognizing the notified (configured) data transmission timing.

In particular, the definition of the CCA duration observes the unlicensed band frequency operating provisions and the base station may be applied for the channel occupation (or use) when occupying (or using) the additional channel after the COT expires and when being operated to be suited for the subframe time synchronization (for example, HARQ ACK/NACK of data transmission, uplink data transmission in response to UL grant, data transmission (for example, dedicated RS (DRS)) having a predetermined period, etc.). To this end, the base station may perform the CCA as follows.

The base station may perform the CCA in the PDCCH transmission region (for example, OFDM symbol Nos. 0 to 3).

Alternatively, when performing an additional data transmission after a previous data transmission, the base station may also perform (start, end) the CCA before the subframe first arriving after the previous data transmission starts or before the PDCCH transmission region (for example, OFDM symbol Nos. 0 to 3) within the subframe first arriving after the previous data transmission. In detail, the base station may perform (start, end) the CCA in the PDCCH transmission region when the final subframe of the previous data transmission ends in some OFDM symbols in the PDCCH transmission region within the subframe. The base station may perform (start, end) the CCA before the duration (for example, OFDM symbol Nos. 2, 8, 9, and 11) corresponding to the DwPTS defined in the TDD frame when the final subframe of the previous data transmission ends after the PDCCH transmission region within the subframe.

When the intermediate subframe newly transmitted after the second slot secures the COT by the complete TTI, the intermediate subframe may consist of the subframe by the normal TTI as illustrated in m1 of FIG. 20 or be configured in the slot unit as illustrated in m2 of FIG. 20.

Alternatively, as illustrated in (m3) and (m4) of FIG. 20, the base station may transmit the blocking signal (or initial signal or blocking signal+initial signal) or perform the CCA, instead of transmitting the PDCCH in the PDCCH region within the intermediate subframe.

As illustrated in (l1), (l2), and (l3) of FIG. 20, the final subframe may be transmitted to be suited for the slot ending timing or the TTI ending timing. Alternatively, as illustrated in (l4) of FIG. 20, the final subframe may consist of the subframe of the slot unit depending on Equations 5 and 6 or the subframe corresponding to the applicable longest length among the lengths defined in the DwPTS. For example, (l4) of FIG. 20 illustrates the case in which the final subframe corresponds to special subframe configuration No. 9.

Figure 21:
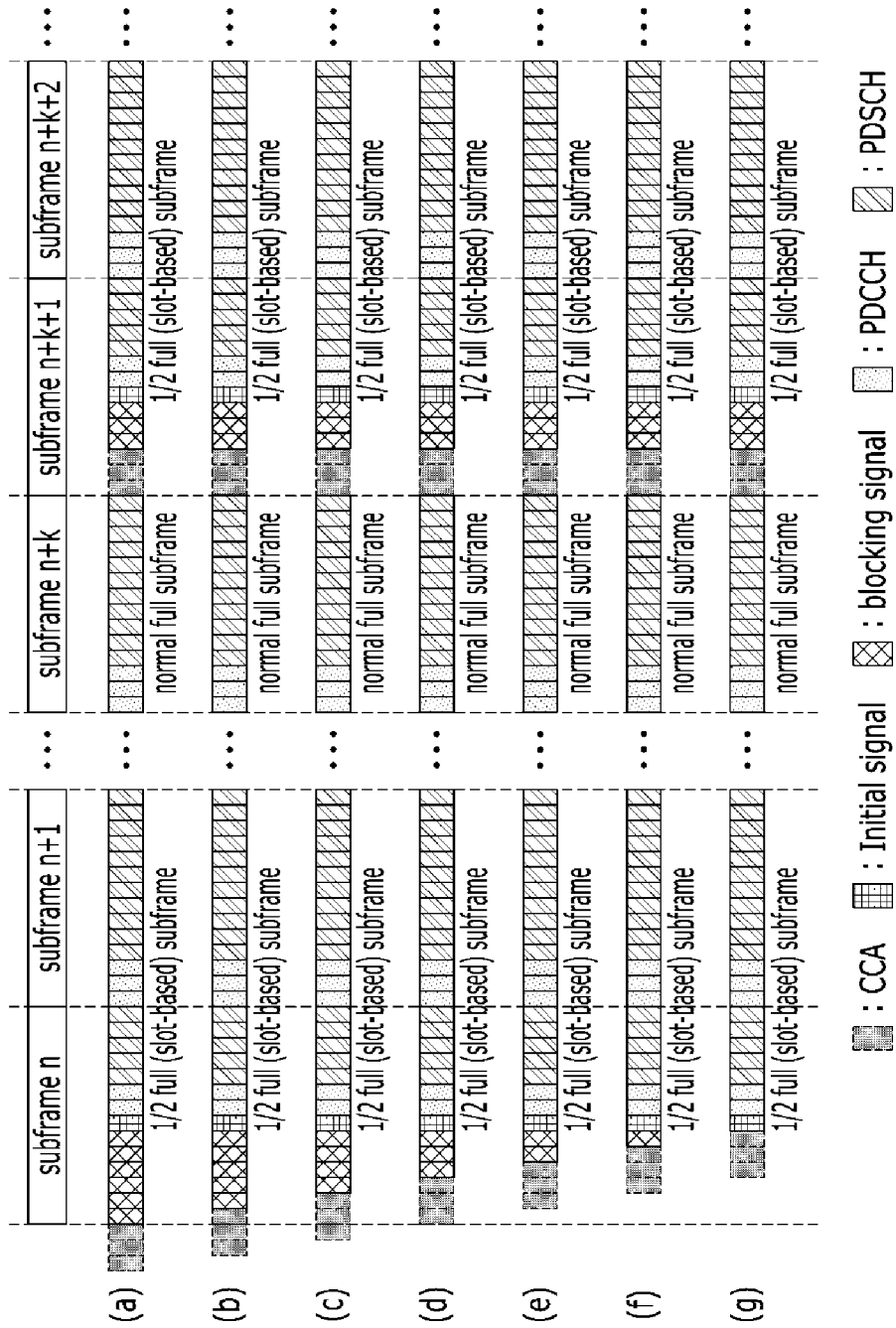
FIG. 21 is a diagram illustrating a case in which after the CCA, a PDCCH+PDSCH region of the first subframe has a time slot length and a PDCCH+PDSCH region of the final subframe has a normal subframe length (1 TTI length).
Figure 22:
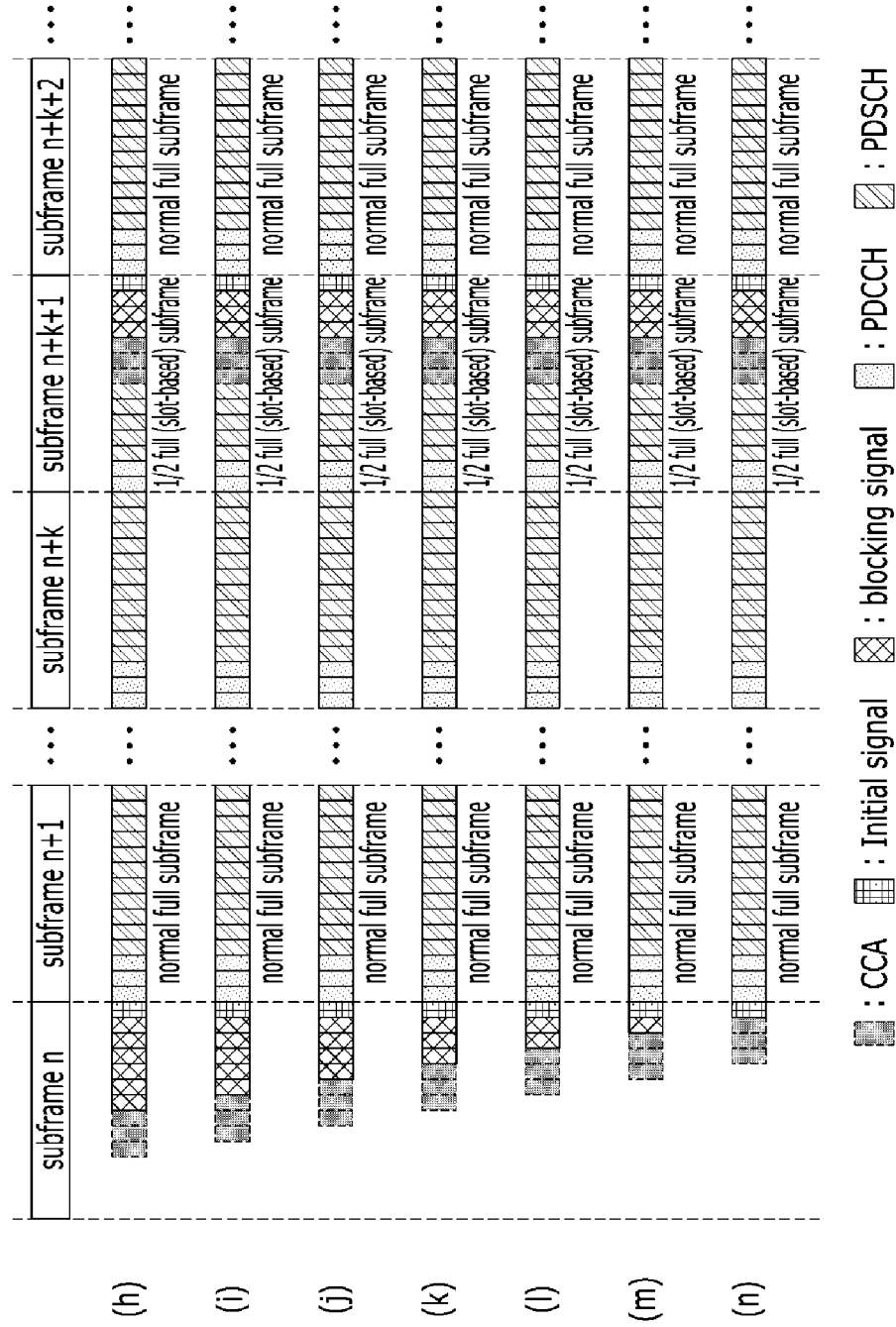
FIG. 22 is a diagram illustrating a case in which after the CCA, the PDCCH+PDSCH region of the first subframe has the normal subframe length (1 TTI length) and the PDCCH+PDSCH region of the final subframe has the time slot length.

FIGS. 21 and 22 illustrate the case in which the first subframe and the final subframe of the occupied channel consist of a slot (½ full subframe or slot-based subframe) or the normal subframe (normal full subframe), according to an exemplary embodiment of the present invention. In FIGS. 21 and 22, it is assumed that max COT≤k(ms).

In detail, in FIG. 21, the PDCCH+PDSCH region of the first subframe (subframe n) after the CCA has the slot length (½ TTI length) and the PDCCH+PDSCH region of the final subframe (subframe n+k) has the normal subframe length (1 TTI length). In FIG. 22, the PDCCH+PDSCH region of the first subframe (subframe n+1) after the CCA has the normal subframe length (1 TTI length) and the PDCCH+PDSCH region of the final subframe (subframe n+k+1) has the time slot length (½ TTI length).

Figure 23:
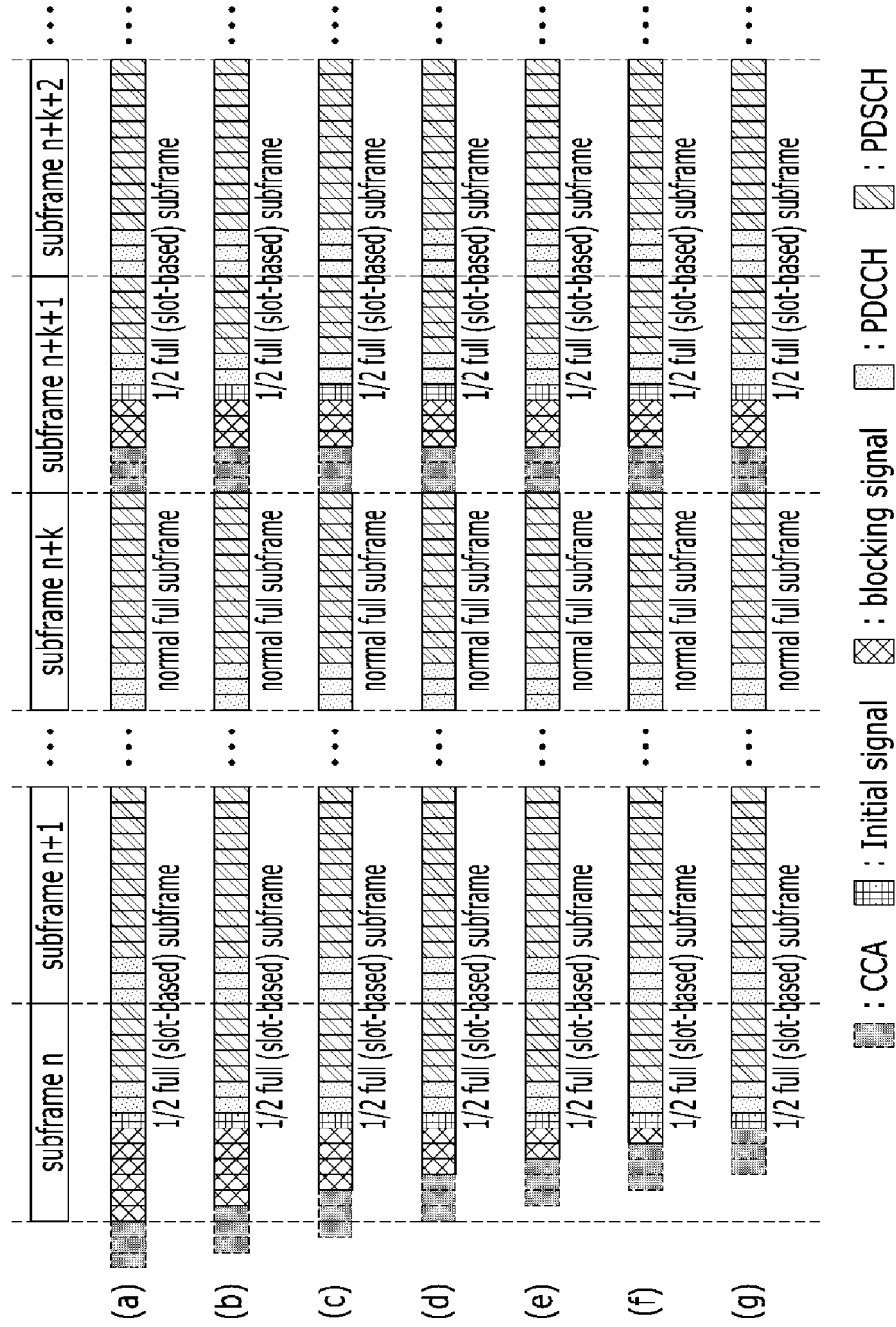
FIG. 23 is a diagram illustrating a case in which among the subframes of the occupied channel, the PDCCH+PDSCH region of the first subframe has the time slot length and the PDCCH+PDSCH region of the rest subframe has the normal subframe length (1 TTI length).
Figure 24:
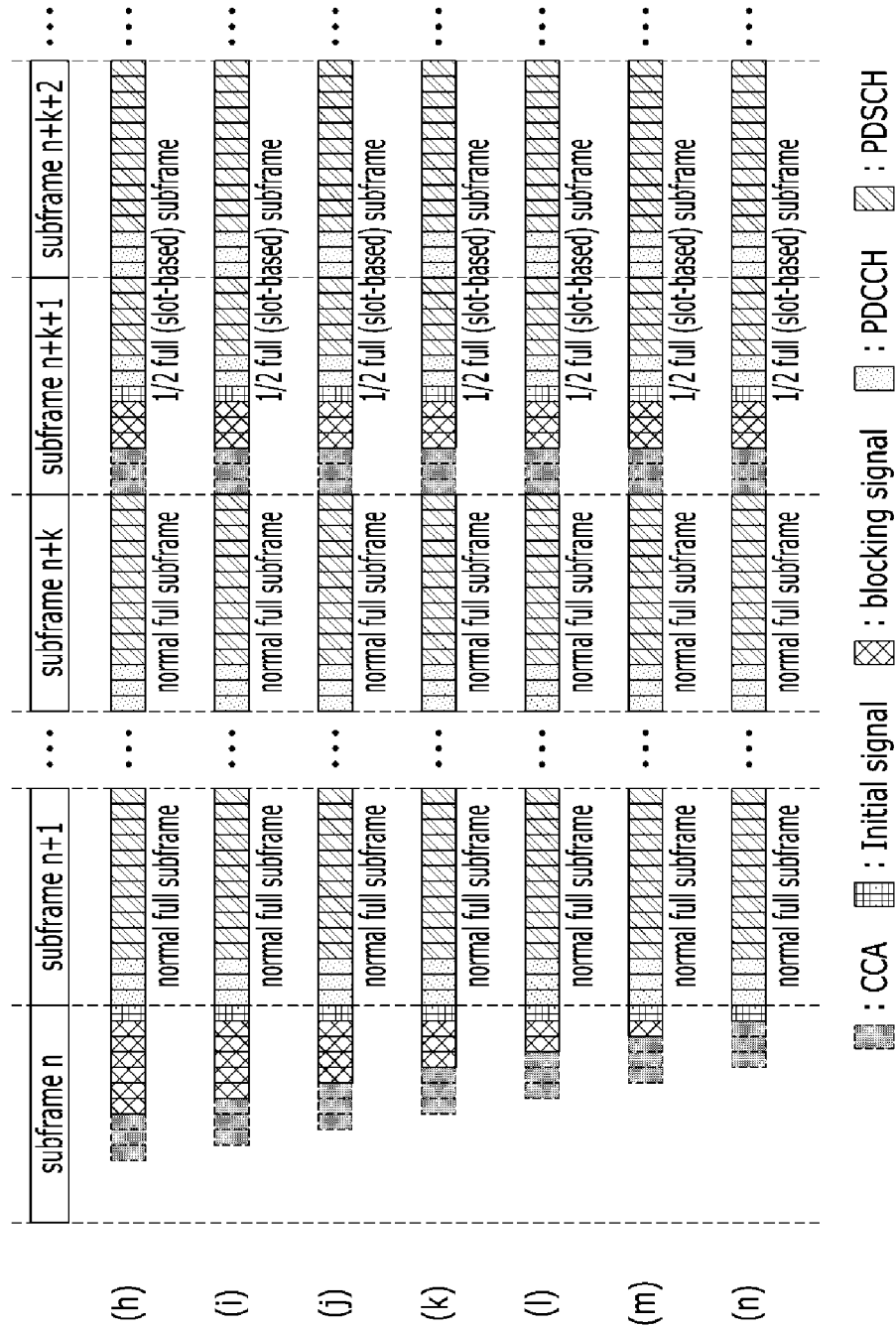
FIG. 24 is a diagram illustrating a case in which among the subframes of the occupied channel, the PDCCH+PDSCH region of the first subframe has the time slot length or the normal subframe length (1 TTI length) and the PDCCH+PDSCH region of the rest subframe has the normal subframe length (1 TTI length).

FIGS. 23 and 24 illustrate the case in which only the first subframe of the occupied channel consists of the slot (½ full subframe or slot-based subframe) or the normal subframe. In FIGS. 23 and 24, it is assumed that max COT≤k(ms).

In detail, in FIG. 23, the PDCCH+PDSCH region of the first subframe (subframe n, or subframe n+k+1) among the subframes belonging to the occupied channel has the time slot length (½ TTI length) and the PDCCH+PDSCH region of the rest subframes (subframe n+1, n+2, . . . , n+k) has the normal subframe length (1 TTI length). In FIG. 24, the PDCCH+PDSCH region of the first subframe (subframe n+1, or subframe n+k+1) among the subframes belonging to the occupied channel has the normal subframe length (1 TTI length) or the time slot length (½ TTI length) and the PDCCH+PDSCH region of the rest subframes (for example, subframe n+2, n+3, . . . , n+k) has the normal subframe length (1 TTI length).

The base station configures (or transmits) the subframe to be suited for an align of the slot starting timing based on the initial signal and the blocking signal and the starting of the slot to the normal subframe.

When the final subframe is configured to have 1 ms or 1 slot length, the base station may transmit the final subframe (subframe n+k+1) to be suited for the first slot (within 1 TTI) ending timing within the maximum COT and release the occupied channel as illustrated in FIG. 22 and may transmit the final subframe (subframe n+k) to be suited for the second slot ending timing which is the subframe boundary and may also release the occupied channel as illustrated in FIGS. 21, 23, and 24.

The base station may perform the CCA (hereinafter, 'first CCA') to first access (or occupy, use) the channel and perform the CCA (hereinafter, 'second CCA') to reuse the channel after a max COT. Since the final subframe of the COT by the first CCA consists of the slot or the normal subframe, the subframe after the second CCA may be determined depending on the final subframe within the previous COT. For example, as illustrated in FIGS. 21, 23, and 24, when the final subframe (subframe n+k) of the COT by the first CCA consists of the normal subframe, the PDCCH+PDSCH region within the first subframe (subframe n+k+1) of the COT by the second CCA has the slot unit length (½ TTI length). As another example, as illustrated in FIG. 22, when the PDCCH+PDSCH region within the final subframe (subframe n+k+1) of the COT by the first CCA has the time slot length (½ TTI length), the PDCCH+PDSCH region within the first subframe (subframe n+k+2) of the COT by the second CCA has the normal subframe length (1 TTI length).

The exemplary embodiments illustrated in (a), (b), (c), (d), (e), (f), and (g) of FIG. 21 and (h), (i), (j), (k), (l), (m), and (n) of FIG. 22 have different performance timings of the first CCA.

Further, the exemplary embodiments illustrated in (a), (b), (c), (d), (e), (f), and (g) of FIG. 23 and (h), (i), (j), (k), (l), (m), and (n) of FIG. 24 have different performance timings of the first CCA.

Meanwhile, the case in which the first subframe consists of the partial subframe by the length defined in the normal subframe (1 ms TTI length) or the DwPTS will be described.

Figure 25:
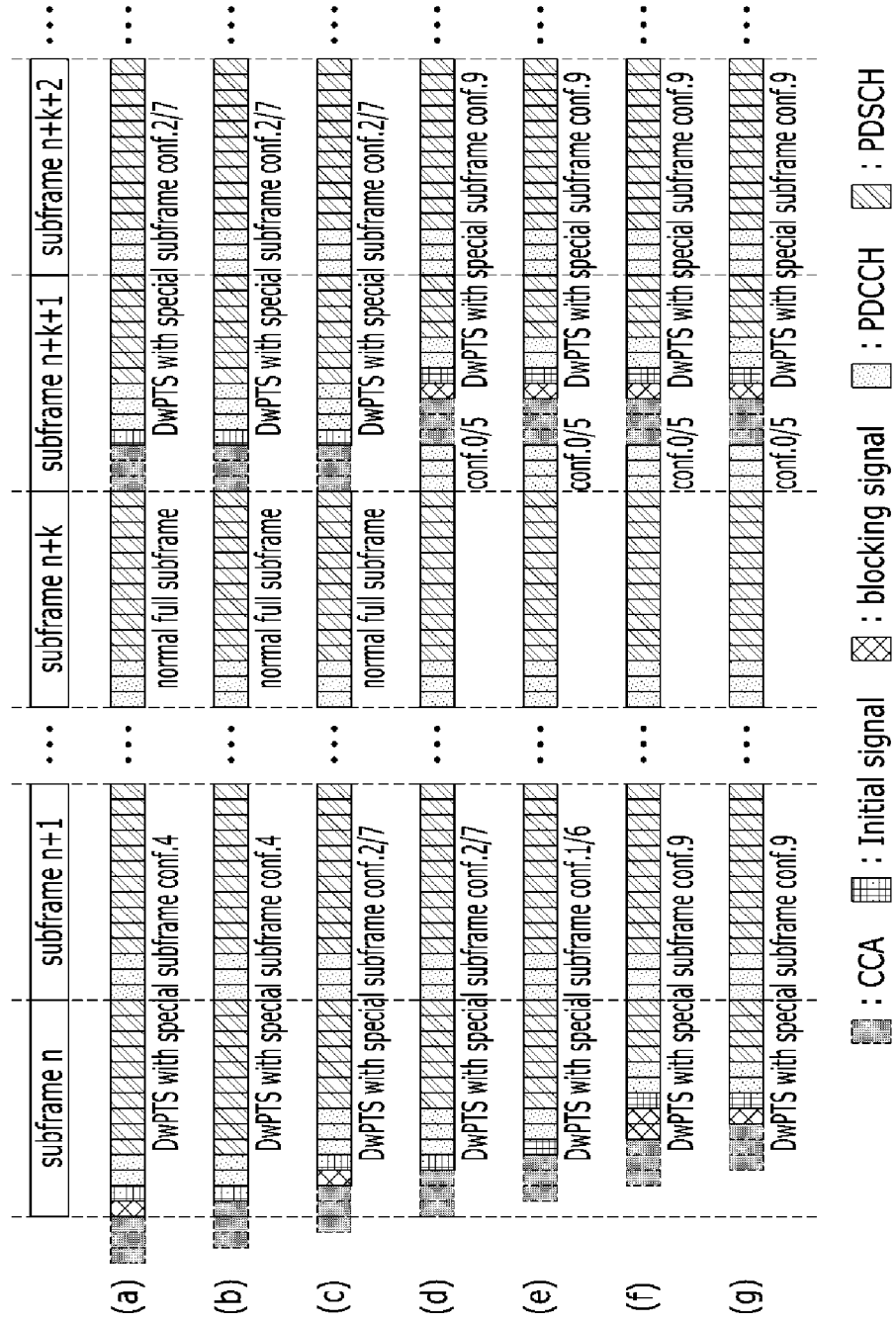
FIGS. 25 and 26 are diagrams illustrating a case in which the PDCCH+PDSCH region of the subframe belonging to the occupied channel has a downlink pilot time slot (DwPTS) length or a normal subframe length (1 TTI length).
Figure 26:
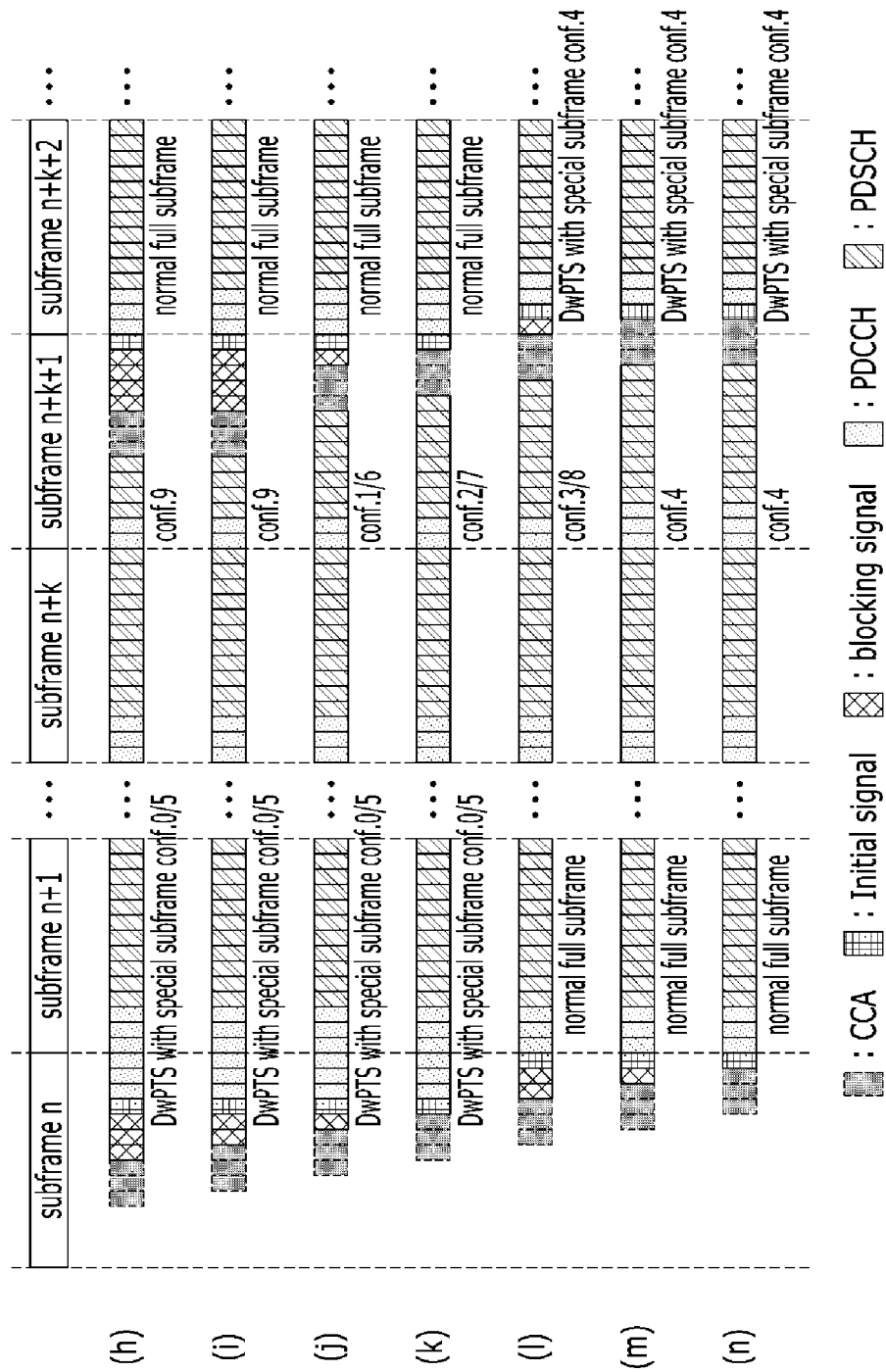

As illustrated in FIGS. 25 and 26, the longest DwPTS among the DwPTSs which may be used within the length (or time) up to the starting of the subsequent subframe based on the CCA ending timing may be applied to the first subframe. In detail, as shown in the following Table 13, the configuration of the first subframe may be determined depending on the CCA ending timing and the initial signal transmission timing.

As illustrated in (f) and (g) of FIG. 25, the PDCCH+PDSCH region of the first subframe (subframe n or subframe n+k+1) among the subframes belonging to the occupied channel may have the length of the DwPTS for the special subframe configuration 9 and the PDCCH+PDSCH region of the final subframe (subframe n+k+1) may have the length of the DwPTS for the special subframe configuration 0/5.

As illustrated in (h) and (i) of FIG. 26, the PDCCH+PDSCH region of the first subframe (subframe n or subframe n+k+2) among the subframes belonging to the occupied channel may have the length of the DwPTS for special subframe configuration 0/5 or the normal subframe length (1 TTI length) and the PDCCH+PDSCH region of the final

TABLE 13

| CCA ending + initial signal transmission | $l_{DataStart}$ | $l_{DataEnd}$ | $N_{symb}^{DL,TTI}$ ($= l_{DataEnd} - l_{DataStart} + 1$) | Note (DwPTS having same size) |
|---|---|---|---|---|
| $0.2 \times N_{symb}^{DL} - 13$ | $2 \times N_{symb}^{DL} - 12$ | $2 \times N_{symb}^{DL} - 1$ | 12 | Special subframe conf. 4 |
| $2 \times N_{symb}^{DL} - 12$ | $2 \times N_{symb}^{DL} - 11$ | $2 \times N_{symb}^{DL} - 1$ | 11 | Special subframe conf. 3.8 |
| $2 \times N_{symb}^{DL} - 11$ | $2 \times N_{symb}^{DL} - 10$ | $2 \times N_{symb}^{DL} - 1$ | 10 | Special subframe conf. 2.7 |
| $2 \times N_{symb}^{DL} - 10$ | $2 \times N_{symb}^{DL} - 9$ | $2 \times N_{symb}^{DL} - 1$ | 9 | Special subframe conf. 1.6 |
| $2 \times N_{symb}^{DL} - 9.2 \times N_{symb}^{DL} - 7$ | $2 \times N_{symb}^{DL} - 6$ | $2 \times N_{symb}^{DL} - 1$ | 6 | Special subframe conf. 9 |
| $2 \times N_{symb}^{DL} - 7.2 \times N_{symb}^{DL} - 4$ | $2 \times N_{symb}^{DL} - 3$ | $2 \times N_{symb}^{DL} - 1$ | 3 | Special subframe conf. 0.5 |
| $2 \times N_{symb}^{DL} - 4.2 \times N_{symb}^{DL} - 1$ | 0 | $2 \times N_{symb}^{DL} - 1$ | $2 \times N_{symb}^{DL}$ | Normal subframe |

FIG. 25 and FIG. 26 illustrate the case in which the PDCCH+PDSCH region of the subframe belonging to the occupied channel has the DwPTS length or the normal subframe length (1 TTI length). In FIGS. 25 and 26, it is assumed that max COT≤k(ms).

As illustrated in (a) and (b) of FIG. 25, the PDCCH+PDSCH region of the first subframe (subframe n or subframe n+k+1) among the subframes belonging to the occupied channel may have a length of the DwPTS for special subframe configuration 4 or a length of the DwPTS for special subframe configuration 2/7 and the PDCCH+PDSCH region of the final subframe (subframe n+k) may have the normal subframe length (1 TTI length).

As illustrated in (c) of FIG. 25, the PDCCH+PDSCH region of the first subframe (subframe n or subframe n+k+1) among the subframes belonging to the occupied channel may have the length of the DwPTS for the special subframe configuration 2/7 and the PDCCH+PDSCH region of the final subframe (subframe n+k) may have the normal subframe length (1 TTI length).

As illustrated in (d) of FIG. 25, the PDCCH+PDSCH region of the first subframe (subframe n or subframe n+k+1) among the subframes belonging to the occupied channel may have the length of the DwPTS for the special subframe configuration 2/7 or a length of the DwPTS for special subframe configuration 9 and the PDCCH+PDSCH region of the final subframe (subframe n+k+1) may have a length of the DwPTS for special subframe configuration 0/5.

As illustrated in (e) of FIG. 25, the PDCCH+PDSCH region of the first subframe (subframe n or subframe n+k+1) among the subframes belonging to the occupied channel may have the length of the DwPTS for the special subframe configuration 1/6 or the length of the DwPTS for the special subframe configuration 9 and the PDCCH+PDSCH region of the final subframe (subframe n+k+1) may have the length of the DwPTS for the special subframe configuration 0/5.

subframe (subframe n+k+1) may have the length of the DwPTS for the special subframe configuration 9.

As illustrated in (j) of FIG. 26, the PDCCH+PDSCH region of the first subframe (subframe n or subframe n+k+2) among the subframes belonging to the occupied channel may have the length of the DwPTS for special subframe configuration 0/5 or the normal subframe length (1 TTI length) and the PDCCH+PDSCH region of the final subframe (subframe n+k+1) may have the length of the DwPTS for the special subframe configuration 1/6.

As illustrated in (k) of FIG. 26, the PDCCH+PDSCH region of the first subframe (subframe n or subframe n+k+2) among the subframes belonging to the occupied channel may have the length of the DwPTS for special subframe configuration 0/5 or the normal subframe length (1 TTI length) and the PDCCH+PDSCH region of the final subframe (subframe n+k+1) may have the length of the DwPTS for the special subframe configuration 2/7.

As illustrated in (l) of FIG. 26, the PDCCH+PDSCH region of the first subframe (subframe n+1 or subframe n+k+2) among the subframes belonging to the occupied channel may have the normal subframe length (1 TTI length) or the length of the DwPTS for special subframe configuration 4 and the PDCCH+PDSCH region of the final subframe (subframe n+k+1) may have the length of the DwPTS for special subframe configuration 3/8.

As illustrated in (m) and (n) of FIG. 26, the PDCCH+PDSCH region of the first subframe (subframe n+1 or subframe n+k+2) among the subframes belonging to the occupied channel may have the normal subframe length (1 TTI length) or the length of the DwPTS for special subframe configuration 4 and the PDCCH+PDSCH region of the final subframe (subframe n+k+1) may have the length of the DwPTS for special subframe configuration 4.

The exemplary embodiments illustrated in (a), (b), (c), (d), (e), (f), and (g) of FIG. 25 and (h), (i), (j), (k), (l), (m), and (n) of FIG. 26 have different CCA ending timings and different initial signal transmission timings.

Figure 27:
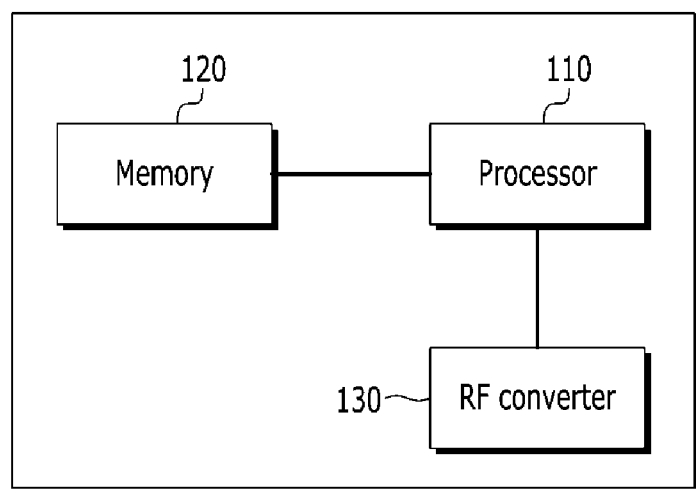
FIG. 27 is a diagram illustrating a configuration of a base station according to an exemplary embodiment of the present invention.

FIG. 27 is a diagram illustrating a configuration of a base station 100 according to an exemplary embodiment of the present invention.

In detail, the base station 100 includes a processor 110, a memory 120 and a radio frequency (RF) converter 130.

The processor 100 may be configured to implement procedures, functions, and methods described in association with the base station in the above-mentioned '1. method for managing allocation and usage of radio resources'.

The memory 120 is connected to the processor 110 and stores various types of information associated with the operation of the processor 110.

The RF converter 130 is connected to the processor 110 to transmit and receive a radio signal. Further, the base station 100 may have a single antenna or a multiple antenna.

Figure 28:
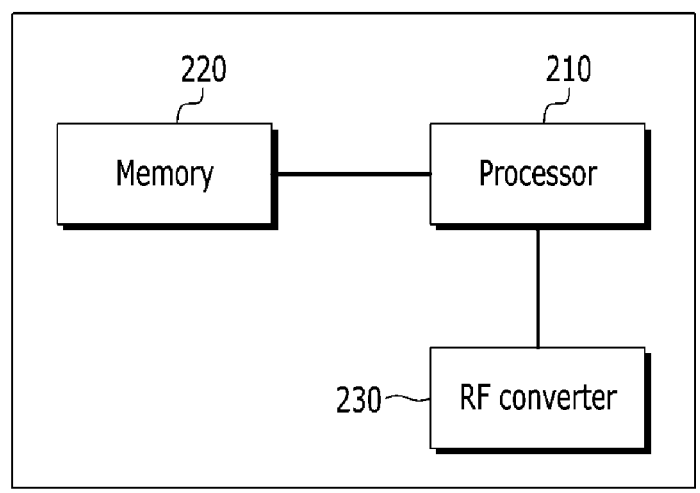
FIG. 28 is a diagram illustrating a configuration of a terminal according to an exemplary embodiment of the present invention.

FIG. 28 is a diagram illustrating a configuration of a terminal 200 according to an exemplary embodiment of the present invention.

In detail, the terminal 200 includes a processor 210, a memory 220, and an RF converter 230.

The processor 100 may be configured to implement procedures, functions, and methods described in association with the terminal in the above-mentioned '1. method for managing allocation and usage of radio resources'.

The memory 220 is connected to the processor 210 and stores various types of information associated with the operation of the processor 210.

The RF converter 230 is connected to the processor 210 to transmit and receive a radio signal. Further, the terminal 200 may have a single antenna or a multiple antenna.

2. Method for Managing Access of Radio Resource

Figure 29:
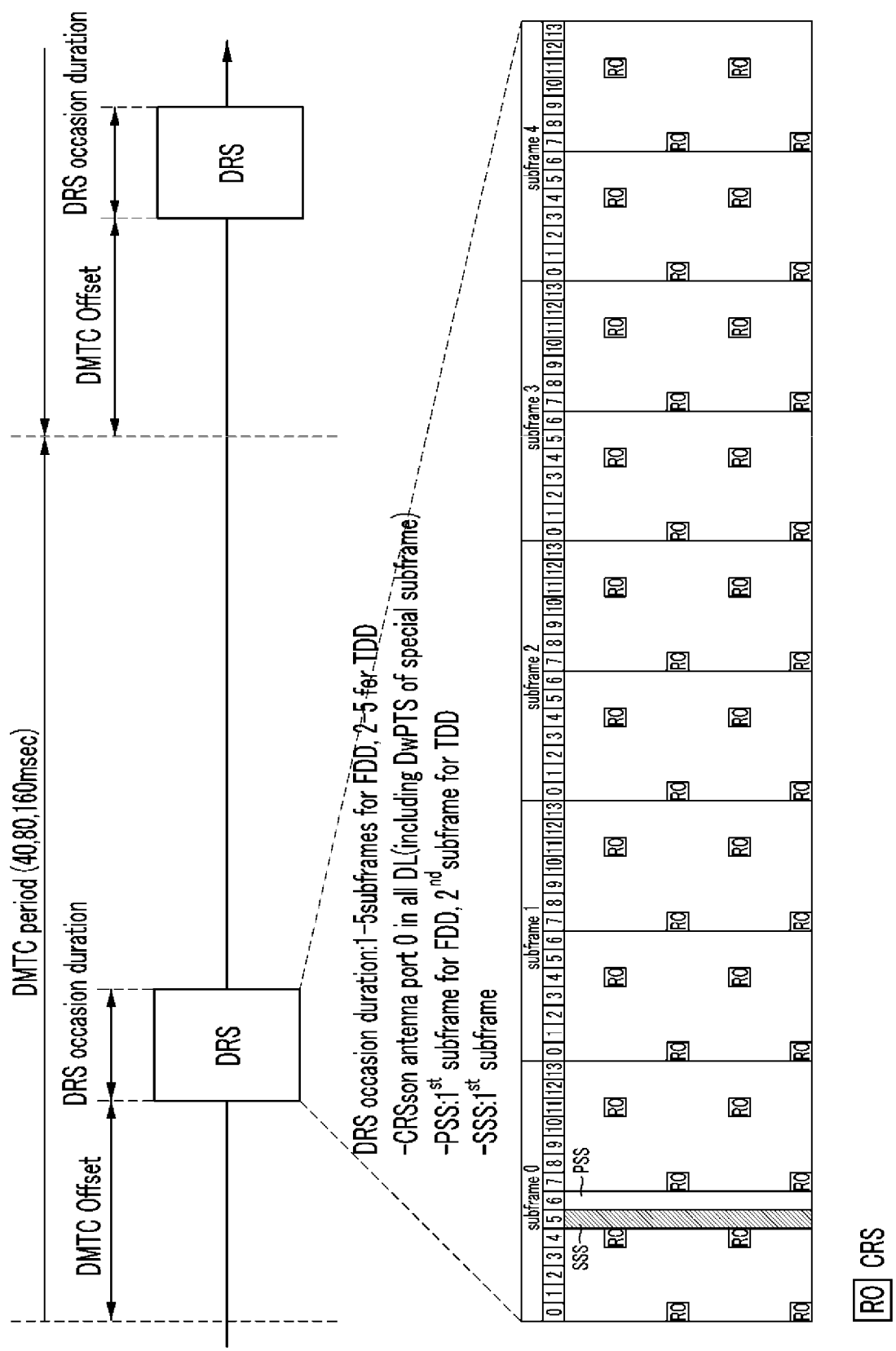
FIG. 29 is a diagram illustrating a format and a transmission period of a discovery signal (DRS) periodically transmitted by the base station.

FIG. 29 is a diagram illustrating a format and a transmission period of a discovery signal (DRS) periodically transmitted by the base station.

The base station may simultaneously serve periodic data transmission and aperiodic data transmission. The base station periodically transmits the DRS which is a search signal to allow a terminal to search the base station, thereby informing that the base station does not provide a current service to the terminal but may provide a service to the terminal. In detail, FIG. 29 illustrates a DRS measurement timing configuration (DMTC).

As illustrated in FIG. 29, the DRS may be transmitted through a DMTC period of 40, 80, and 160 msec. The timing when the DRS is transmitted is determined by a specific offset (DMTC offset) within the DMTC period. The base station transmits the DRS which may be searched by the terminal for a DMTC occasion duration or a DRS occasion duration. Here, the DMTC occasion duration may have a length from a minimum of 1 msec (1 subframe) to a maximum of 5 msec (5 subframes) in the case of a frequency division duplex (FDD) and have a length from a minimum of 2 msec (2 subframe) to a maximum of 5 msec (5 subframes) in the case of a time division duplex (TDD).

The DRS is periodically transmitted at a defined format at defined timing by configuring the DMTC period, the DMTC offset, and the DMTC occasion duration. The terminal may use the DRS to search for the base station. At least one base station may transmit the DRS based on the DMTC periods, the DMTC offset, and the DMTC occasion duration configured for each base station or transmit the DRS through several channels (carriers) of frequency.

FIG. 29 illustrates the case in which the base station transmits a cell-specific reference signal (CRS), a primary synchronization signal (PSS), and a secondary synchronization signal (SSS) within the subframe (for example, 5 subframes) belonging to the DMTC occasion duration. The CRS is transmitted through antenna port No. 0 within all the downlink subframes (including downlink pilot time slot (DwPTS) of special subframe). The PSS is transmitted within the first subframe among the subframes belonging to the DMTC occasion duration in the case of the FDD and within the second subframe among the subframes belonging to the DMTC occasion duration in the case of the TDD. The SSS is transmitted within the first subframe among the subframes belonging to the DMTC occasion duration.

Meanwhile, when apparatuses share the frequency (when using the shared band or the unlicensed band), there is a need for a method for accessing resources capable of applying the existing frequency provisions and transmitting data. This will be described with reference to FIG. 30.

Figure 30:
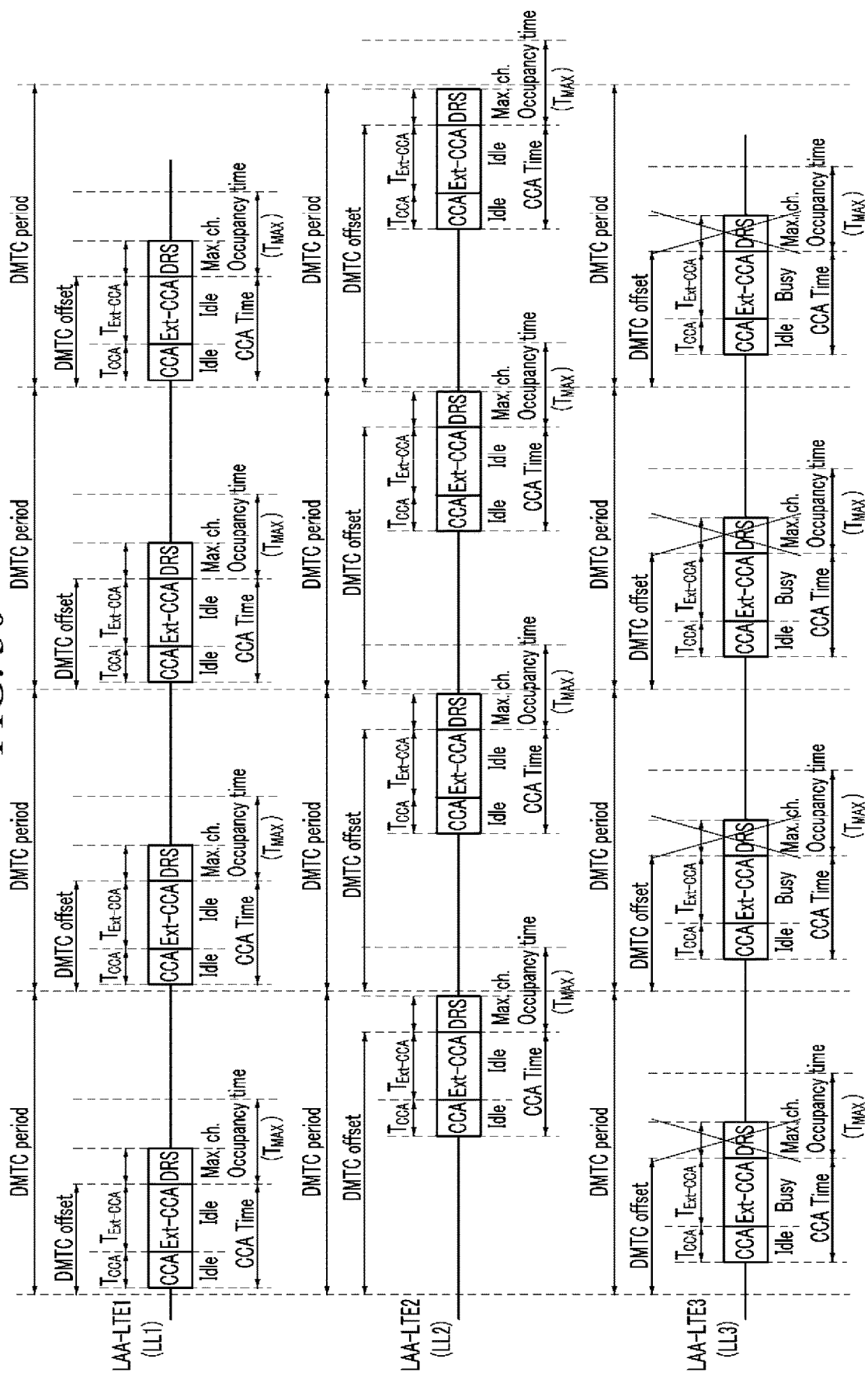
FIG. 30 is a diagram illustrating a method for applying unlicensed band frequency provisions and transmitting a DRS.

FIG. 30 is a diagram illustrating a method for applying unlicensed band frequency provisions and transmitting a DRS. In detail, FIG. 30 illustrates a method for allowing a plurality of base stations LL1, LL2, and LL3 to apply frequency provisions and access and occupy resources and transmitting its own DRS through the occupied resources.

To allow the base stations LL1, LL2, and LL3 to transmit the DRS, the clear channel assessment (CCA) is performed. FIG. 2 illustrates the case in which each of the base stations LL1 to LL3 performs both of the normal CCA and the extended CCA (Ext-CCA). $T_{CCA}$ represents time when the normal CCA is performed and $T_{Ext-CCA}$ represents time when the extended CCA is performed. The CCA may be performed by the terminal as well as the base station. $T_{MAX}$ represents the maximum channel occupation time depending on the frequency operating regulatory requirement in the unlicensed band and the channel occupation time of the base stations LL1 to LL3 may not exceed $T_{MAX}$.

Each of the base stations LL1 to LL3 may access the resources of the unlicensed band according to the CCA result and occupy the corresponding resources. That is, the base stations LL1 to LL3 transmit the DRS when the access of the resources and the data transmission may be made by the CCA.

However, the base station LL3 may not access the channel to which the characteristics (for example, having periodicity, transmission at the defined timing) of the DRS are reflected, due to the occupation and usage of the channel of the base station LL1. That is, the base station LL3 may not transmit the DRS at its own DRS transmission timing determined by the DMTC offset within the DMTC period due to the occupation of the channel of the base station LL1. In this case, a method for efficiently sharing (access and occupation of resources) a frequency is required.

Figure 31:
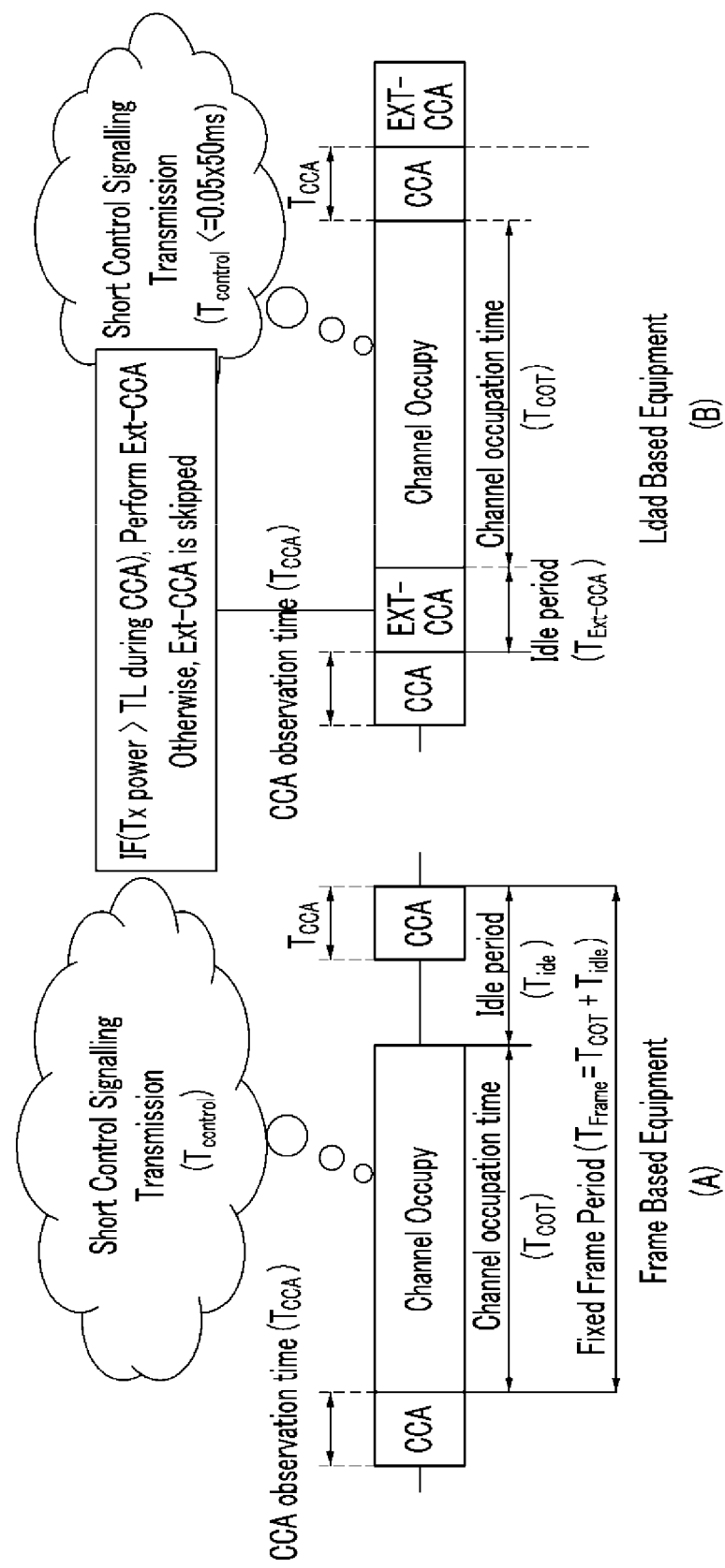
FIG. 31 is a diagram illustrating a method for accessing resources through clear channel assessment (CCA) by applying unlicensed band frequency provisions.

FIG. 31 is a diagram illustrating a method for accessing resources through clear channel assessment (CCA) by applying unlicensed band frequency provisions. In detail, FIG. 31 illustrates the CCA for allowing the apparatus to access and occupy the unlicensed band frequency resources according to the unlicensed band frequency provisions defined by ETSI (European telecommunications standards institute). $T_{COT}$ represents the channel occupation time, $T_{Frame}$ represents the fixed frame period, which is $T_{COT}$+ $T_{idle}$. Here, $T_{idle}$ represents an idle time and includes $T_{CCA}$ or $T_{Ext-CCA}$.

(A) of FIG. 31 illustrates that the apparatus performs the CCA based on the fixed period and the frame based equipment (FBE) occupies the channel according to the CCA result. The apparatus may perform a short control signaling transmission within the $T_{COT}$. $T_{control}$ represent the time when the control signaling transmission is performed.

(B) of FIG. 31 illustrates the load based equipment (LBE) performing the additional CCA (extended CCA) when the channel size (transmission intensity of the signal transmitted by other apparatuses) measured by the apparatus during the initial CCA process is equal to or more than a predetermined level (TL threshold level). The apparatus may perform a short control signaling transmission within the $T_{COT}$. $T_{control}$ represents a time when the control signaling transmission is performed and may be equal to or less than 0.05×50 ms.

Meanwhile, as illustrated in FIG. 31, the method for accessing resources through the CCA applying the frequency provisions of the unlicensed band does not consider the cellular operation (long term evolution (LTE) operation). Therefore, a method for observing frequency provisions of an unlicensed band while considering the LTE operation and efficiently and appropriately accessing and using radio resources in the unlicensed band or the shared band is required. For convenience of explanation in the present specification, the 'unlicensed band or shared band' is called the unlicensed band.

2.1. Channel State Assessment and Channel Operation for Accessing Radio Resource In the present specification, when a transmitting apparatus (transmitter) is the base station, a receiving apparatus (receiver) may be the terminal and when the transmitting apparatus is the terminal, the receiving apparatus may be the base station.

The exemplary embodiment of the present invention may be applied to downlink communication (or downlink service, downlink) from the base station to the terminal, uplink communication (uplink service, uplink) from the terminal to the base station, and device-to-device direct communication (or D2D communication, direct link service). In the present specification, unless specially mentioned, the service includes a downlink service, an uplink service, a direct link service, etc.

For describing the channel search, the channel state assessment, and the channel operation according to the exemplary embodiment of the present invention, terms (idle channel, occupied channel, operable channel, and operating channel) used in the present specification are defined as follows. The idle channel means the channel which is determined that any service is not made through the corresponding channel or a service is made but any apparatus does not perform the data transmission through the corresponding channel. The occupied channel means a channel through which the data are transmitted to allow a specific apparatus to provide a service or a channel determined to transmit data through the corresponding channel. The operable channel means a channel through which a service is not made or a channel determined to be able to provide a service among the channels. The operating channel means a channel through which a data service is attempted or a service is provided among the operable channels.

2.1.1. Channel Search

Figure 32:
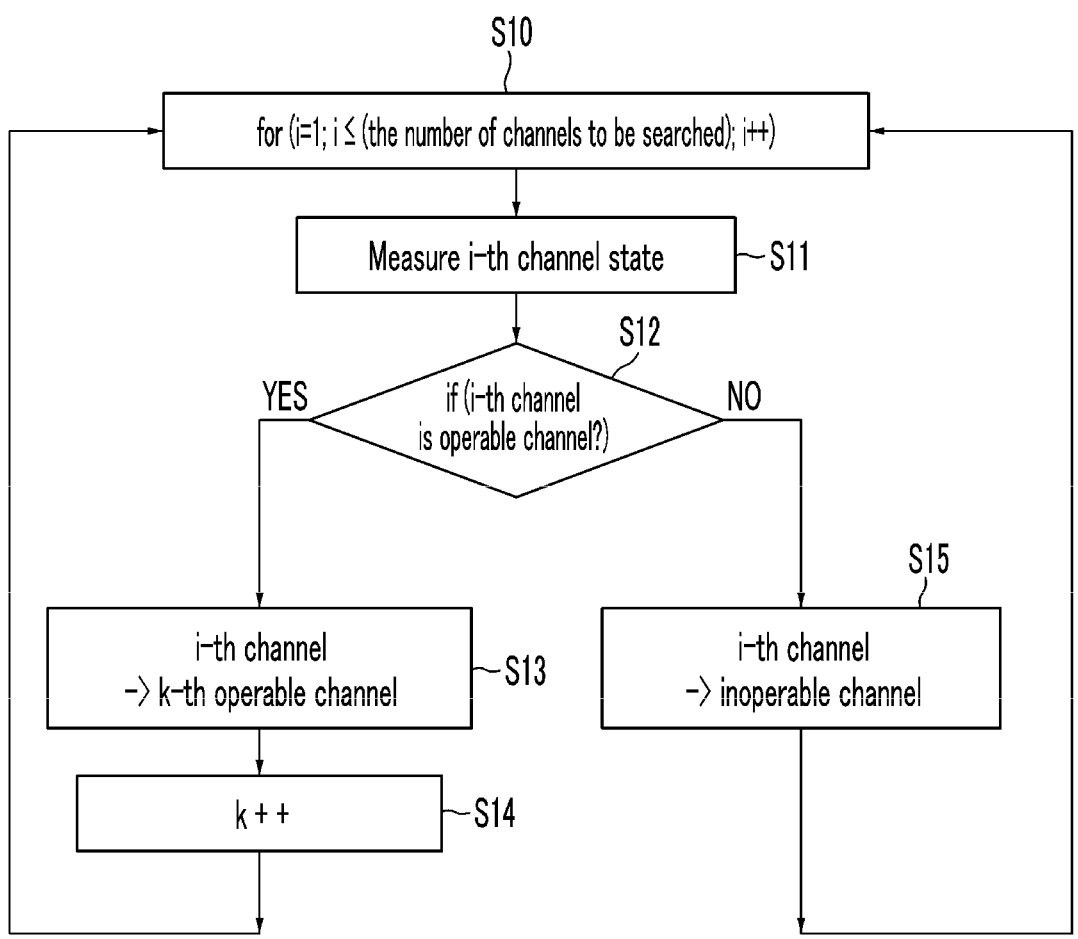
FIG. 32 is a diagram illustrating a channel search procedure according to an exemplary embodiment of the present invention.

FIG. 32 is a diagram illustrating a channel search procedure according to an exemplary embodiment of the present invention.

The channel search is a function required in the following case and may be performed by the transmitting apparatus or the receiving apparatus. To search for the operable channel (serviceable channel), the apparatus may perform the channel search. Alternatively, the apparatus may perform the channel search to provide the data service through the operable channel. Alternatively, when the channel search is required by a request etc., the apparatus may also perform the channel search (for example, FIG. 33). Alternatively, to serve the data by occupying the channel based on the channel search result of the receiving apparatus, the apparatus may perform the channel search before the data service. Alternatively, the apparatus may also perform the channel search to search whether the operating channel may be continuously operated. Alternatively, the apparatus may also perform the channel search when the operating channel is changed to other operable channels.

In detail, the number of channels to be searched is configured (S10).

The apparatus measures a state of an i-th channel among the channels to be searched (S110).

The apparatus determines whether the i-th channel is a serviceable channel through the channel search (S12).

If it is determined that the i-th channel is the serviceable channel, the apparatus includes the i-th channel in the operable channel group (S13). That is, the apparatus stores the i-th channel as a k-th operable channel and increases a k value (S14).

If it is determined that the i-th channel is not the serviceable channel, the apparatus determines the i-th channel as the inoperable channel (S15).

The apparatus repeats the above-mentioned processes S11 to S15 as many as the number of channels to be searched.

Meanwhile, when serving data through any one of the operable channels belonging to the operable channel groups, the apparatus changes the corresponding operable channel to the operating channel.

Meanwhile, operable channel determining procedures (S11 to S15) performed by the apparatus upon the channel search are procedures of determining whether the channel to be searched is the operable channel or the inoperable channel. In detail, the apparatus may determine whether the corresponding channel is the operable channel upon the channel search, based on conditions such as whether other apparatuses provide services through the corresponding channel and whether other apparatuses provide services through the corresponding channel but normally provide services due to channel conditions such as interference. The channel search procedure including the operable channel determining procedure may be performed by the transmitting apparatus or the receiving apparatus.

FIGS. 33A to 33F are diagrams illustrating a channel search method according to an exemplary embodiment of the present invention.

In the channel search method illustrated in FIGS. 33A to 33F, the transmitting apparatus (transmitter) and the receiving apparatus (receiver) may be changed depending on services provided through the channel. In detail, when the service provided through the channel is the downlink service, the transmitting apparatus is the base station and the receiving apparatus is the terminal. Alternatively, when the service provided through the channel is the uplink service, the transmitting apparatus is the terminal and the receiving apparatus is the base station. Alternatively, when the service provided through the channel is the direct link service, the transmitting apparatus is the terminal for transmitting data and the receiving apparatus is the terminal for receiving data.

Figure 33A:
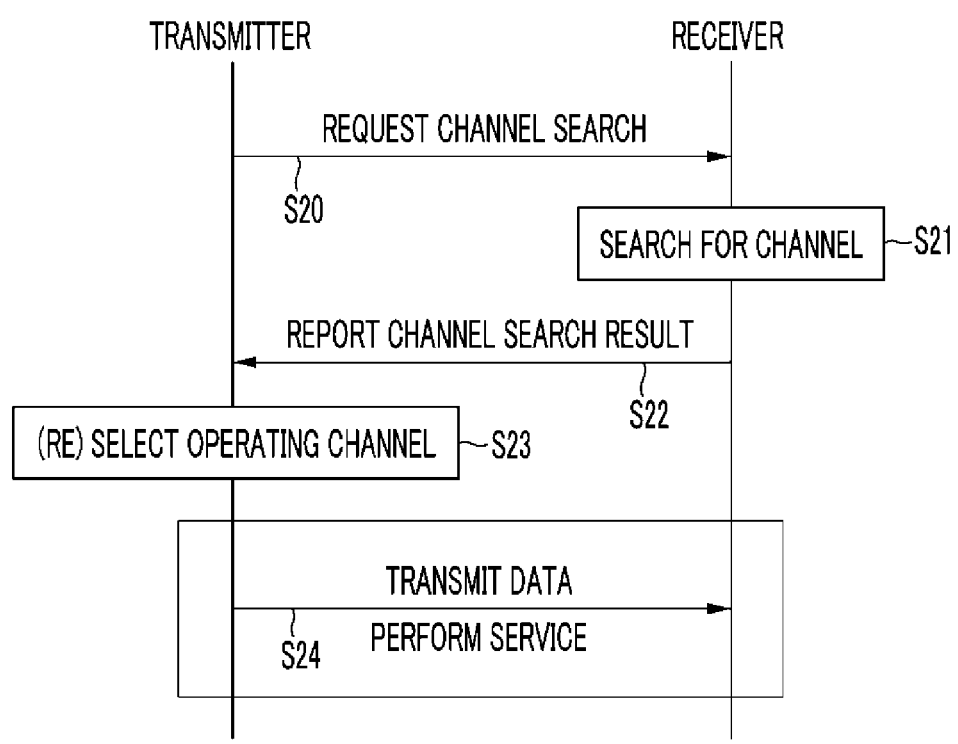
FIGS. 33A, 33B, 33C, 33D, 33E, and 33F are diagrams illustrating a channel search method according to an exemplary embodiment of the present invention.

The channel search method (hereinafter, 'first channel search method') illustrated in FIG. 33A may be applied when the transmitting apparatus and the receiving apparatus newly add an operating channel, change the operating channel to the new channel, or re-determine whether the operating channel through which data are currently transmitted/ received is appropriate to re-select the operating channel, when the transmitting apparatus and the receiving apparatus may already transmit/receive data.

In detail, the transmitting apparatus requests the search for a channel which is appropriate to receive data to the receiving apparatus (S20). A channel search request signal transmitted by the transmitting apparatus may include information (for example, channel identifier) on the channel to be searched, a channel search time, etc.

The receiving apparatus searches for a channel in response to the channel search request (S21) and reports the operable channel suitable to receive data among the searched channels to the transmitting apparatus (S22). In detail, the receiving apparatus may report the channel state (interference intensity, whether other apparatuses use the corresponding channel, etc.) along with the channel identification information (for example, channel identifier) upon reporting the operable channel. Alternatively, the receiving apparatus may report only the most suitable channel for the operating channel selection reference among the operable channels or may align and report the operable channels in order meeting the operating channel selection reference among the operable channels.

The transmitting apparatus selects (re-selects) the operating channel among the operable channels based on the information reported from the receiving apparatus (S23) and provides services (data transmission) through the selected channel (S24). In detail, the transmitting apparatus may also transmit the operating channel selection result to the receiving apparatus and provide the data service. Alternatively, when providing the data service, the transmitting apparatus may also transmit data (operating channel identification information+data) along with the identification information of the selected channel. Alternatively, when the operating channel selection result is the same as the previous operating channel, the transmitting apparatus may transmit the corresponding result (the corresponding result transmitting procedure may be skipped) and provide the data service.

Figure 33B:
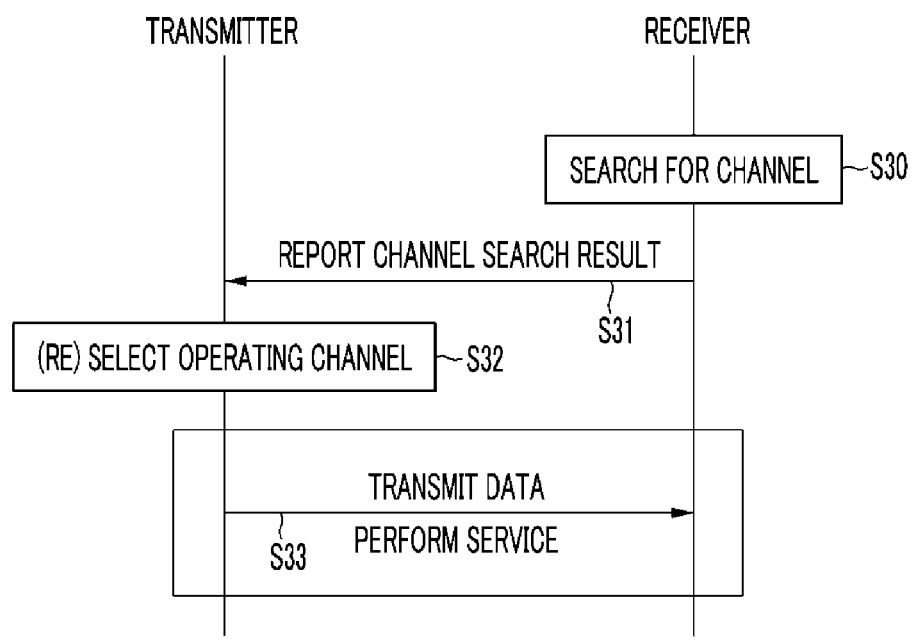

The channel search method (hereinafter, 'second channel search method') illustrated in FIG. 33B is a method in which the channel search request process (S20) of the transmitting apparatus is omitted in the first channel search method. The second channel search method may newly add an operating channel when the receiving apparatus receives the data service from the transmitting apparatus or may be applied when the operating channel is changed to a new channel.

The receiving apparatus searches for the channel (S30) and reports the channel search result to the transmitting apparatus (S31).

The transmitting apparatus selects (re-selects) the operating channel based on the channel search channel (S32) and provides the data service through the selected channel (S33).

The second channel search method is different from the first channel search method only in the step that the receiving apparatus reports the channel search result to the transmitting apparatus without the request of the transmitting apparatus and the rest operations thereof may be the same as or similar to the first channel search method.

Meanwhile, the transmitting apparatus may also change the operating channel without reporting, by the receiving apparatus, the channel search result to the transmitting apparatus (S31).

Figure 33C:
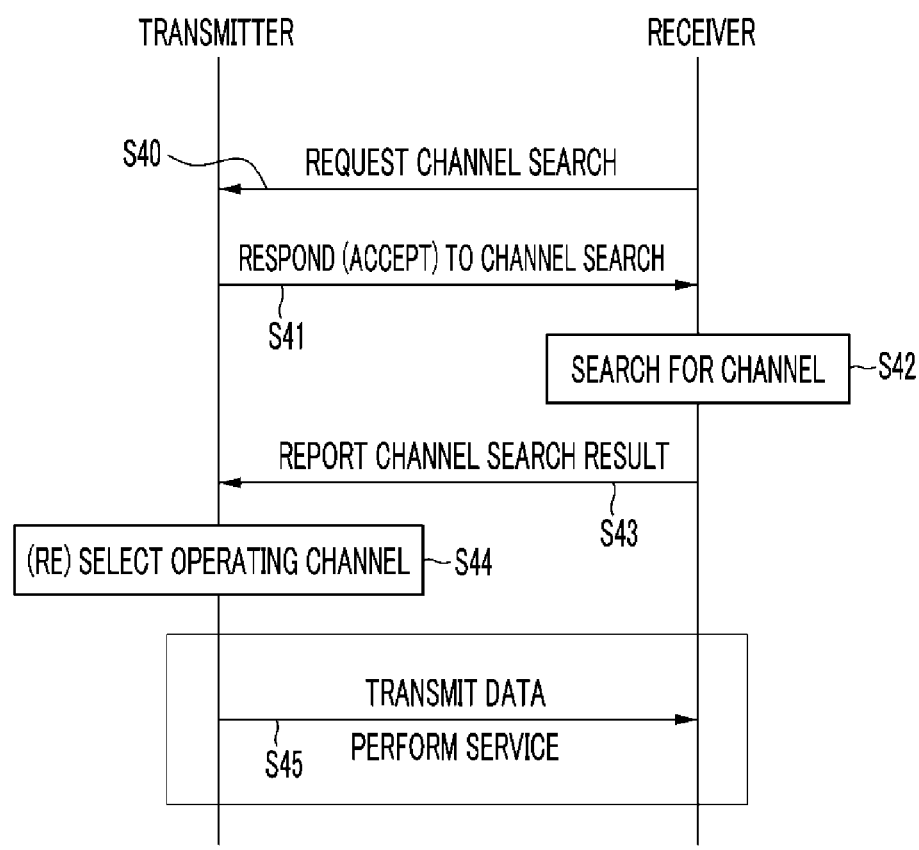

The channel search method (hereinafter, 'third channel search method') illustrated in FIG. 33C is a method for requesting the corresponding fact (channel search) to the transmitting apparatus (S40) and performing a channel search (S42) depending on a response (S41) thereto, when the receiving apparatus performs the channel search (when being the same as or similar to the second channel search method).

The channel search response transmitted to the receiving apparatus by the transmitting apparatus may include acceptance, rejection, performance after specific time, performance in specific time, etc. Further, the channel search response may include the channel search time, etc., along with the information (for example, channel identifier) on the channel to be searched, identically or similarly to the channel search request (S20) of the first channel search method.

The following procedures S43, S44, and S45 may be identically or similarly performed to the first channel search method.

Figure 33D:
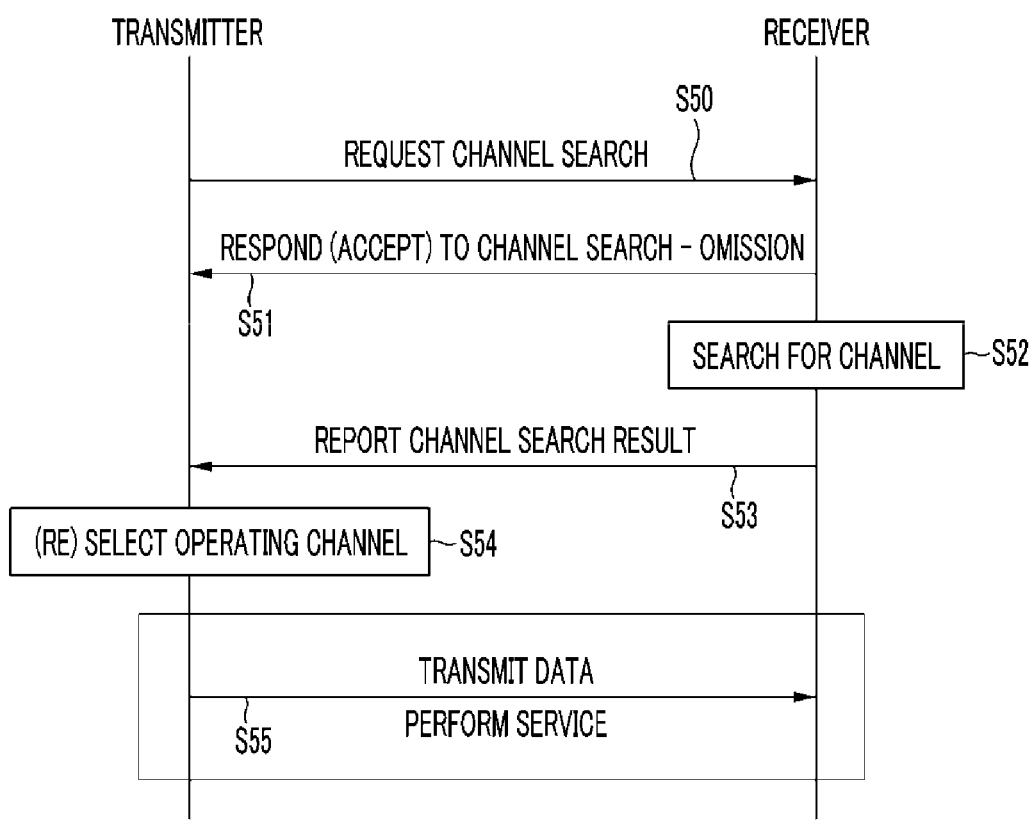

Like the first channel search method, the channel search method (hereinafter, 'fourth channel search method') illustrated in FIG. 33D is a method for requesting, by the transmitting apparatus, the channel search to the receiving apparatus (S50) and making, by the receiving apparatus, a response thereto to the transmitting apparatus (S51) and then performing the channel search depending on the response (S52). Meanwhile, the process of responding to, by the receiving apparatus, the channel search request of the transmitting apparatus (S51) may be omitted.

The response to the channel search request may include the acceptance, the rejection, the performance after the specific time, the performance in the specific time, etc. like the third channel search method. Further, the response to the channel search request may include the channel search time, etc., along with the information (for example, channel identifier) on the channel to be searched, identically or similarly to the channel search request (S20) of the first channel search method. In this case, the additional information needs to be received from the transmitting apparatus.

The following procedures S53, S54, and S55 may be identically or similarly performed to the first channel search method.

Figure 33E:
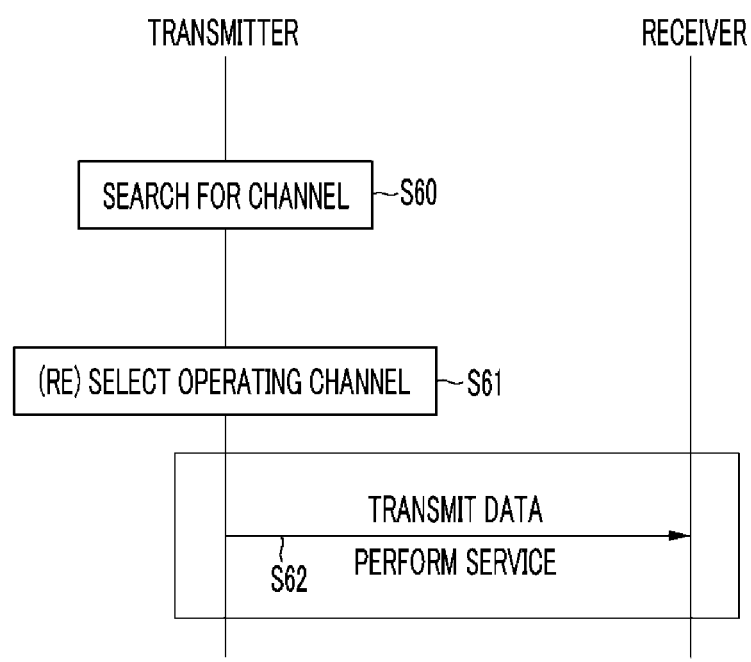

The channel search method (hereinafter, 'fifth channel search method') illustrated in FIG. 33E is a method for searching for, by the transmitting apparatus, a channel, differently from the first to fourth channel search methods.

In detail, the transmitting apparatus selects (reselects) any one of the channels searched through the channel search (S60) as the operating channel (S61) and transmits data to the receiving apparatus through the selected channel (S62).

A fifth channel search method may be applied when the transmitting apparatus re-searches the operating channel to re-select the operating channel, includes other channels in the operable channel group, searches the operable channel among other channels to change the operating channel to the corresponding operable channel, or adds a new operating channel.

Meanwhile, when the transmitting apparatus provides services through the newly changed operating channel, the fifth channel search method may be performed identically or similarly to the data transmission method of the first channel search method.

Figure 33F:
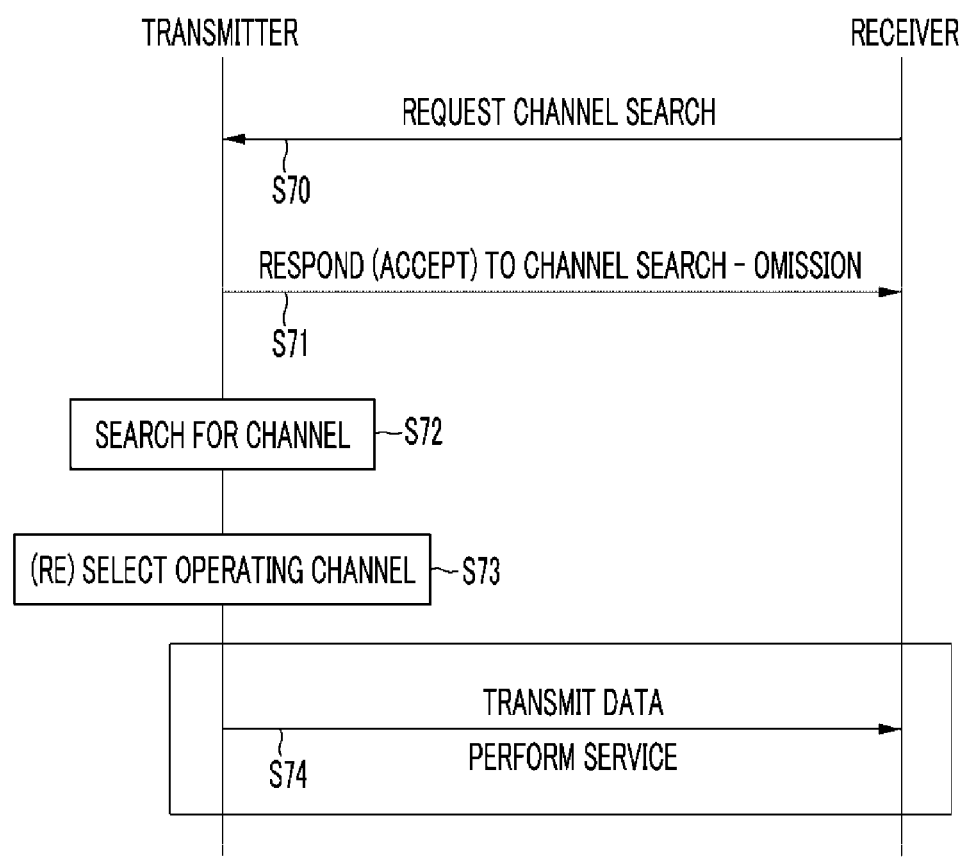

The channel search method (hereinafter, 'sixth channel search method') illustrated in FIG. 33F is a method that further includes a process of requesting, by the receiving apparatus, a channel search (S70) and a process of transmitting, by the transmitting apparatus, a response to the channel search request to the receiving apparatus (S71), in addition to the fifth channel search method. Meanwhile, the process of responding to, by the transmitting apparatus, the channel search request (S71) may be omitted.

Differently from the fourth channel search method, the sixth channel search method may be applied when the operable channels may not be maintained or may be hardly maintained due to the deterioration in a quality of channel through which data are received, the device search having high priority, etc. In detail, the sixth channel search method may be applied when the operating channel is changed to other channels due to the necessity of the channel change by the apparatus and the receiving apparatus requests the channel search to the transmitting apparatus to allow the transmitting apparatus to change the operating channel.

The response to the channel search request may include the acceptance, the rejection, the performance after the specific time, the performance in the specific time, etc. like the third channel search method. Further, the response to the channel search request may include the channel search time etc., along with the information (for example, channel identifier) on the channel to be searched, identically or similarly to the channel search request (S20) of the first channel search method.

The following procedures S72, S73, and S74 may be identically or similarly performed to the fifth channel search method.

2.1.2. Channel State Assessment

The channel state assessment may be performed when the apparatus intends to transmit data through the channel to be used.

Figure 34:
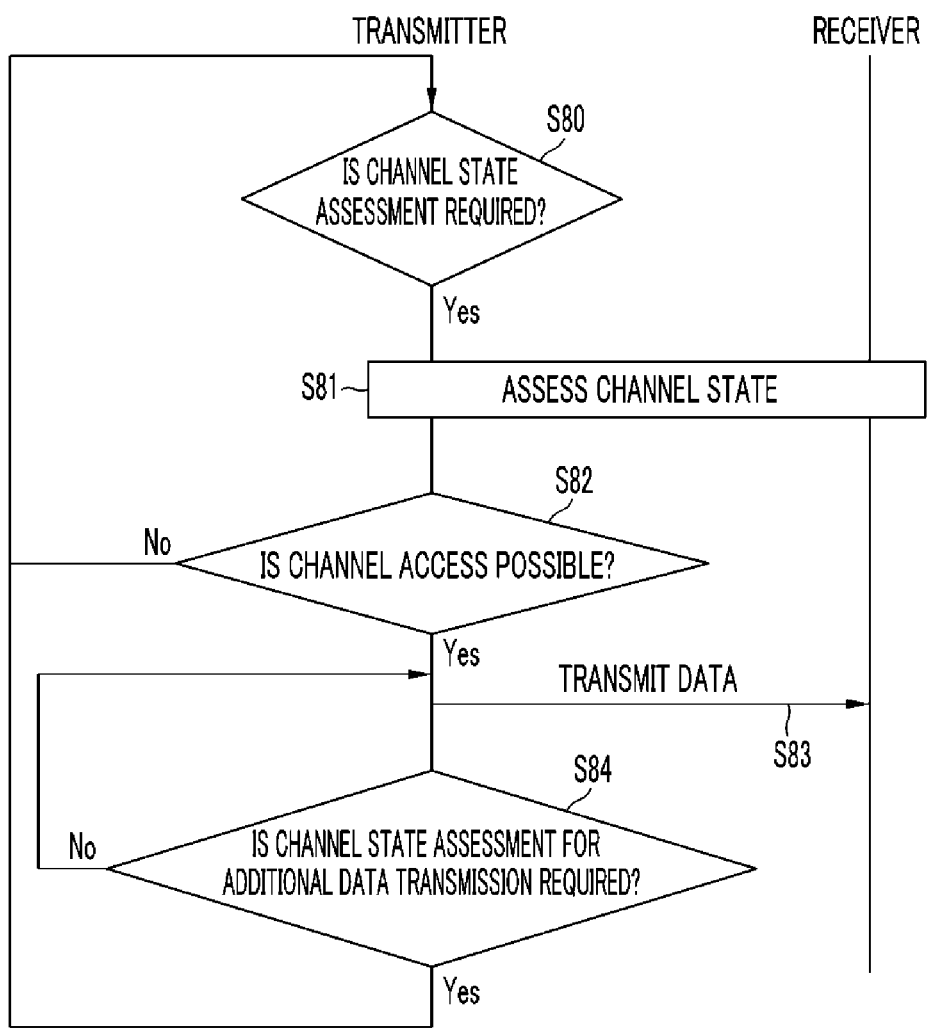
FIG. 34 is a diagram illustrating a data transmission procedure by channel state assessment according to an exemplary embodiment of the present invention.

FIG. 34 is a diagram illustrating a data transmission procedure by channel state assessment according to an exemplary embodiment of the present invention.

For example, the case in which the channel state assessment is required includes the case in which the determination on whether other apparatuses or systems use the channel, whether the channel is appropriate for the data transmission, etc., is required. In detail, the transmitting apparatus directly measures the channel state to determine whether the channel access may be available based on the measured result or the transmitting apparatus may determine whether the channel access may be available with the request of the receiving apparatus.

When the transmitting apparatus measures the channel state, the channel state is assessed prior to the data transmission and then data may be continuously transmitted at a given time without additionally performing the channel state assessment or the channel state is assessed every data transmission and then data may also be transmitted.

If the transmitting apparatus determines whether the channel access may be permitted with the request of the receiving apparatus, the receiving apparatus assesses the channel state by the request of the transmitting apparatus and then may report the channel state assessment result to the transmitting apparatus. The transmitting apparatus may transmit data based on the reported channel state assessment result. Alternatively, the receiving apparatus assesses the channel state in advance without the request of the transmitting apparatus to report (indicate) the corresponding fact to the transmitting apparatus and the transmitting apparatus may also omit the channel state assessment upon the data transmission and transmit data. In particular, the base station may assess the channel state for uplink data reception to provide the data transmission opportunity to the terminal. Further, the transmitting apparatus does not measure the channel state and the receiving apparatus measures the channel state, such that the reception of the receiving apparatus may be guaranteed and the hidden node, etc., may also be detected.

In detail, the transmitting apparatus (transmitter) may determine whether the channel state assessment is required (S80) and when the channel state assessment is required, directly assess the channel state or request the channel state assessment to the receiving apparatus (receiver) (S81). Alternatively, the receiving apparatus may also assess the channel state in advance and report the assessed result to the transmitting apparatus without the request of the channel state assessment of the transmitting apparatus.

The transmitting apparatus determines whether the channel access is permitted based on the channel state assessment result (S82) and when the channel access may be permitted, transmits data through the corresponding channel (S83).

The transmitting apparatus determines whether the channel state assessment for additional data transmission is required (S84). The transmitting apparatus continuously transmits data at a given time when the channel state assessment for additional data transmission is not required. The transmitting apparatus repeats the above-mentioned processes (S80 to S83) when the channel state assessment for additional data transmission is required.

2.1.3. Channel Operation

When the apparatus selects the operating channel by the above-mentioned channel search and performs the data service through the selected channel, the following channel operation is required. In detail, the apparatus needs to search whether the selected operating channel may be continuously operated. Further, the apparatus needs to change the operating channel to a new operable channel and provide services through the changed channel. Further, when there is no more the operating channel or the operating channel is unnecessary, the apparatus needs to delete the channel.

2.1.3.1. Search Whether Operating Channel is Continuously Operated

The process of searching whether the operating channel may be continuously operated is a process of determining whether the corresponding channel may be continuously operated as the operating channel when the data transmission is made between the transmitting apparatus and the receiving apparatus through the channel. The process of searching whether the operating channel may be continuously operated may be performed through a process of searching the operating channel among the above-mentioned channel search processes. The process of searching whether the operating channel may be continuously operated may be performed by the transmitting apparatus or the receiving apparatus. In this case, for more accurate search, the apparatus may stop the data transmission while the operating channel is searched.

2.1.3.2. Change and Delete Operating Channel

When the apparatus (or system) having high priority intends to use the operating channel which is busy for a data service or when considerable interference, etc., occurs in the corresponding operating channel, the apparatus changes the operating channel to other channels. Further, when the apparatus no more requires the operating channel or intends to end providing services through the corresponding operating channel, the corresponding channel is deleted (released). In detail, to change or delete the operating channel, the apparatus may perform the following processes.

The apparatus may search a third channel while providing services through the operating channel and determine whether the searched channel is the operable channel and when the searched channel is the operable channel, may store the searched channel as the operable channel. By doing so, the apparatus may prepare against the operating channel change.

Further, if the apparatus (or system) that may preferentially use the operating channel is searched, the apparatus may change the operating channel to the appropriate channel (for example, channel having the smallest interference, idle channel, or the like) among the stored operable channels. In detail, the apparatus for data transmission or reception transmits the corresponding fact (channel change) to the other apparatus upon the channel change and then performs the process of changing the corresponding channel (or reuse of a process of changing a carrier of a carrier aggregation operation, etc.), and when the channel change is completed, provides services through the changed channel. Further, the apparatus may release (delete) the channel by the process of deleting and generating (adding) a channel (or reuse of a process of deleting and generating (adding) a carrier of carrier aggregation, a process of deactivating and activating a carrier of carrier aggregation, etc.) and provide a data service through the operating channels other than the released channel.

Further, the apparatus may delete the current operating channel when the services may be unavailable to provide or are unnecessary. In detail, the apparatus may delete the current operating channel by the process of deleting a channel (or reuse of a process of deleting a carrier of carrier aggregation or a process of deactivating a carrier).

Figure 35:
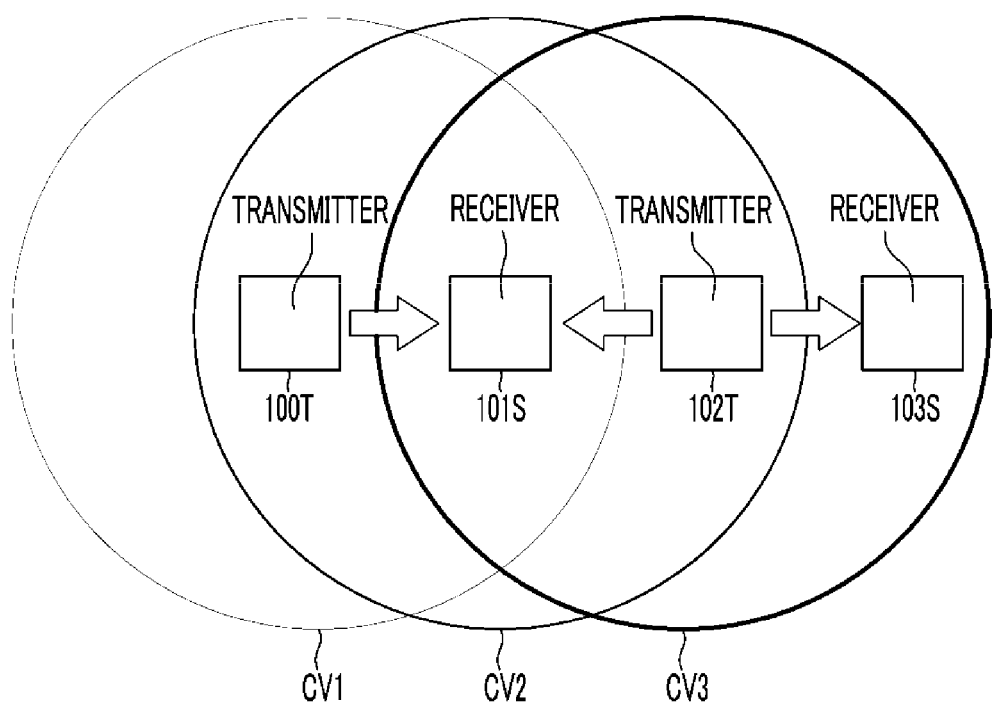
FIG. 35 is a diagram illustrating a situation in which signal arrival areas of a transmitting apparatus and a receiving apparatus are different.

Meanwhile, as illustrated in FIG. 35, the channel management method for the case in which the transmission region of the transmitting apparatus and the receiving region of the receiving apparatus are different from each other is required. In detail, FIG. 35 illustrates the case in which a transmitting apparatus 100T has a transmission region CV1, a receiving apparatus 101S has a receiving region CV2, and a transmitting apparatus 102T has a transmission region CV3.

The transmitting apparatus 100T and the transmitting apparatus 102T transmit data through the same channel (for example, #CH1) and it is assumed that the transmitting apparatus 100T transmits data to the receiving apparatus 101S and the transmitting apparatus 102T transmits data to the receiving apparatus 103S. The receiving apparatus 101S may receive a signal from the transmitting apparatus 100T and the transmitting apparatus 102T.

The transmitting apparatus 100T transmits data to the receiving apparatus 101S through a channel #CH1 searched by the above-mentioned channel search and the transmitting apparatus 102T also transmits data to the receiving apparatus 103S through the channel #CH1 searched by the channel search.

When the receiving apparatus 101S simultaneously receives the signal from the transmitting apparatus 100T and the transmitting apparatus 102T, the interference may occur due to the received signal.

Under the condition, the receiving apparatus 101S searches the fact that the transmitting apparatus 102T uses the same channel #CH1 as the transmitting apparatus 100T through the channel search and may notify the transmitting apparatus 100T of the corresponding fact. By doing so, the receiving apparatus 101S changes the channel for providing services with the transmitting apparatus 100T to a new channel (for example, #CH2) to perform services with the transmitting apparatus 100T. Next, the transmitting apparatus 100T and the transmitting apparatus 102T each use the channel #CH2 and the channel #CH1 to provide the data service to the receiving apparatus 101S and the receiving apparatus 103S, respectively. By doing so, the interference may be reduced.

Further, upon starting the service between the transmitting apparatus 100T and the receiving apparatus 101S or changing the channel (selecting or re-selecting the operating channel), the receiving apparatus 101S may also transmit the fact that the channel #CH1 is already used by other apparatuses (or other services) to the transmitting apparatus 100T. By doing so, the transmitting apparatus 100T and the receiving apparatus 101S may not determine that the channel #CH1 is the operable channel. Further, the transmitting apparatus 100T and the receiving apparatus 101S may also configured the priority of the operable channel for the channel #CH1 to be low to help select (re-select) the operating channel.

2.2. Channel Access/Data Transmission Operation for Transmitting Data Having Periodicity The exemplary embodiment of the present invention may be applied to the DRS having periodicity as well as the transmission of all data transmitted at timing or period such as feedback signal, uplink data, re-transmission signal, and a signal based on periodic allocation. Hereinafter, for convenience of explanation, the exemplary embodiment of the present invention will describe with reference to, for example, the DRS transmission. Meanwhile, in the downlink data (for example, DRS) transmission, the transmitting apparatus is the base station and the receiving apparatus is the terminal. In the uplink data transmission, the transmitting apparatus is the terminal and the receiving apparatus is the base station. In the direct link data transmission, the transmitting apparatus and the receiving apparatus are the terminal.

Figure 36:
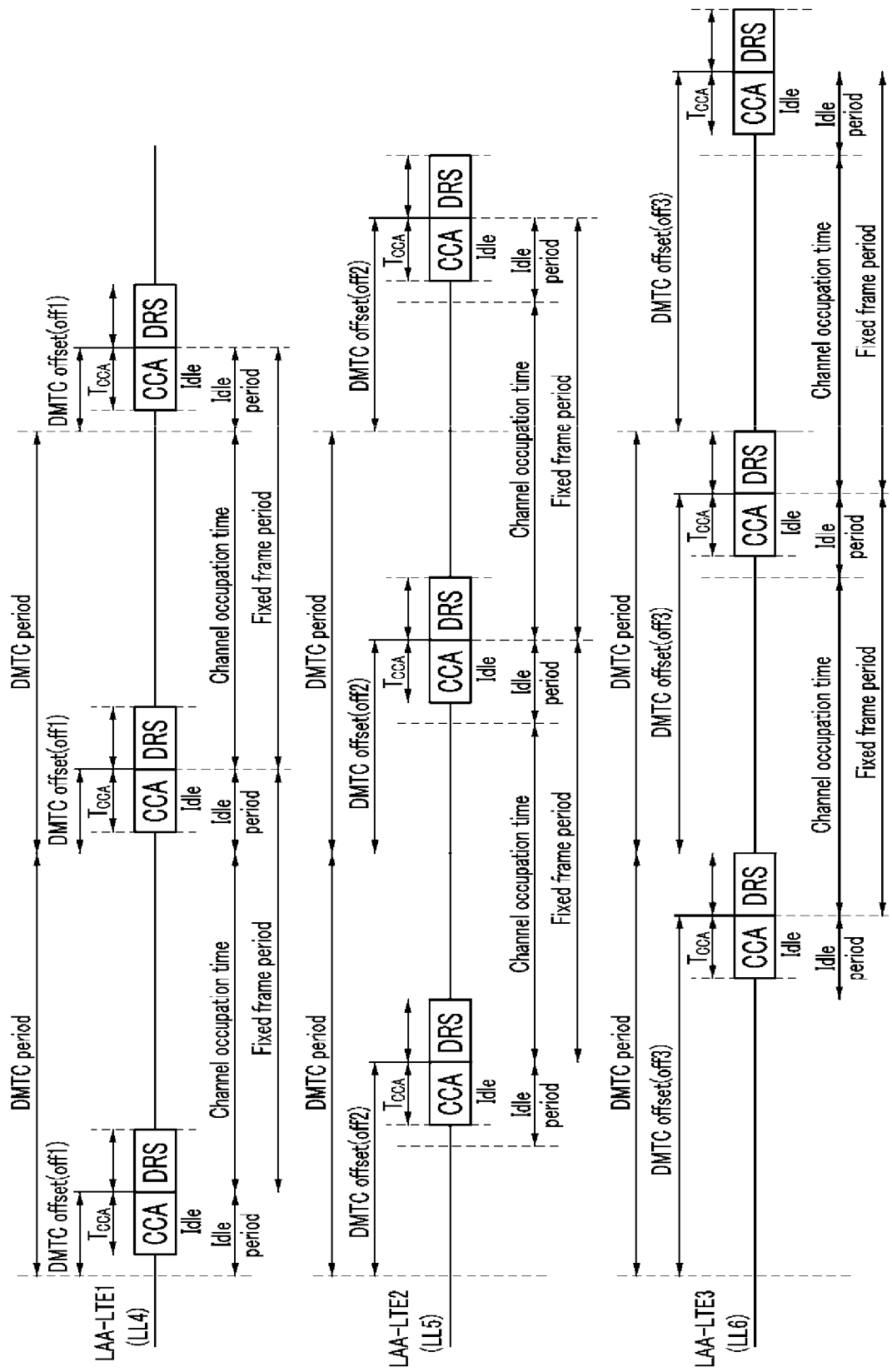
FIG. 36 is a diagram illustrating a method for transmitting periodic data by changing data transmission timing according to an exemplary embodiment of the present invention.

2.2.1. Access and Occupation of Radio Resource for Transmitting of Data Having Periodicity 2.2.1.1. Method for Adjusting Periodicity Data Transmission Timing FIG. 36 is a diagram illustrating a method for transmitting periodic data by changing data transmission timing according to an exemplary embodiment of the present invention. In detail, as illustrated in FIG. 36, base stations LL4, LL5, and LL6 may change the data transmission timing periodically transmitted (hereinafter, 'periodicity data') to guarantee the data transmission. If the periodicity data transmission timing is changed, the CCA timing performed just before the periodicity data transmission timing is also changed.

As illustrated in FIG. 36, the base stations LL4 to LL6 may change the configuration for the DMTC period, the DMTC offset, and the DMTC occasion duration of the DRS which is the periodicity data to configure the timing when the CCA is performed not to overlap with other base stations. In detail, DMTC offsets off1, off2, and off3 of the base stations LL4 to LL6 may be adjusted so that the DRS transmission timings of the base stations LL1 to LL3 do not overlap with each other. As illustrated in FIG. 36, since the DRS transmission timings of the base stations LL4 to LL6 are adjusted not to overlap with each other, the CCA timings of the base stations LL4 to LL6 performed just before the DRS transmission timing do not overlap with each other.

The base station LL4 performs the CCA for the channel of the unlicensed band for $T_{CCA}$ prior to the DRS transmission timing determined by the DMTC offset off1. Since the base station LL4 determines that the state of the corresponding channel is the idle state through the CCA, the DRS is transmitted at the configured DRS transmission timing within the DMTC period.

The base station LL5 performs the CCA for the channel of the unlicensed band for $T_{CCA}$ prior to the DRS transmission timing determined by the DMTC offset off2. Since the base station LL5 determines that the state of the corresponding channel is the idle state through the CCA, the DRS is transmitted at the configured DRS transmission timing within the DMTC period.

The base station LL6 performs the CCA for the channel of the unlicensed band for $T_{CCA}$ prior to the DRS transmission timing determined by the DMTC offset off3. Since the base station LL6 determines that the state of the corresponding channel is the idle state through the CCA, the DRS is transmitted at the configured DRS transmission timing within the DMTC period. That is, all the base stations LL4 to LL6 may guarantee its own periodic DRS transmission.

Meanwhile, the process of adjusting the DRS transmission timings may be performed when the DMTC period, the DMTC offset, and the DMTC occasion duration of the DRS are configured initially or when it is found that the DRS transmission timings of the base stations LL4 to LL6 overlap with each other.

Meanwhile, unlike the method illustrated in FIG. 36, the base station may also continuously perform the CCA up to the timing when the channel may be used without changing (while maintaining) the DMTC period, the DMTC offset, and the DMTC occasion duration of the DRS to transmit the DRS. For example, the corresponding method will be described under the conditions illustrated in FIG. 2. The base station LL3 performs the CCA for the channel of the unlicensed band prior to the DRS transmission timing determined by the DMTC offset within the first DMTC period. Since the base station LL1 uses the corresponding channel, the base station LL3 determines that the corresponding channel state is busy (or in use, in occupation). In this case, the base station LL3 disregards the DMTC offset and continuously performs the CCA until it may use (occupy) the corresponding channel. The base station LL3 determines that the state of the corresponding channel is the idle state if the DRS transmission of the base station LL1 is completed within the first DMTC period and transmits the DRS at the timing when it is determined to be the idle state. Consequently, the base station LL3 transmits the DRS having periodicity at timing different from the timing determined by the DMTC offset and therefore the terminal may not determine that the DRS is transmitted at timing different from the scheduled transmission timing. In this case, the terminal may expect to receive the DRS up to the reception of the DRS and may perform the operation (for example, blind decoding) for receiving the DRS. Alternatively, to reduce the unnecessary reception or the power consumption of the terminal, the base station LL3 may indicate the terminal that it transmits the DRS after the CCA. Further, to prevent the continuous reception of the terminal, the base station LL3 may configure the receiving time in the terminal and allows the terminal to expect to receive the DRS from the configured DRS transmission timing for the receiving time and perform the operation of receiving the DRS.

2.2.1.2. Method for Changing CCA Timing

Figure 37:
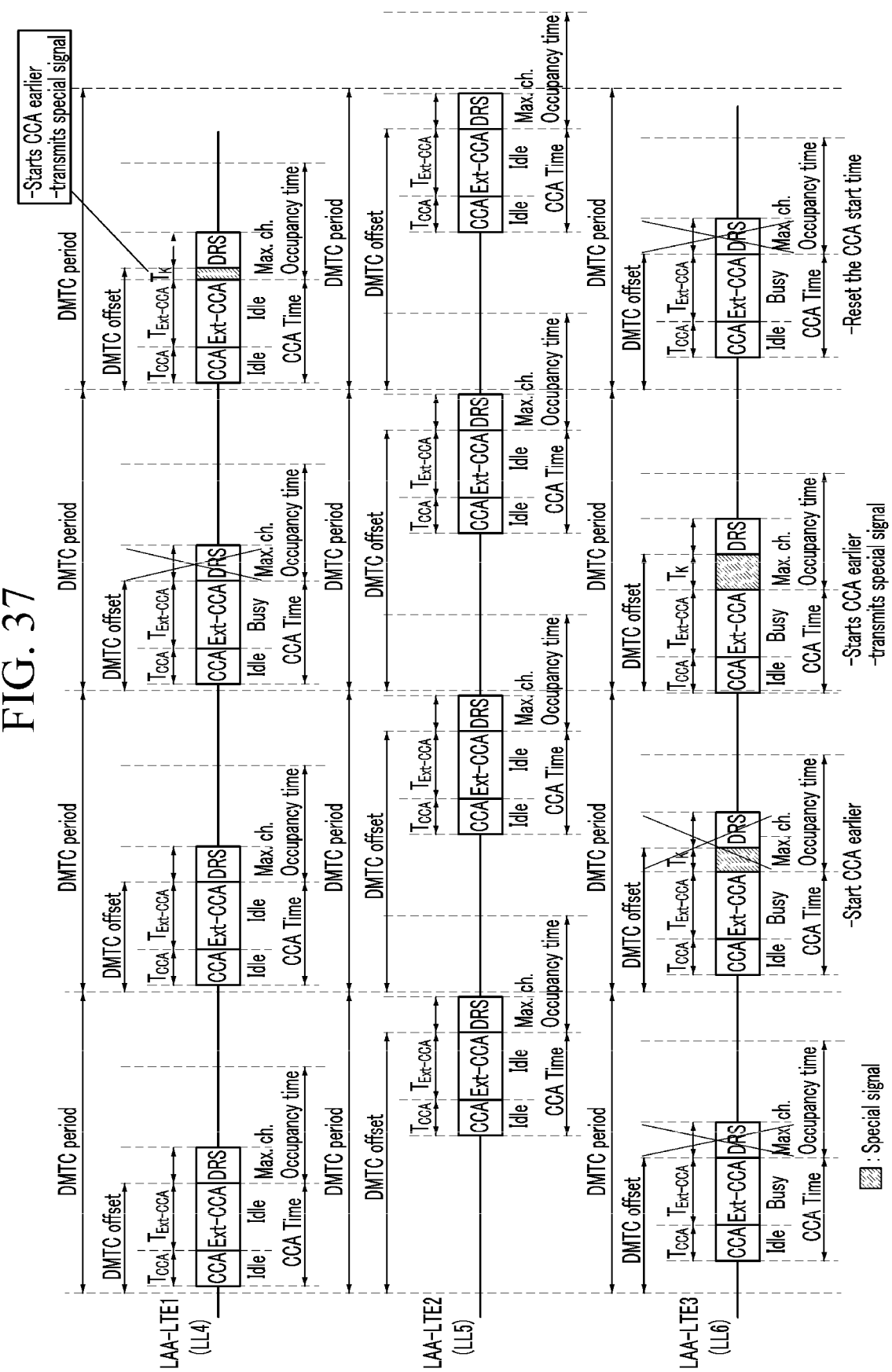
FIG. 37 is a diagram illustrating a method for transmitting periodic data by changing CCA timing according to another exemplary embodiment of the present invention.

FIG. 37 is a diagram illustrating a method for transmitting periodic data by changing CCA timing according to another exemplary embodiment of the present invention. In detail, as illustrated in FIG. 37, if the apparatus determines that the CCA is performed on the channel of the unlicensed band to transmit the periodicity data (for example, DRS) within the previous transmission period but the corresponding channel is busy by other apparatuses not to transmit the periodicity data, the apparatus performs the CCA earlier than before within the subsequent transmission period to transmit the periodicity data. The method illustrated in FIG. 37 is performed by the following step1, step2, and step 3.

First, if the apparatus (for example, base station) determines that the CCA is performed on the unlicensed band and the corresponding channel is used or occupied, the apparatus more advances the CCA timing for subsequent transmission period of the periodicity data (for example, DRS) than before (step 1). In detail, the apparatus obtains a first timing advanced by $T_k$ ($=T_{k-1}+T_m$) from the periodic data transmission timing and starts the CCA performance at the second timing advanced by the CCA performance duration (or CCA time) from the first timing. Here, $T_m$ is a minimum unit in which a special signal of step 2 is transmitted, as a constant unit. $T_k$ is configured so that a sum of the transmission time (transmission duration) of the periodicity data and $T_k$ does not exceed the maximum channel occupation time depending on the frequency provisions. If the sum of the transmission time of the periodicity data and $T_k$ exceeds the maximum channel occupation time, $T_k$ is configured so that $T_k=T_{k-1}$.

If the apparatus does not occupy the channel even within the subsequent transmission period of the periodicity data, the step 1 is re-performed.

Meanwhile, as the result of performing the CCA, when the apparatus determines that the corresponding channel is in an available state (idle state), the step 2 is performed.

The apparatus occupies the channel which is in the idle state and transmits the periodicity data (for example, DRS) through the corresponding channel (step 2). In detail, the apparatus may transmit the special signal before the periodicity data transmission timing to occupy the corresponding channel for the transmission duration of the periodicity data and for the period $T_k$ from the CCA completion timing before the periodicity data transmission timing. The apparatus transmits the special signal to prevent other apparatuses from occupying the corresponding channel for the $T_k$ duration.

If the apparatus successfully transmits the periodicity data, $T_k$ is reset to be 0 (step 3). That is, the apparatus resets the CCA timing for the subsequent transmission period of the periodicity data to be timing advanced by the CCA duration from the periodicity data transmission timing.

The above-mentioned step1, step 2, and step 3 will be described in detail with reference to FIG. 37. The base station LL6 among the base stations LL4, LL5, and LL6 illustrated in FIG. 37 performs the CCA (normal CCA+ extended CCA) on the channel prior to the DRS transmission timing determined by the DMTC offset to transmit the DRS within the first DMTC period. Since the base station LL4 uses the corresponding channel, the base station LL6 determines that the corresponding channel is busy and may not transmit the DRS at the configured DRS transmission timing. In this case, the base station LL6 advances the CCA timing for the second DMTC transmission period than the CCA timing for the first DMTC transmission period by $T_m$. That is, the base station LL6 performs the CCA for the second DMTC transmission period at timing advanced by $T_k$ ($=0+T_m$)+$T_{CCA}$+$T_{Ext-CCA}$ from the DRS transmission timing determined by the DMTC offset. However, since the base station LL4 uses the corresponding channel, the base station LL6 determines that the corresponding channel is busy and may not transmit the DRS within the second DMTC period.

The base station LL6 advances the CCA timing for the third DMTC transmission period than the CCA timing for the second DMTC transmission period by $T_m$. That is, the base station LL6 performs the CCA for the third DMTC transmission period at timing advanced by $T_k$($=T_m+T_m$)+ $T_{CCA}+T_{Ext-CCA}$ from the DRS transmission timing determined by the DMTC offset. As the CCA result, the base station LL6 determines that the corresponding channel is in the idle state and transmits the special signal for $T_k$ to prevent other apparatuses from occupying the channel and transmits the DRS at the configured DRS transmission timing.

Since the base station LL6 successfully transmits the DRS, $T_k$ for the fourth DMTC transmission period is configured to be 0. That is, the base station LL6 performs the CCA for the fourth DMTC transmission period at timing advanced by $T_k$ (=0)+$T_{CCA}$+$T_{Ext\text{-}CCA}$ from the DRS transmission timing determined by the DMTC offset.

Meanwhile, since the base station LL4 does not transmit the DRS due to the base station LL6 within the third DMTC transmission period, the CCA timing for the fourth DMTC transmission period is more advanced than the CCA timing for the third DMTC transmission period by $T_m$. That is, the base station LL4 performs the CCA for the fourth DMTC transmission period at timing advanced by $T_k$(=$T_m$)+$T_{CCA}$+$T_{Ext\text{-}CCA}$ from the DRS transmission timing determined by the DMTC offset. Meanwhile, $T_m$ may be different values depending on the base stations LL4 to LL6.

2.2.2. Data Transmission Depending on Configuration of CCA Timing Change

FIGS. 38A to 38E are diagrams illustrating a method for transmitting periodicity data and aperiodicity data (normal data without periodicity) by changing the CCA timing according to another exemplary embodiment of the present invention.

If the apparatus determines that the channel is in the idle state as the CCA result and occupies the corresponding channel to transmit data, the sum of the transmission duration $T_k$ of the special signal and the data transmission duration does not exceed the limiting time (maximum channel occupation time, $T_{MAX}$) in the frequency provisions. Consequently, the transmission time (transmission duration) of the periodicity data is a factor of limiting the change in the CCA timing.

Figure 38A:
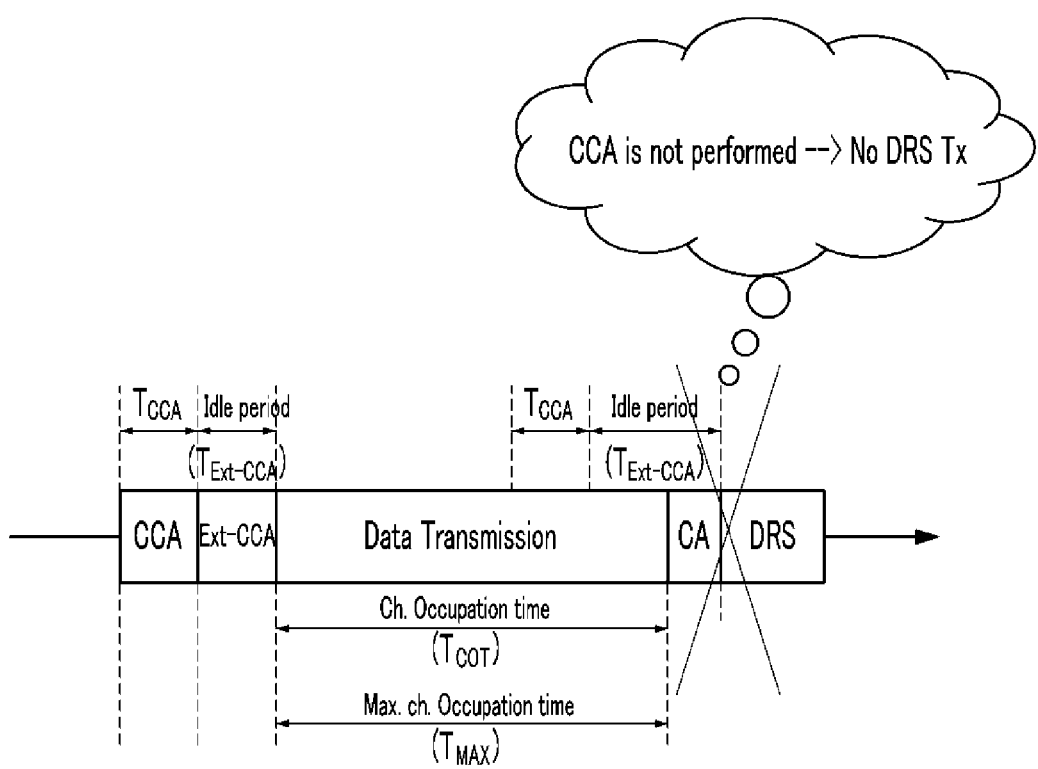
FIGS. 38A, 38B, 38C, 38D, and 38E are diagrams illustrating a method for transmitting periodic data and aperiodic data by changing the CCA timing according to another exemplary embodiment of the present invention.

Meanwhile, if the apparatus simultaneously transmits the aperiodicity data and the periodicity data, as illustrated in FIG. 38A, since the additional CCA for periodicity data (for example, DRS) is required but the CCA time is insufficient, the apparatus may not transmit the DRS. That is, when transmitting the aperiodicity data, the base station performs the CCA on the channel of the unlicensed band and transmits the aperiodicity data using the corresponding channel occupied through the CCA. However, to transmit the DRS at the configured DRS transmission timing, the base station needs to additionally perform the CCA. However, the time to perform the CCA for the DRS transmission is insufficient due to the transmission of the aperiodicity data, such that the base station may not transmit the DRS. The method for solving the above problem will be described in detail with reference to FIGS. 38B to 38E. (A) of FIG. 38B, (A) of FIG. 38C, (A) of FIG. 38D, and (A) of FIG. 38E represent FIG. 38A.

Figure 38B:
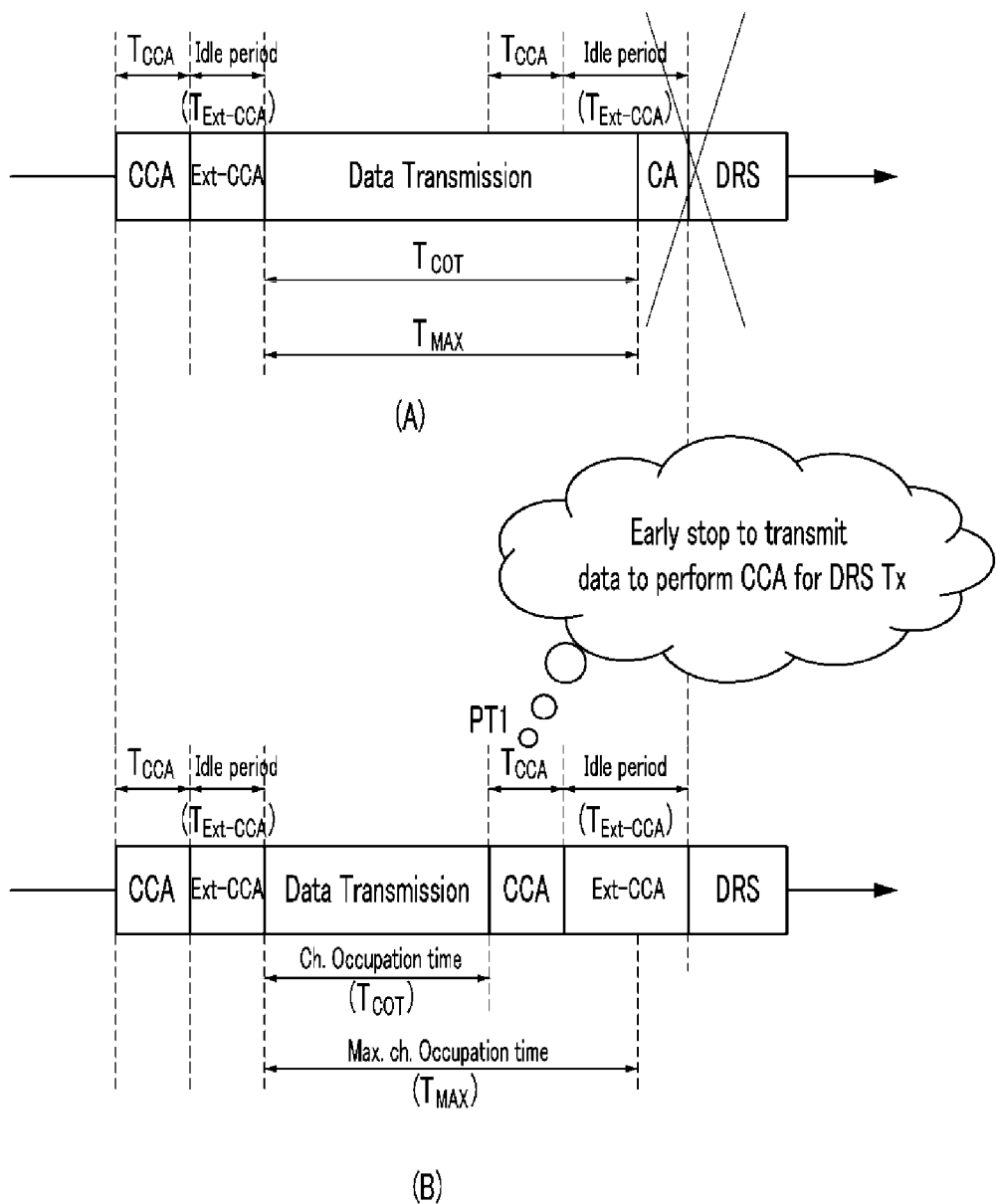

The method illustrated in FIG. 38B is a method for early ending the occupation of the channel for the previous aperiodicity data transmission in consideration of the CCA duration for the periodicity data (for example, DRS) transmission by the apparatus. As illustrated in (B) of FIG. 38B, if the base station occupies the channel to transmit the aperiodicity data, to transmit the DRS at the configured DRS transmission timing, the base station ends (end at timing PT1) the aperiodicity data transmission earlier than the scheduled timing, in consideration of the CCA duration for the DRS transmission. Further, the base station performs the CCA for the DRS transmission and transmits the DRS at the DRS transmission timing using the channel occupied through the CCA.

Figure 38C:
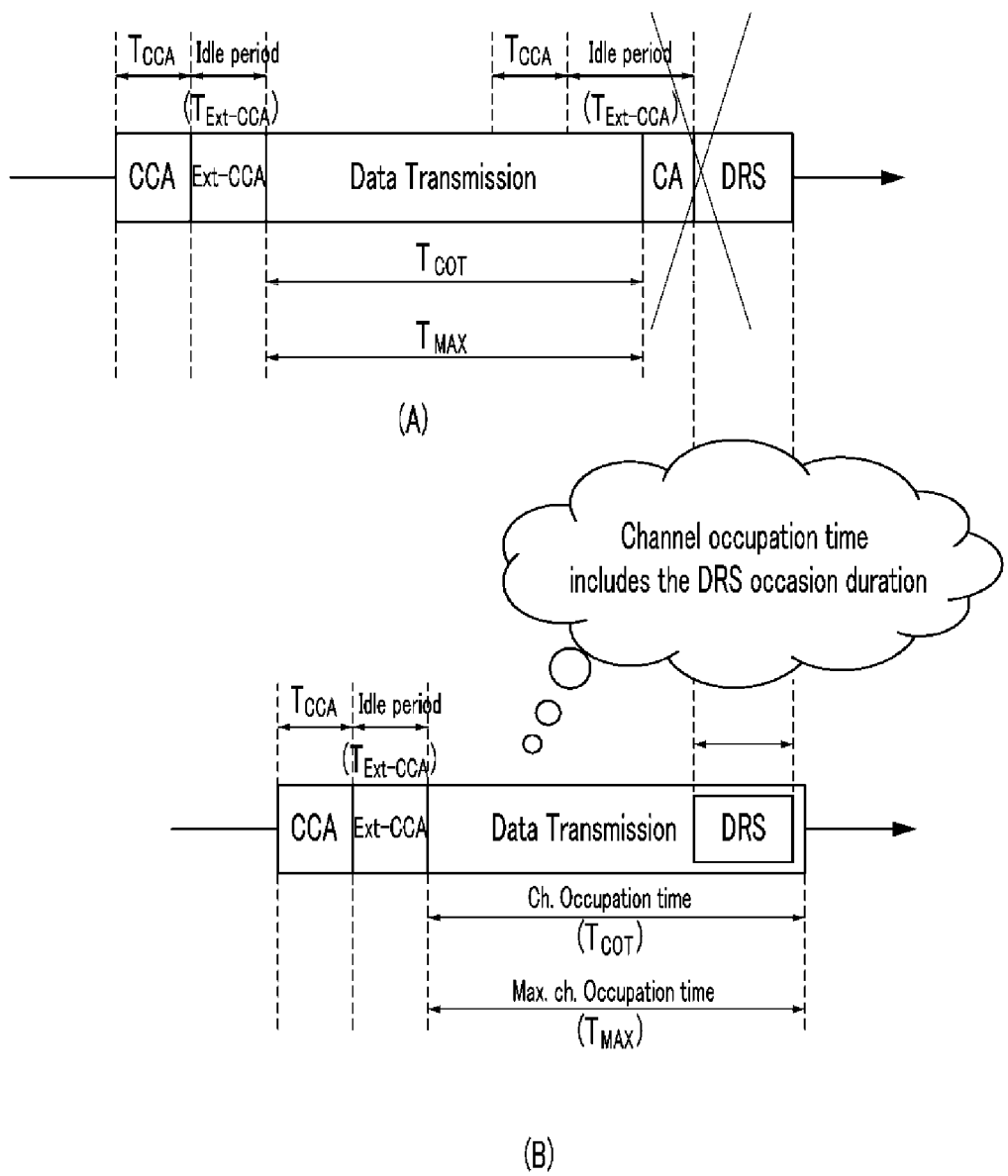
Figure 38D:
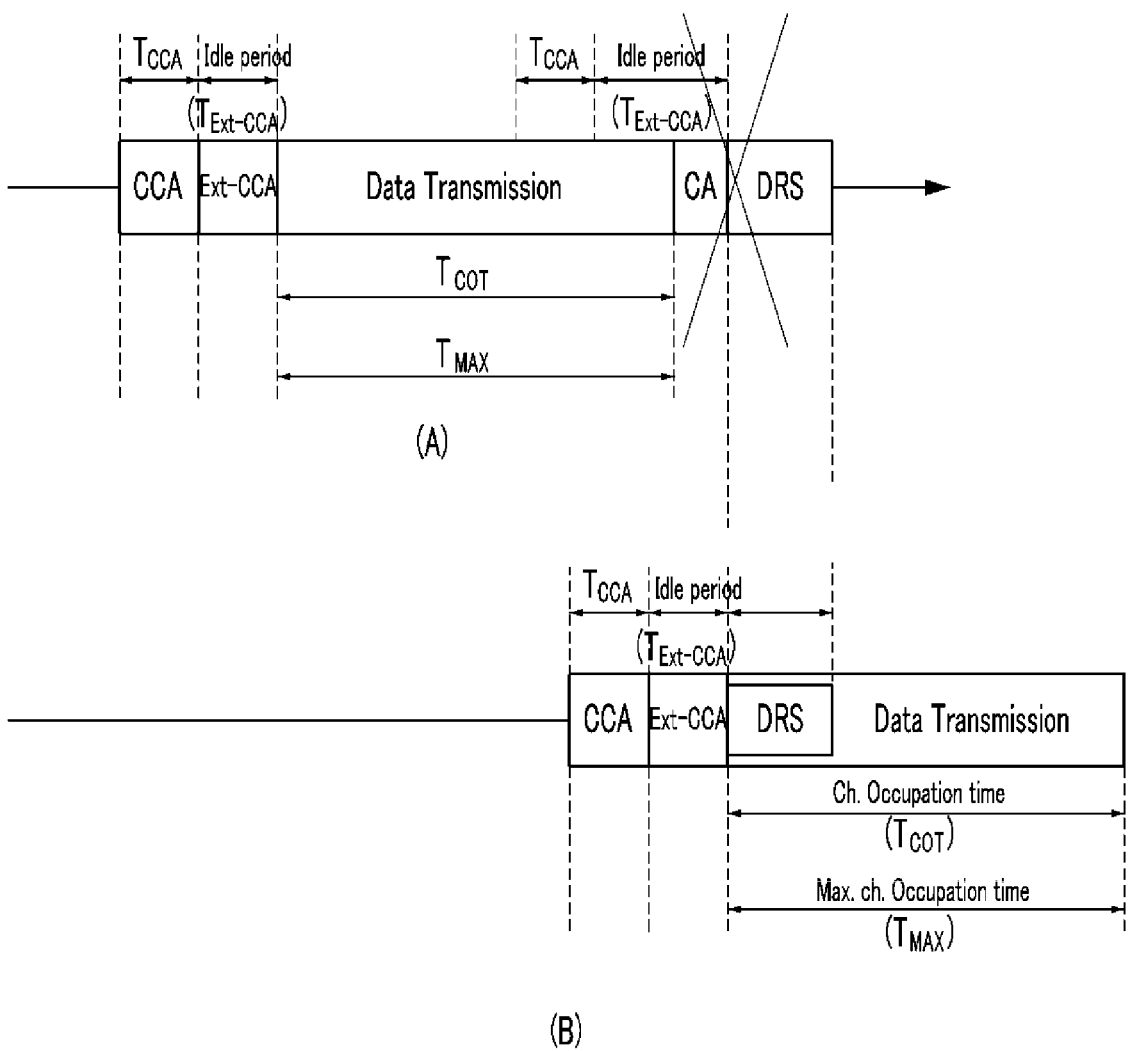
Figure 38E:
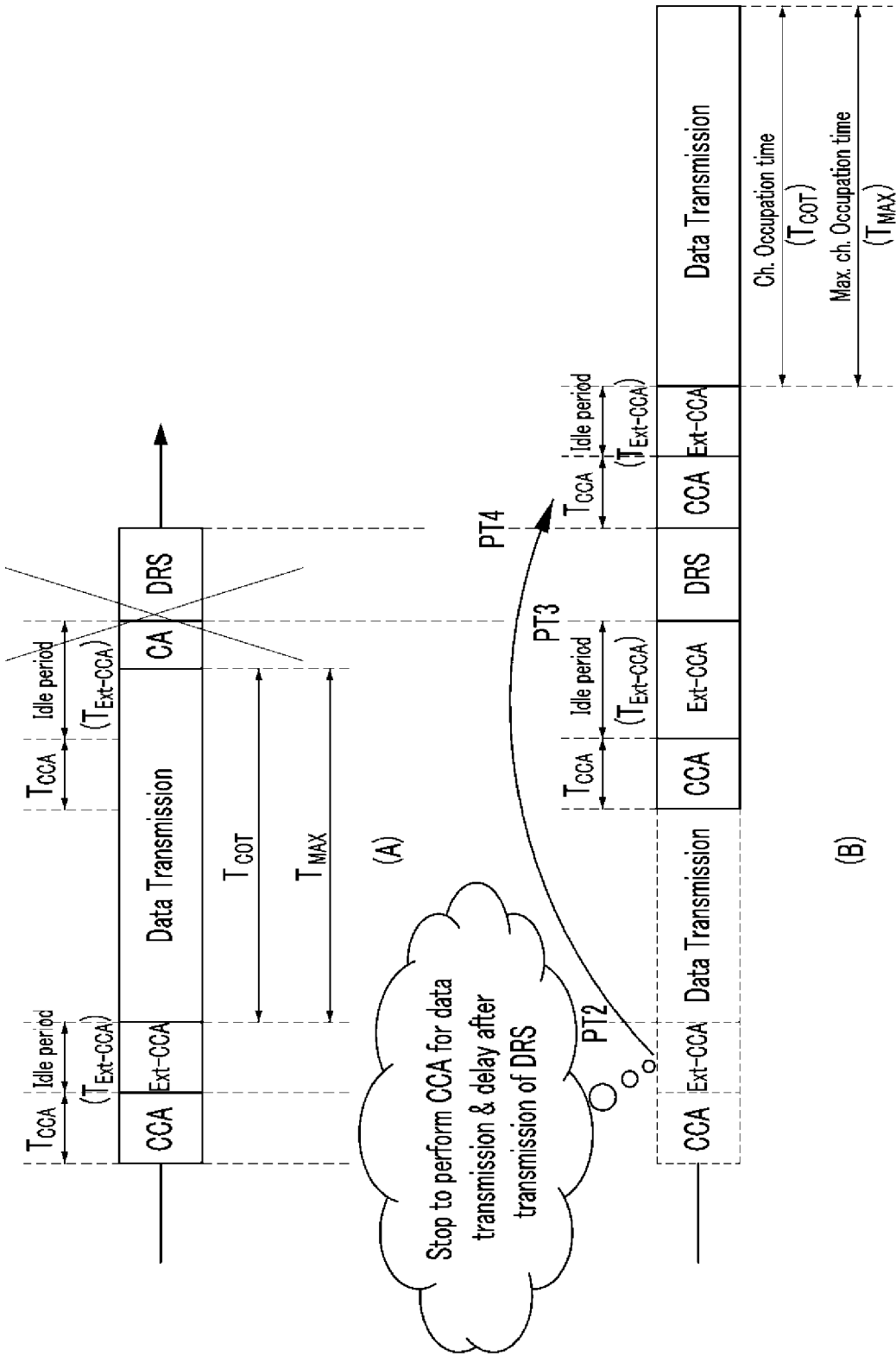

The method illustrated in FIGS. 38C and 38D is a method for simultaneously occupying the channels for the periodicity data and the aperiodicity data to transmit the aperiodicity data and the periodicity data for the channel occupation time (duration) through the one-time CCA. In the method illustrated in FIGS. 38C and 38D, the channel occupation time $T_{COT}$ includes the DRS occasion duration.

In detail, in the method illustrated in FIG. 38C, the apparatus performs the CCA (omit the CCA for the periodicity data transmission) for the aperiodicity data transmission. For example, as illustrated in (B) of FIG. 38C, the base station may perform the CCA for the aperiodicity data transmission and transmit the aperiodicity data and the DRS for the channel occupation time $T_{COT}$ through the channel occupied through the CCA. By doing so, the base station may successfully transmit the DRS at the configured DRS transmission timing.

In the method illustrated in FIG. 38D, the apparatus performs the CCA (omit the CCA for the aperiodicity data transmission) for the periodicity data transmission. For example, as illustrated in (B) of FIG. 38D, the base station may perform the CCA for the periodicity data transmission and first transmit the DRS for the channel occupation time $T_{COT}$ through the channel occupied through the CCA and transmit the aperiodicity data. By doing so, the base station may successfully transmit the DRS at the configured DRS transmission timing.

The method illustrated in FIG. 38E is a method for delaying the CCA for the aperiodicity data transmission to timing after the periodicity data transmission when there is a need to transmit the periodicity data before long from the timing when the apparatus intends to transmit the aperiodicity data. For example, as illustrated in (B) of FIG. 38E, when the time interval between timing PT2 when the base station intend to transmit the aperiodicity data and the configured DRS transmission timing PT3 is equal to or less than a predetermined value, the CCA timing for the aperiodicity data transmission is delayed to timing after timing PT4 when the DRS transmission is completed. Further, the base station performs the CCA prior to the configured DRS transmission timing PT3 and transmits the DRS using the channel occupied through the CCA. Further, the base station performs the CCA for the aperiodicity data transmission after the timing PT4 when the DRS transmission is completed and transmits the aperiodicity data using the channel occupied through the CCA. As a result, the apparatus may increase the transmission opportunity of the periodicity data and secure the more reliable data transmission.

2.2.3. Data Transmission by Improving Channel Access

For the periodicity data (for example, DRS) transmission, the transmitting apparatus (for example, base station) performs the CCA. As the CCA result, if the transmitting apparatus determines that the channel is in an available state (idle state), the transmitting apparatus transmits the periodicity data at the timing when the periodicity data needs to be transmitted. As the CCA result, if the transmitting apparatus determines that the channel is in the occupation state (busy or occupied state), the transmitting apparatus does not transmit the periodicity data or may perform the CCA until the channel may be used to transmit the periodicity data. When the transmitting apparatus performs the CCA until the channel may be used, the transmitting apparatus transmits the periodicity data at timing different from the scheduled transmission timing of the periodicity data due to the additional CCA more than expected. When the transmitting apparatus transmits the periodicity data at timing different from the scheduled transmission timing, the receiving apparatus (for example, terminal) may not determine that the periodicity data transmission is made at timing different from the scheduled transmission timing and therefore may continuously expect to receive data until the data are received and receive the data (for example, blinding decoding). Further, the transmitting apparatus may also indicate to the receiving apparatus that it transmits the periodicity data after the CCA to allow the receiving apparatus to reduce the unnecessary receiving or the power consumption.

Meanwhile, as the CCA result, if the transmitting apparatus does not transmit the periodicity data since the channel is occupied by other apparatuses, the transmitting apparatus omits transmitting the periodicity data at the scheduled transmission timing within the corresponding transmission period, defers until the scheduled transmission timing within the subsequent transmission period, and performs the CCA before the scheduled transmission timing within the subsequent transmission period to attempt the periodicity data transmission. Even in this case, as described above, the transmitting apparatus determines whether to transmit the periodicity data depending on the CCA result. If it is determined that the channel is continuously occupied, the transmitting apparatus may not transmit the periodicity data at the scheduled transmission timing. To solve this problem, when performing the CCA, the transmitting apparatus more increases the channel accessibility for periodicity data transmission than other data (for example, aperiodicity data) transmission, thereby more easily accessing and occupying the channel upon the transmission of the periodicity data. To increase the channel accessibility for the periodicity data transmission, the method (2.1.1) for adjusting the periodicity data transmission timing or the method (2.1.2) for changing the CCA timing may be used.

Further, to increase the channel accessibility for the periodicity data transmission, the method for reducing the unit time (CCA slot) for the CCA or the method for reducing the number of unit time (hereinafter, 'CCA unit time') for the CCA may also be used. Here, the CCA unit time (or CCA slot) may be several to tens of μs or a predetermined time as a unit time in which the CCA is performed. The apparatus selects any one number q within a range (hereinafter, 'range of the number of CCA unit time', for example, 0 to N−1) of values that may be included in the number of CCA unit time upon performing the CCA and performs the CCA by q*(CCA slot time). Here, q is the number of CCA unit time (CCA slot). That is, the apparatus may configure the length of the CCA unit time (CCA slot) for the periodicity data transmission to have a value smaller than that of the other data (for example, aperiodicity data). Further, the apparatus may configure the range of the number of CCA unit time to be different value for each data and may define the range of the number of CCA unit time for the periodicity data to be a value smaller than that of the other data (for example, aperiodicity data). For example, the apparatus may configure the range of the number of CCA unit time for the periodicity data to be $0$-$N_1$-1 and the range of the number of CCA unit time for the aperiodicity data to be $0$-$N_2$-1 (however, $N_1 \leq N_2$).

If the apparatus does not transmit the periodicity data within the previous transmission period (for example, determine that the channel is in the occupied state for q*(CCA slot time)), the apparatus may reduce the range of the number of CCA unit time for the periodicity data within the subsequent transmission period or maintain the range as it is (for example, $(0$-$N_3$-$1) \rightarrow (0$-$N_4$-$1)$, however, $N_4 \leq N_3$) or may increase the range of the number of CCA unit time for other data (for example, aperiodicity data) (for example, $(0$-$N_5$-$1) \rightarrow (0$-$N_6$-$1)$, however, $N_5 \leq N_6$). By doing so, the apparatus may increase the transmission possibility of the periodicity data.

Further, to increase the channel accessibility for the periodicity data transmission, the apparatus may adjust the periodicity of the periodicity data. In detail, the apparatus may adjust the periodicity data transmission period (for example, transmission period value PE1→transmission period value PE2, however, PE2≤PE1) to more frequently transmit the periodicity data than the existing period (for example, transmission period value PE1). Further, when the apparatus does not previously transmit the periodicity data, the apparatus may more reduce the periodicity data transmission period (for example, PE1→PE2, however, PE2≤PE1) upon the subsequent transmission and then when the apparatus successfully transmits the periodicity data, the apparatus may reset the periodicity data transmission period (for example, PE2→PE1) and may transmit the periodicity data at the reset transmission period PE1.

2.3. Method for Operating Cellular System in Unlicensed Band Depending on Unlicensed Band Frequency Operation The method for operating a cellular system in the unlicensed band depending on the unlicensed band frequency operation provisions will be described in detail with reference to FIGS. 39A and 39B.

Figure 39A:
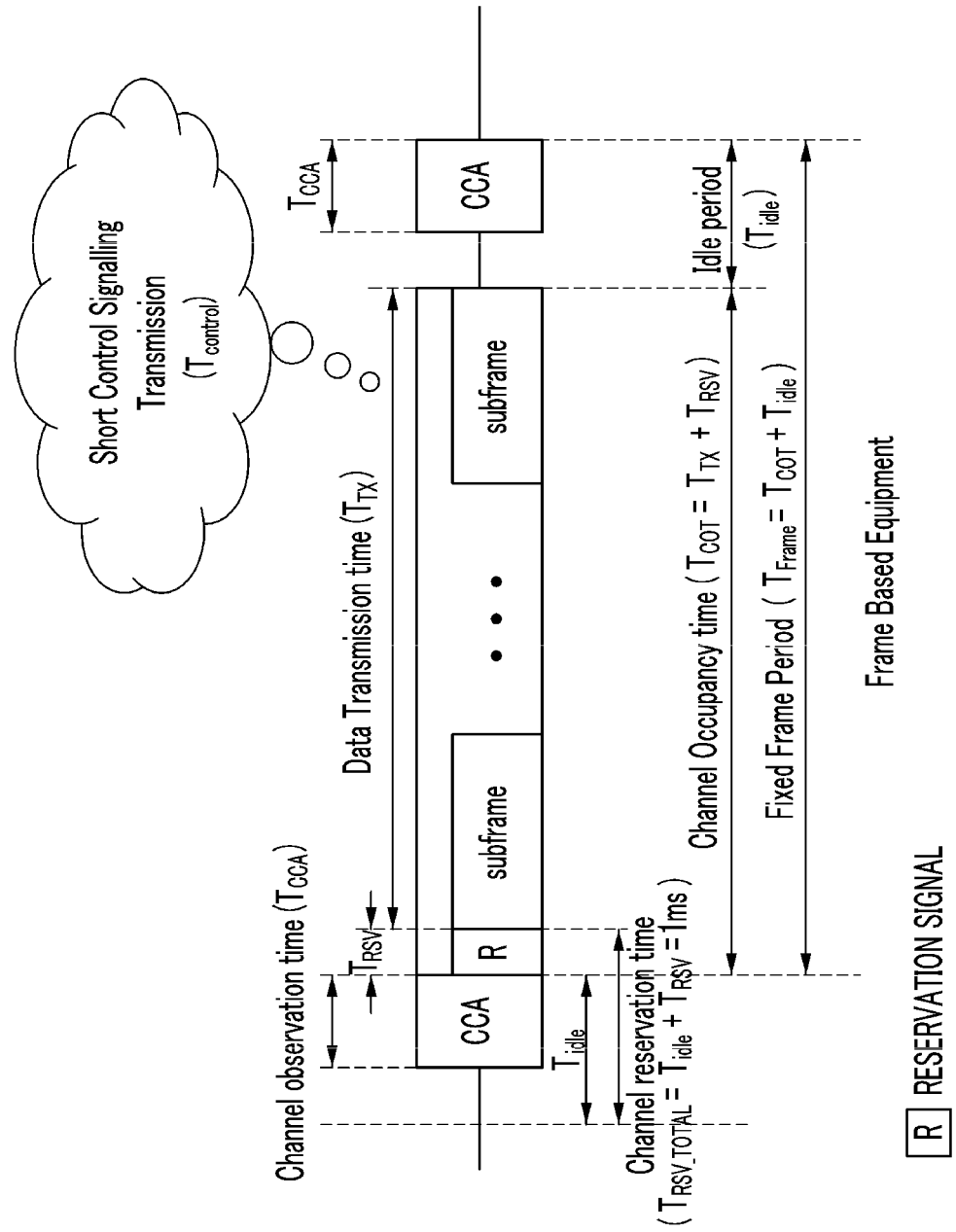
FIGS. 39A and 39B are diagrams illustrating a frame structure for cellular operation in the unlicensed band frequency according to an exemplary embodiment of the present invention.
Figure 39B:
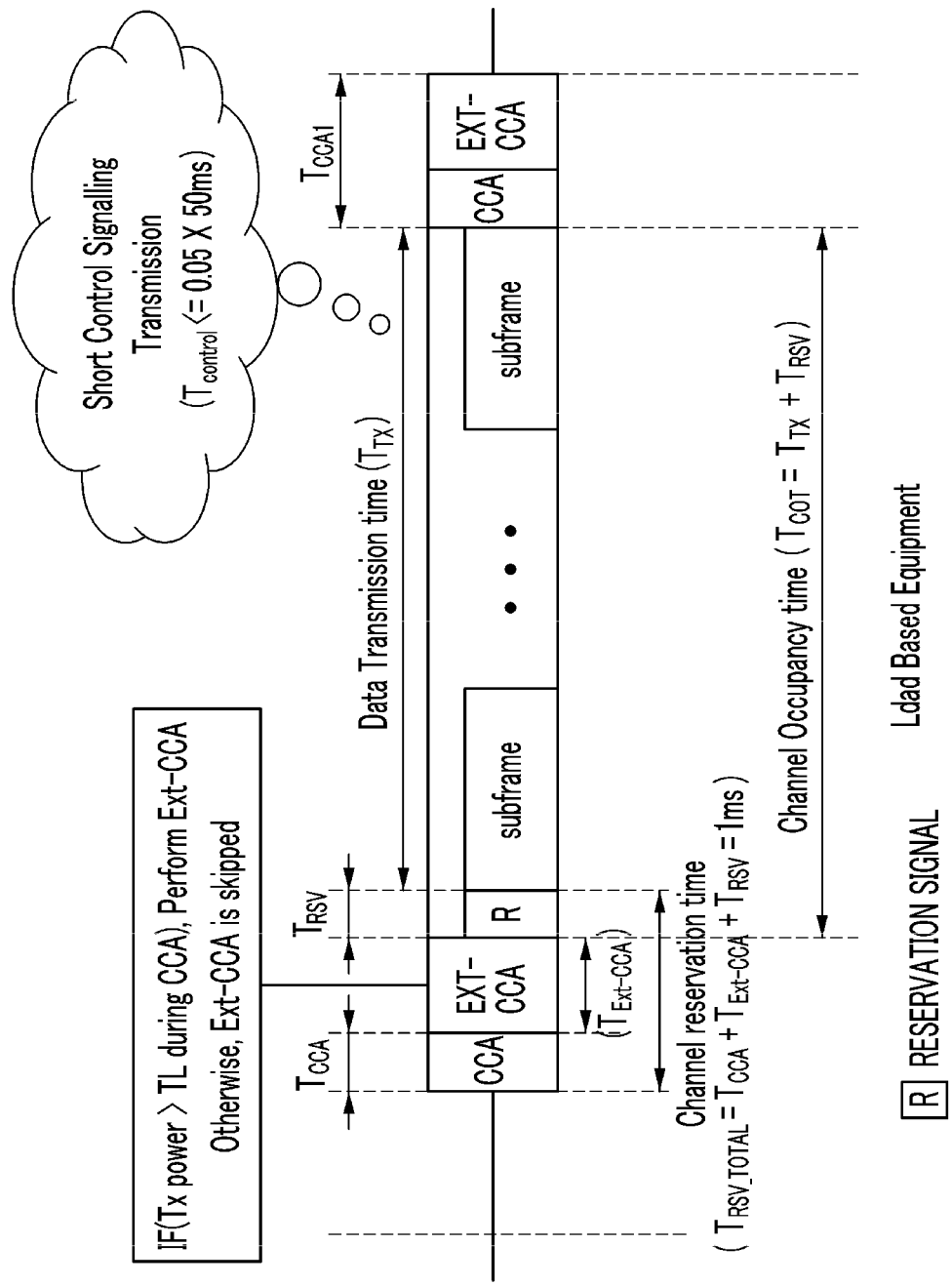

FIGS. 39A and 39B are diagrams illustrating a frame structure for cellular operation in the unlicensed band frequency according to an exemplary embodiment of the present invention. In detail, FIGS. 39A and 39B illustrate the frame for applying the method for occupying and using the channel in the above-mentioned unlicensed band to the cellular system operated in the unlicensed band.

FIG. 39A illustrates the FBE and FIG. 39B illustrates the LBE. $T_{RSV}$ represents the reservation signal (or, signal identical or similar to the above-mentioned special signal, signal identical or similar to the above-mentioned initial signal) transmission time and $T_{RSV\_TOTAL}$ is $T_{idle}+T_{RSV}$ or $T_{CCA}+T_{Ext-CCA}+T_{RSV}$ as the channel reservation time for the channel occupation. $T_{CCA1}$ is $T_{CCA}+T_{Ext-CCA}$.

Basically, the channel occupation time $T_{COT}$ for the data transmission is configured based on (for example, 1 ms in the case of the LTE) a unit (subframe) in which the cellular system allocates and uses resources to transmit data. In detail, the channel occupation time $T_{COT}$ is configured to be at least one subframe length (or TTI) and needs to be configured within the maximum channel occupation time $T_{MAX}$ according to the unlicensed frequency operation provisions. $T_{COT}$ is data transmission time $T_{TX}$+special signal transmission time $T_{RSV}$.

In particular, the channel reservation time $T_{RSV\_TOTAL}$ for the channel occupation is configured by at least one subframe length (1 ms or TTI length) and if necessary, may be extended to the subframe length (or TTI length) unit.

Meanwhile, to prevent other apparatuses from occupying the corresponding channel in the case in which the timing when the CCA ends is not accurately be suited for the subframe timing (boundary timing) due to the change in the CCA length configured for the channel sharing with the apparatus operated in the unlicensed band, the apparatus may transmit the reservation signal (for example, signal identical or similar to the above-mentioned special signal or signal identical or similar to the above-mentioned initial signal). Therefore, the apparatus needs to define the channel occupation time $T_{COT}$ as $T_{COT}=T_{TX}+T_{RSV}$ and transmit data. $T_{COT}$ does not exceed the maximum channel occupation time $T_{MAX}$ and $T_{TX}$ represents time to transmit data (in unit of subframe or in unit of TTI). Further, $T_{RSV}$ represents time to transmit the reservation signal (or special signal) to prevent other apparatuses from occupying the channel when the apparatus occupies the channel for the data transmission.

2.4. Design for Special Signal

The special signal for accessing and occupying the channel of the unlicensed band is used for the purpose of preventing other apparatuses from occupying the channel.

Figure 40:
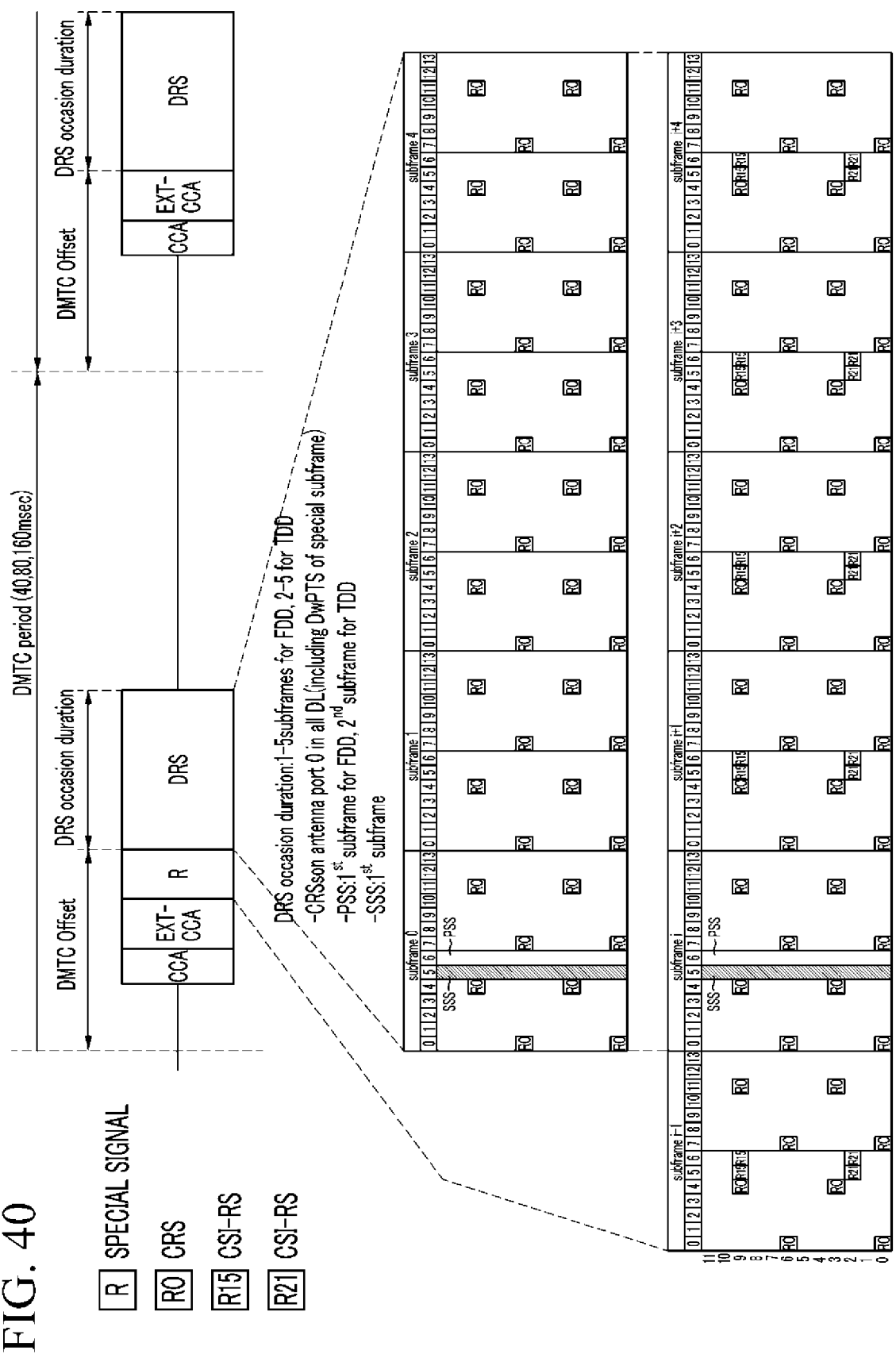
FIG. 40 is a diagram illustrating a special signal for periodic data transmission according to an exemplary embodiment of the present invention.

FIG. 40 is a diagram illustrating a special signal for periodic data transmission according to an exemplary embodiment of the present invention.

In detail, as illustrated in FIG. 40, when the apparatus does not immediately transmit the periodicity data (for example, DRS transmitted when the small cell is in an off state) just after the CCA, the apparatus transmits the special signal. For example, the base station transmits the special signal from the CCA completion timing to the DRS transmission timing determined by the DMTC offset. Similar to FIG. 1, FIG. 40 illustrates the case in which the DRS occasion duration includes five subframes.

In FIG. 40, it is assumed that the duration in which the special signal is transmitted has one subframe length, which is an example. The duration in which the special signal is transmitted is not present at all or may also be present in the CCA unit, the 1 symbol duration unit of the LTE, or several symbol units.

If the DRS transmission starts at the i-th subframe, the subframe just before the DRS transmission corresponds to the subframe in which the special signal is transmitted and is configured (recognized) as the i−1-th subframe. The base station may transmit the signal (reference signal (RS), PSS, or SSS) corresponding to the i−1-th subframe through the corresponding symbol and the subcarrier. For example, the base station may transmit the channel state information-reference signal (CRS and CSI-RS) at the i−1-th subframe as the special signal.

Figure 41:
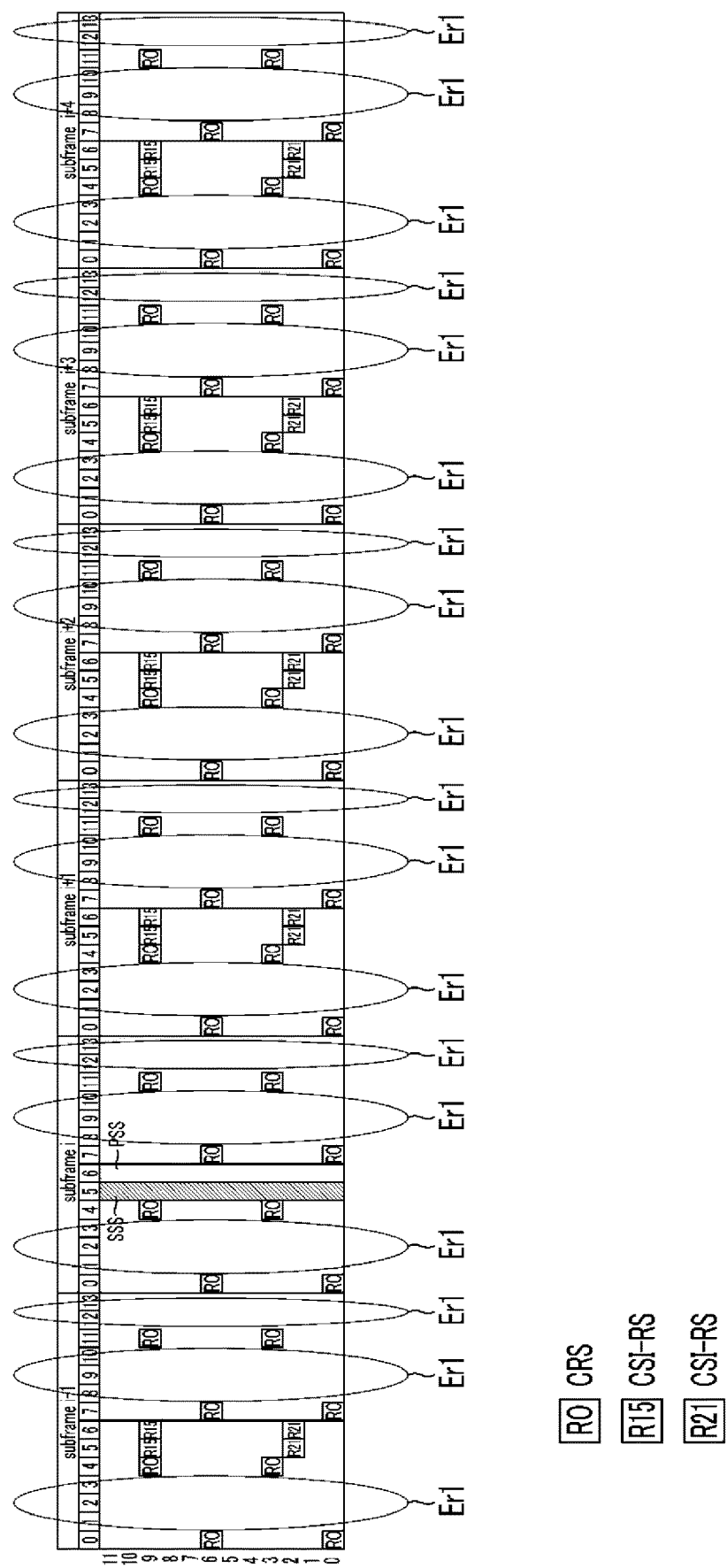
FIG. 41 is a diagram illustrating a duration in which the special signal is required.

Meanwhile, the special signal is a signal required to allow the apparatus to transmit data by being suited for the subframe boundary after the CCA but as illustrated in FIG. 41, the apparatus needs to prevent other apparatuses from being accessed to the channel even in the duration (or symbol) in which the RS, the PSS, the SSS, etc., are not transmitted. For example, the base station needs to prevent other apparatuses from being accessed to the channel in a duration Er1 in which the RS (for example, CRS, CSI-RS), the PSS, the SSS, etc., are not transmitted within the i−1-th subframe to the i+4-th subframe.

For this purpose, even when the apparatus does not perform the data transmission, the apparatus transmits the data such as the physical downlink control channel (PDCCH), the enhanced physical downlink control channel (EPDCCH), or the physical downlink shared channel (PDSCH) as the special signal in the duration Er1 to prevent other apparatuses from being accessed to the channel. In detail, even when the state of the small cell is an off state (i.e., the state of the small cell is a state in which the data transmission is not performed), the small cell transmits the data such as the PDCCH, the EPDCCH, or the PDSCH in the duration Er1 to prevent apparatuses from being accessed to the channel.

Further, to prevent other apparatuses from being accessed to the channel in the duration Er1, the apparatus may use the RS (CRS, CSI-RS, demodulated RS (DM-RS), positioning RS (PRS)) defined in the existing LTE specification as the special signal. For example, the base station transmits the RS(CRS, CSI-RS, DM-RS, PRS, etc.) as the special signal in the duration Er1 to prevent other apparatuses from being accessed to the channel. The method for using the RS as the special signal will be described in detail with reference to FIGS. 42, 43, and 44A to 44C.

FIG. 42 is a diagram illustrating the method for using an RS as a special signal according to an exemplary embodiment of the present invention. In detail, FIG. 42 illustrates the case in which the apparatus configures the special signal using the CRS, the DM-RS, and the CSI-RS within one subframe. In the present specification, one subframe includes a first time slot and a second time slot and the first time slot and the second time slot include 7 orthogonal frequency division multiplexing (OFDM) symbols based on a time axis and 12 subcarriers (Nos. 0 to 11) based on a frequency axis. In the present specification, the OFDM symbol number within one subframe is described by Nos. 0 to 13 and OFDM symbol Nos. 0 to 6 are for the first time slot and OFDM symbol Nos. 7 to 13 are for the second time slot. In particular, the OFDM symbol Nos. 7 to 13 represent the OFDM symbol Nos. 0 to 6 of the second time slot.

(A) of FIG. 42 illustrates the CRS, the DM-RS, and the CSI-RS configured within one physical resource block (PRB) pair belonging to the normal subframe. As illustrated in (A) of FIG. 42, the special signal is still required in some OFDM symbol durations (for example, OFDM symbol Nos. 2 and 3, 9 and 10).

As illustrated in (B) and (C) of FIG. 42, the OFDM symbol for the DM-RS transmission may be changed or the configuration of the CSI-RS may be changed to be included in the OFDM symbol duration requiring the special signal. For example, as illustrated in (B) of FIG. 42, the base station may change or add the OFDM symbol for the DM-RS so that the DM-RS transmitted at the OFDM symbol Nos. 5 and 6 is transmitted in the OFDM symbol duration (for example, OFDM symbol Nos. 2 and 3) requiring the special signal. Further, as illustrated in (B) of FIG. 42, the base station may change or add the OFDM symbol for the CSI-RS so that the CSI-RS is transmitted in the OFDM symbol duration (for example, OFDM symbol Nos. 9 and 10) requiring the special signal. Similarly, as illustrated in (C) of FIG. 42, the base station may change or add the OFDM symbol for the CSI-RS so that the CSI-RS is transmitted in the OFDM symbol duration (for example, OFDM symbol Nos. 2 and 3, 9 and 10) requiring the special signal.

Figure 43:
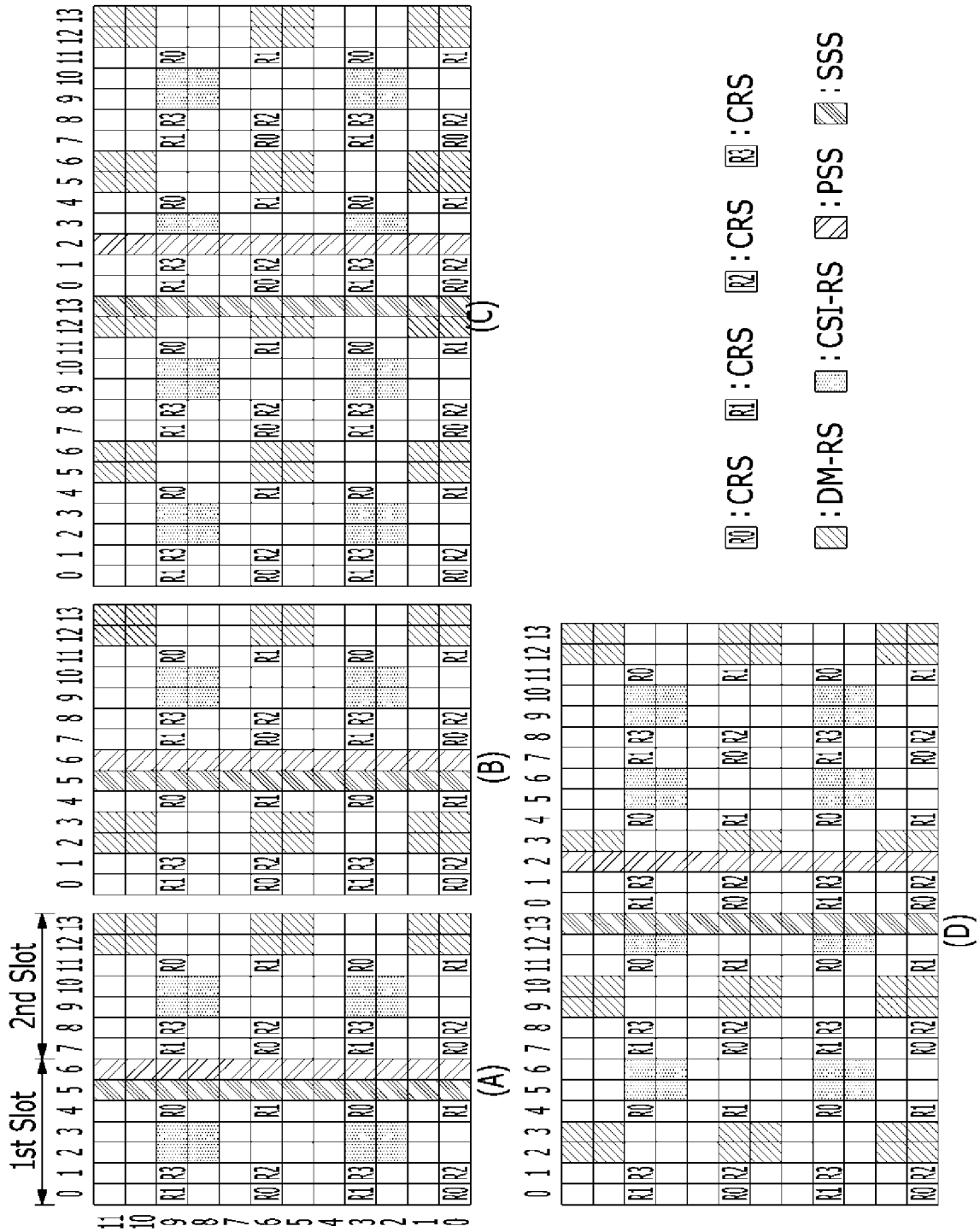
FIG. 43 is a diagram illustrating a special signal for the subframe in which a synchronous signal is transmitted according to another exemplary embodiment of the present invention.

Meanwhile, when the apparatus transmits the PSS or the SSS, the special signal may be configured as illustrated in FIG. 43 so that the RS according to the exemplary embodiment of the present invention is not transmitted in the region in which the PSS or the SSS is transmitted. FIG. 43 is a diagram illustrating the special signal for the subframe in which synchronous signals PSS and SSS are transmitted according to another exemplary embodiment of the present invention. (A) and (B) of FIG. 43 illustrate FDD and (C) and (D) of FIG. 43 illustrate TDD. As illustrated in (A) to (D) of FIG. 43, the base station may change or add the OFDM symbol for the CSI-RS or the DM-RS so that the CSI-RS or the DM-RS is transmitted in the OFDM symbol duration (for example, OFDM symbol Nos. 2 and 3, 9 and 10) requiring the special signal.

Meanwhile, the method for configuring the special signal when the special signal is transmitted only in some region within one subframe due to the CCA (for example, before the DRS transmission timing) will be described in detail with reference to FIGS. 44A to 44C.

Figure 44B:
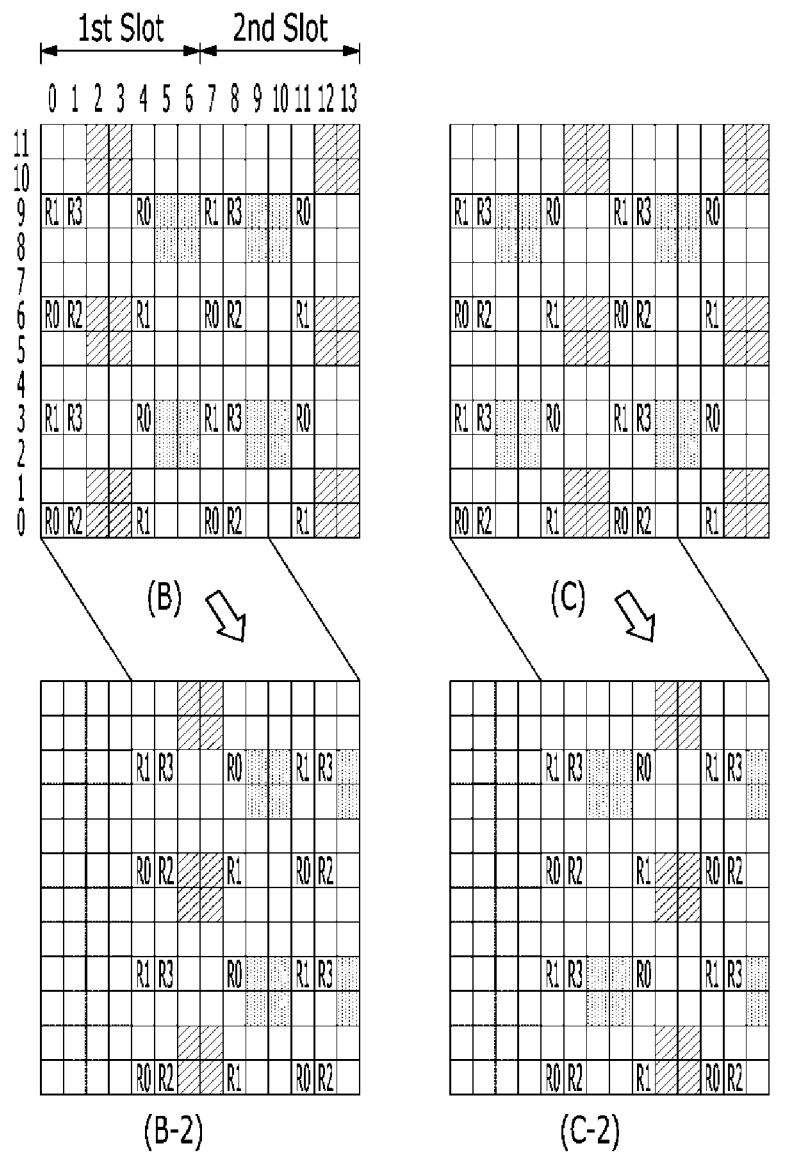

FIGS. 44A to 44C are diagrams illustrating a method for transmitting a special signal in some region of a subframe according to another exemplary embodiment of the present invention. (B) and (C) of FIGS. 44A to 44C, respectively, illustrate (B) and (C) of FIG. 42. FIGS. 44A to 44C illustrate the case in which the OFDM symbol (that is, some region to which the special signal is transmitted within one subframe or partial subframe) of the occupied channel after the CCA by the apparatus is OFDM symbol Nos. 4 to 13.

As illustrated in (B-1) and (C-1) of FIG. 44A, the transmission format illustrated in (B) or (C) of FIG. 44A is mapped to the OFDM symbol (for example, OFDM symbol Nos. 4 to 13) of the occupied channel by the apparatus after the CCA from the final OFDM symbol (OFDM symbol No. 13). For example, a region corresponding to the OFDM symbol Nos. 4 to 13 illustrated in (B) of FIG. 44A is mapped in a region corresponding to OFDM symbol Nos. 4 to 13 illustrated in (B-1) of FIG. 44A. Similarly, a region corresponding to the OFDM symbol Nos. 4 to 13 illustrated in (C) of FIG. 44A is mapped in a region corresponding to OFDM symbol Nos. 4 to 13 illustrated in (C-1) of FIG. 44A.

As illustrated in (B-2) and (C-2) of FIG. 44B, the transmission format illustrated in (B) or (C) of FIG. 44B is mapped to the OFDM symbol (for example, OFDM symbol Nos. 4 to 13) of the occupied channel by the apparatus after the CCA from the OFDM symbol No. 0. For example, a region corresponding to the OFDM symbol Nos. 0 to 9 illustrated (B) of FIG. 44B is mapped in a region corresponding to OFDM symbol Nos. 4 to 13 illustrated in (B-2) of FIG. 44B. Similarly, a region corresponding to the OFDM symbol Nos. 0 to 9 illustrated (C) of FIG. 44B is mapped in a region corresponding to OFDM symbol Nos. 4 to 13 illustrated in (C-2) of FIG. 44B.

As illustrated in (B-3) and (C-3) of FIG. 44C, the OFDM symbol (for example, OFDM symbol Nos. 4 to 13) of the occupied channel after the CCA, that is, the partial subframe may also be configured in the time slot unit. In detail, at the first time slot of the partial subframe, the transmission format illustrated in (B) or (C) of FIG. 44C is mapped from the OFDM symbol No. 0 and at the second time slot of the partial subframe, the transmission format illustrated in (B) or (C) of FIG. 44C may be configured from OFDM symbol No. 7. For example, a region corresponding to OFDM symbol Nos. 0 to 2 (first time slot) illustrated in (B) of FIG. 44C is mapped in a region corresponding to OFDM symbol Nos. 4 to 6 illustrated in (B-3) of FIG. 44C and a region corresponding to OFDM symbol Nos. 7 to 13 (second time slot) illustrated in (B) of FIG. 44C is mapped in a region corresponding to OFDM symbol Nos. 7 to 13 illustrated in (B-3) of FIG. 44C. Similarly, a region corresponding to OFDM symbol Nos. 0 to 2 (first time slot) illustrated in (C) of FIG. 44C is mapped in a region corresponding to OFDM symbol Nos. 4 to 6 illustrated in (C-3) of FIG. 44C and a region corresponding to OFDM symbol Nos. 7 to 13 (second time slot) illustrated in (C) of FIG. 44C is mapped in a region corresponding to OFDM symbol Nos. 7 to 13 illustrated in (0-3) of FIG. 44C.

Meanwhile, when the apparatus transmits the normal data, not the DRS, the method for configuring the above-mentioned special signal may also use the RS included in the PDSCH as the special signal.

Figure 45:
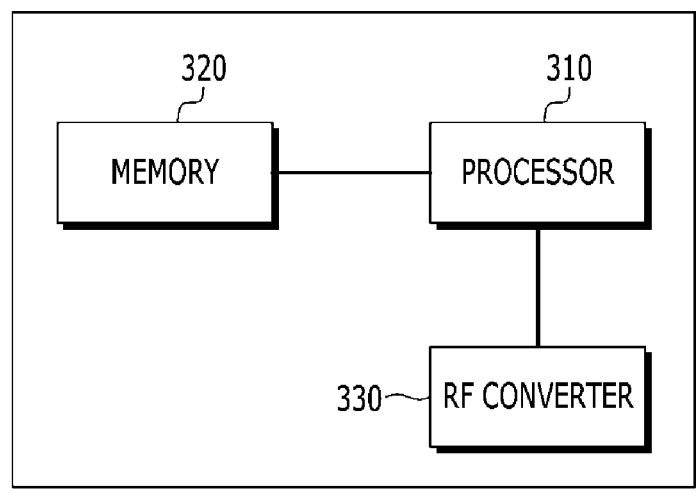
FIG. 45 is a diagram illustrating a configuration of the transmitting apparatus according to an exemplary embodiment of the present invention.

FIG. 45 is a diagram illustrating a configuration of a transmitting apparatus 300 according to an exemplary embodiment of the present invention.

The transmitting apparatus 300 includes a processor 310, a memory 320 and a radio frequency (RF) converter 330.

The processor 310 may be configured to implement procedures, functions, and methods described in association with the transmitting apparatus in the above-mentioned '2. method for managing access of radio resources'.

The memory 320 is connected to the processor 310 and stores various types of information associated with the operation of the processor 310.

The RF converter 330 is connected to the processor 310 to transmit or receive a radio signal. Further, the transmitting apparatus 300 may have a single antenna or a multiple antenna.

Figure 46:
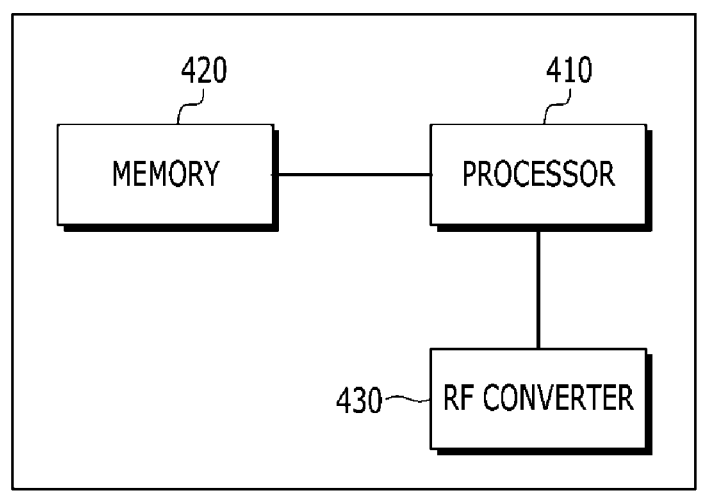
FIG. 46 is a diagram illustrating a configuration of the receiving apparatus according to an exemplary embodiment of the present invention.

FIG. 46 is a diagram illustrating a configuration of a receiving apparatus 400 according to an exemplary embodiment of the present invention.

In detail, the receiving apparatus 400 includes a processor 410, a memory 420, and an RF converter 430.

The processor 410 may be configured to implement procedures, functions, and methods described in association with the receiving apparatus in the above-mentioned '2. method for managing access of radio resources'.

The memory 420 is connected to the processor 410 and stores various types of information associated with the operation of the processor 410.

The RF converter 430 is connected to the processor 410 to transmit and receive a radio signal. Further, the receiving apparatus 400 may have a single antenna or a multiple antenna.

According to an exemplary embodiment of the present invention, for the radio resource allocation in the mobile wireless access system, relatively less reliable unlicensed band frequency may be simultaneously operated with the licensed band frequency.

Further, according to the exemplary embodiment of the present invention, the uplink data may be transmitted through the reliable licensed band frequency. By doing so, reliable services may be provided.

Further, according to the exemplary embodiment of the present invention, the transmitting apparatus performs the radio resource access, the receiving apparatus performs the radio resource access, or the receiving apparatus helps the transmitting apparatus for the data transmission of the transmitting apparatus, such that the apparatus of the mobile wireless access system may efficiently access the radio resources.

Further, according to the exemplary embodiment of the present invention, the operation such as the selection and management of the channel for the data transmission may be efficiently performed.

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

What is claimed is:

1. A method for transmitting data through an unlicensed channel by a terminal, the method comprising:
   receiving uplink resource allocation information allocating first unit duration for the terminal to transmit the data;
   performing first channel access before the first unit duration based on the uplink resource allocation information;
   performing second channel access before next unit duration following the first unit duration based on the uplink resource allocation information when the first channel access fails and the data have not been transmitted in the first unit duration; and transmitting the data in the next unit duration when the unlicensed channel is occupied by the second channel access, wherein both first duration of the first channel access and second duration of the second channel access are included in a channel reservation time for occupation of the unlicensed channel.

2. The method of claim 1, further comprising:

transmitting, before the transmitting the data in the next unit duration, a reservation signal for prevent other apparatuses from occupying the unlicensed channel when the terminal occupies the unlicensed channel for transmission of the data by the second channel access.

3. The method of claim 2, wherein duration in which the reservation signal is transmitted in included in the channel reservation time.

4. The method of claim 1, wherein both the first unit duration and the next unit duration are included in a channel occupation time for transmitting the data through the unlicensed channel.

5. A terminal for transmitting data through an unlicensed channel, the terminal comprising:

a processor, a memory, and a transceiver, wherein the processor executes a program stored in the memory to perform:

receiving uplink resource allocation information allocating first unit duration for the terminal to transmit the data;

performing first channel access before the first unit duration based on the uplink resource allocation information;

performing second channel access before next unit duration following the first unit duration based on the uplink resource allocation information when the first channel access fails and the data have not been transmitted in the first unit duration; and transmitting the data in the next unit duration when the unlicensed channel is occupied by the second channel access, wherein both first duration of the first channel access and second duration of the second channel access are included in a channel reservation time for occupation of the unlicensed channel.

6. The terminal of claim 5, wherein the processor executes the program to further perform:

transmitting, before the transmitting the data in the next unit duration, a reservation signal for prevent other apparatuses from occupying the unlicensed channel when the terminal occupies the unlicensed channel for transmission of the data by the second channel access.

7. The terminal of claim 6, wherein duration in which the reservation signal is transmitted in included in the channel reservation time.

8. The terminal of claim 5, wherein both the first unit duration and the next unit duration are included in a channel occupation time for transmitting the data through the unlicensed channel.

\* \* \* \* \*